US005357596A

United States Patent [19]

Takebayashi et al.

[11] Patent Number: 5,357,596

[45] Date of Patent: Oct. 18, 1994

[54] SPEECH DIALOGUE SYSTEM FOR FACILITATING IMPROVED HUMAN-COMPUTER INTERACTION

[75] Inventors: Yoichi Takebayashi, Kanagawa; Hiroyuki Tsuboi, Hyogo; Yoichi Sadamoto, Chiba; Yasuki Yamashita, Hyogo; Yoshifumi Nagata, Kanagawa; Shigenobu Seto, Kanagawa; Hideaki Shinchi, Kanagawa; Hideki Hashimoto, Kanagawa, all of Japan

[73] Assignees: Kabushiki Kaisha Toshiba, Kawasaki; Toshiba Software Engineering Corp., Tokyo, both of Japan

[21] Appl. No.: 978,521

[22] Filed: Nov. 18, 1992

[30] Foreign Application Priority Data

Nov. 18, 1991 [JP] Japan .................................. 3-329475

[51] Int. Cl.[5] .............................................. G10L 9/00

[52] U.S. Cl. .................................. 395/2.84; 395/2.79; 395/2.6

[58] Field of Search .................................... 381/41-45; 395/2.79, 2.84, 2.4, 2.6

[56] References Cited

U.S. PATENT DOCUMENTS 4,677,569 6/1987 Nakano et al. .......................... 395/2
4,856,066 8/1989 Lemelson .............................. 381/36
5,068,645 11/1991 Drumm ............................... 340/710
5,219,291 6/1993 Fong et al. .......................... 434/323

OTHER PUBLICATIONS

IEEE, Sep. 1992, pp. 197–200, Hiroyuki Tsuboi, et al., "A Real-Time Task-Oriented Speech Understanding System Using Keyword-Spotting".

IEEE, Jul. 1991, pp. 905–908, Yoichi Takebayashi, et al., "A Robust Speech Recognition System Using Work-Spotting with Noise Immunity Learning".

*Primary Examiner*—Allen R. MacDonald
*Assistant Examiner*—Michelle Doerrler
*Attorney, Agent, or Firm*—Oblon, Spivak, McClelland, Maier & Neustadt

[57] ABSTRACT

A speech dialogue system capable of realizing natural and smooth dialogue between the system and a human user, and easy maneuverability of the system. In the system, a semantic content of input speech from a user is understood and a semantic content determination of a response output is made according to the understood semantic content of the input speech. Then, a speech response and a visual response according to the determined response output are generated and outputted to the user. The dialogue between the system and the user is managed by controlling transitions between user states during which the input speech is to be entered and system states during which the system response is to be outputted. The understanding of a semantic content of input speech from a user is made by detecting keywords in the input speech, with the keywords to be detected in the input speech limited in advance, according to a state of a dialogue between the user and the system.

45 Claims, 42 Drawing Sheets

SEMANTIC UTTERANCE REPRESENTATION
11
21
KEYWORD DETECTION UNIT
SPEECH ANALYZER
21a
KEYWORD SPOTTER
21b
21
SENTENCE START POINT DETECTOR
22a
SENTENCE CANDIDATE ANALYZER
22b
SENTENCE END POINT DETECTOR
22c
SENTENCE CANDIDATE TABLE
22d
SYNTACTIC & SEMANTIC ANALYSIS UNIT
SPEECH UNDERSTANDING UNIT
INPUT SPEECH
FROM DIALOGUE MANAGEMENT UNIT 12

FIG.3
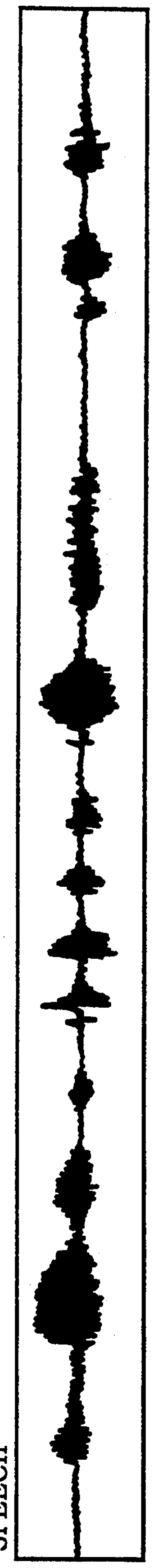
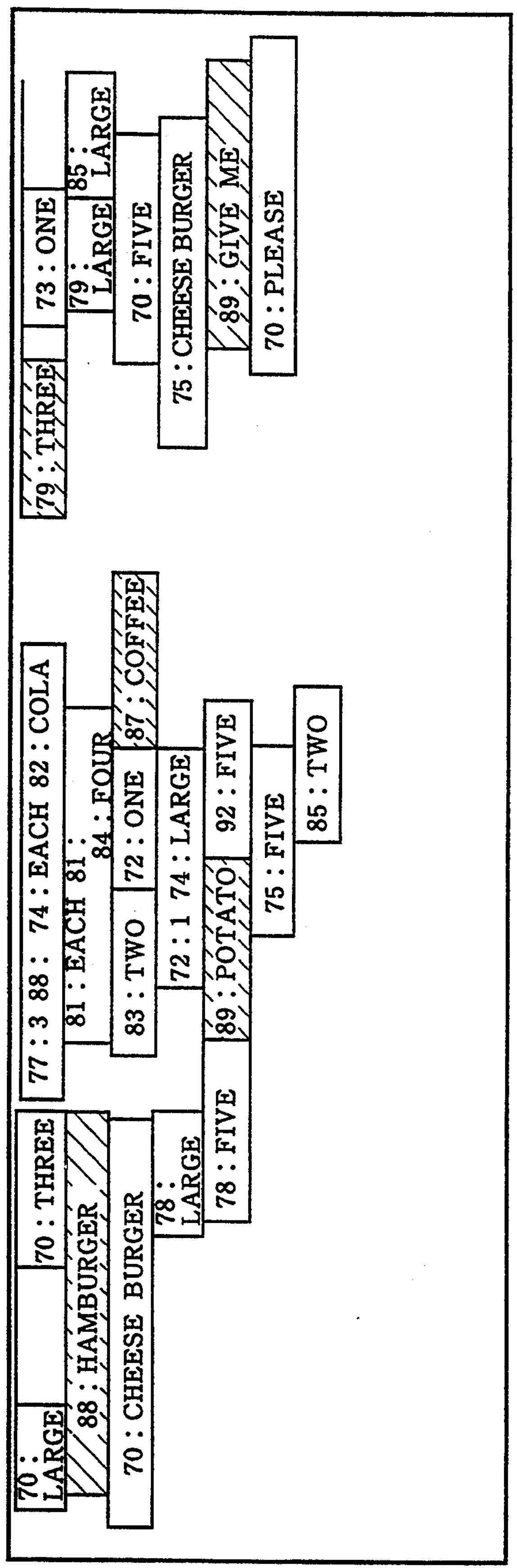

FIG.4

| ACT = ORDER | | |
|---|---|---|
| ITEM | SIZE | QUANTITY |
| HAMBURGER | | 1 |
| COFFEE | MEDIUM | 3 |
| POTATOES | | 1 |

ACT FRAME

ORDER TABLE FRAME

FIG.5

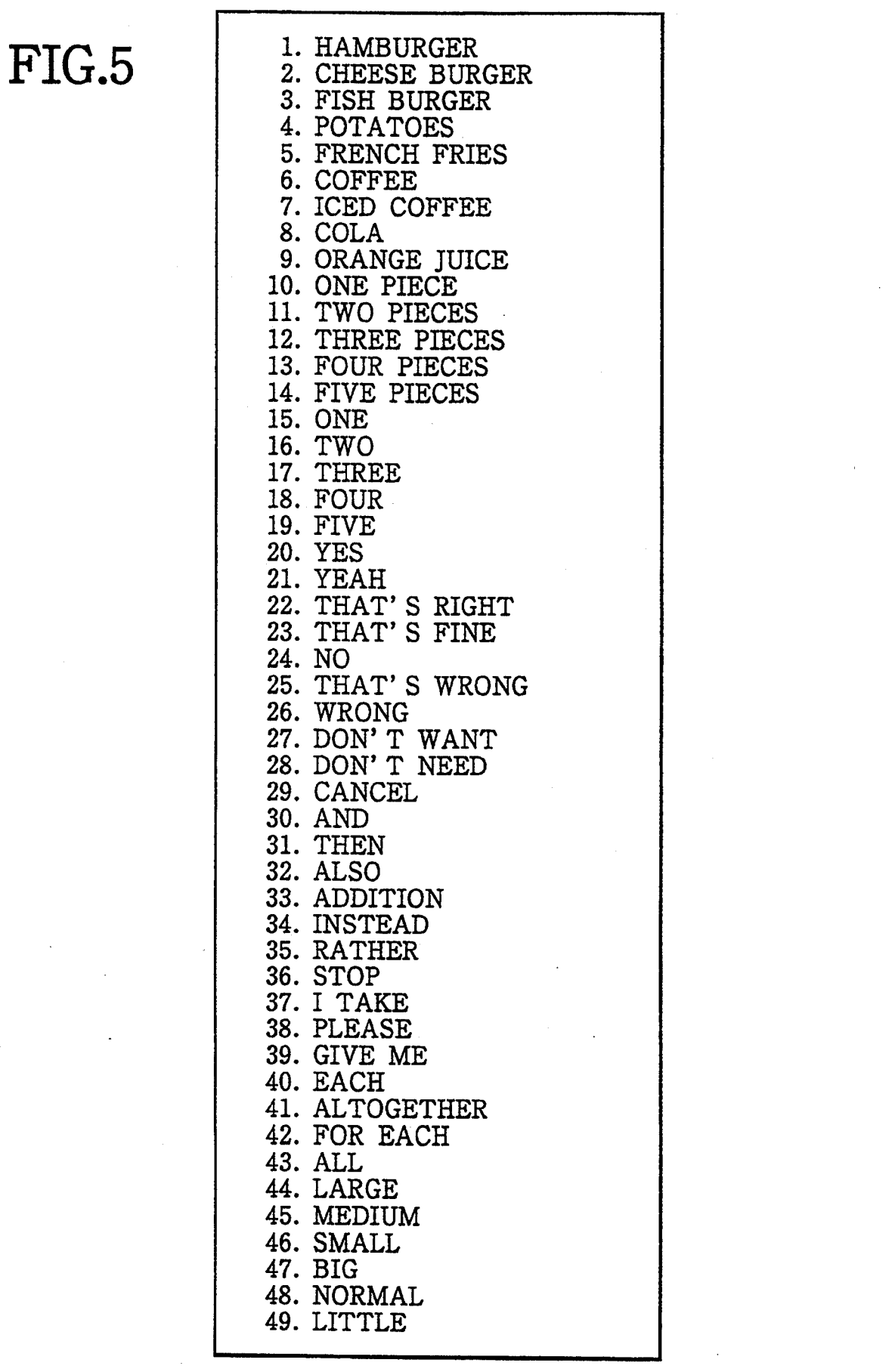

1. HAMBURGER
2. CHEESE BURGER
3. FISH BURGER
4. POTATOES
5. FRENCH FRIES
6. COFFEE
7. ICED COFFEE
8. COLA
9. ORANGE JUICE
10. ONE PIECE
11. TWO PIECES
12. THREE PIECES
13. FOUR PIECES
14. FIVE PIECES
15. ONE
16. TWO
17. THREE
18. FOUR
19. FIVE
20. YES
21. YEAH
22. THAT'S RIGHT
23. THAT'S FINE
24. NO
25. THAT'S WRONG
26. WRONG
27. DON'T WANT
28. DON'T NEED
29. CANCEL
30. AND
31. THEN
32. ALSO
33. ADDITION
34. INSTEAD
35. RATHER
36. STOP
37. I TAKE
38. PLEASE
39. GIVE ME
40. EACH
41. ALTOGETHER
42. FOR EACH
43. ALL
44. LARGE
45. MEDIUM
46. SMALL
47. BIG
48. NORMAL
49. LITTLE

FIG.6

| ACT = CONFIRMATION | | |
|---|---|---|
| ITEM | SIZE | QUANTITY |
| HAMBURGER | 0 | 1 |
| COFFEE | 0 | 2 |
| POTATOES | LARGE | 4 |

FIG.7

| ITEM | SIZE | QUANTITY |
|---|---|---|
| HAMBURGER | 0 | 2 |
| POTATOES | LARGE | 2 |

FIG.8

| ITEM | SIZE | QUANTITY |
|---|---|---|
| HAMBURGER | 0 | 1 |

FIG.12A

SEMANTIC RESPONSE REPRESENTATION

| ACT=ORDER | | |
|---|---|---|
| ITEM | SIZE | QUANTITY |
| HAMBURGER | 0 | 1 |
| COFFEE | 0 | 2 |
| COLA | LARGE | 4 |

FIG.12B ORDER TABLE

| ITEM | SIZE | QUANTITY |
|---|---|---|
| HAMBURGER | 0 | 1 |
| COFFEE | 0 | 2 |
| COLA | LARGE | 4 |

FIG.12C

SYSTEM "YOUR ORDERS, ARE ONE HAMBURGER, TWO COFFEES, AND FOUR LARGE COLAS, RIGHT ?"

USER "ADD ONE MORE COLA , PLEASE."

FIG.12D

SEMANTIC UTTERANCE REPRESENTATION

CANDIDATE NO.1

| ACT=ADDITION | | $D_1$ |
|---|---|---|
| ITEM | SIZE | QUANTITY |
| COLA | ? | 1 |

FIG.12E

SEMANTIC UTTERANCE REPRESENTATION

CANDIDATE NO.2

| ACT=DELETION | | $D_2$ |
|---|---|---|
| ITEM | SIZE | QUANTITY |
| POTATOES | LARGE | 2 |

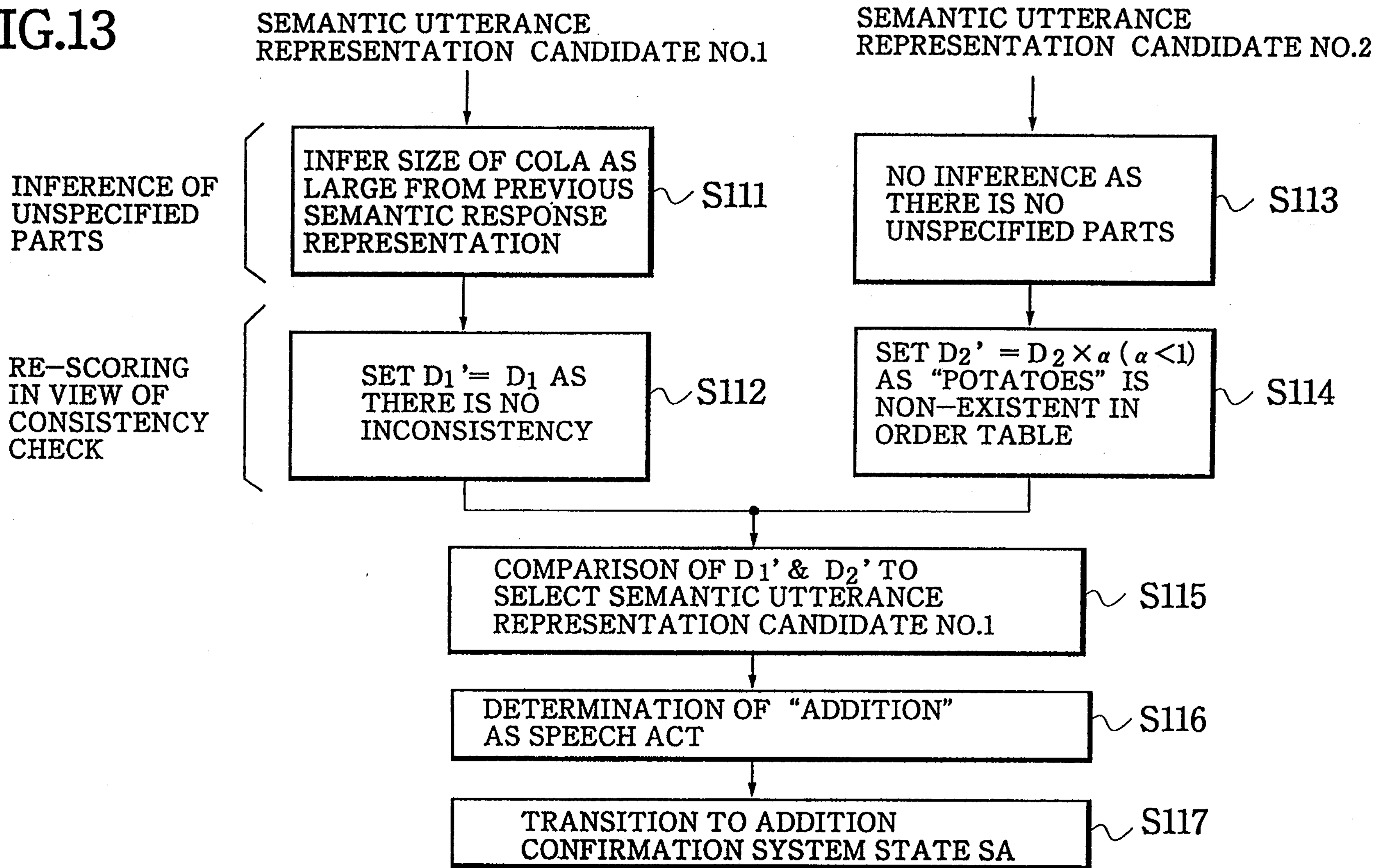
FIG.13
SEMANTIC UTTERANCE REPRESENTATION CANDIDATE NO.1
SEMANTIC UTTERANCE REPRESENTATION CANDIDATE NO.2
INFERENCE OF UNSPECIFIED PARTS
INFER SIZE OF COLA AS LARGE FROM PREVIOUS SEMANTIC RESPONSE REPRESENTATION
S111
NO INFERENCE AS THERE IS NO UNSPECIFIED PARTS
S113
RE-SCORING IN VIEW OF CONSISTENCY CHECK
SET D1'= D1 AS THERE IS NO INCONSISTENCY
S112
SET D2' = D2×α (α<1) AS "POTATOES" IS NON-EXISTENT IN ORDER TABLE
S114
COMPARISON OF D1' & D2' TO SELECT SEMANTIC UTTERANCE REPRESENTATION CANDIDATE NO.1
S115
DETERMINATION OF "ADDITION" AS SPEECH ACT
S116
TRANSITION TO ADDITION CONFIRMATION SYSTEM STATE SA
S117

FIG.14

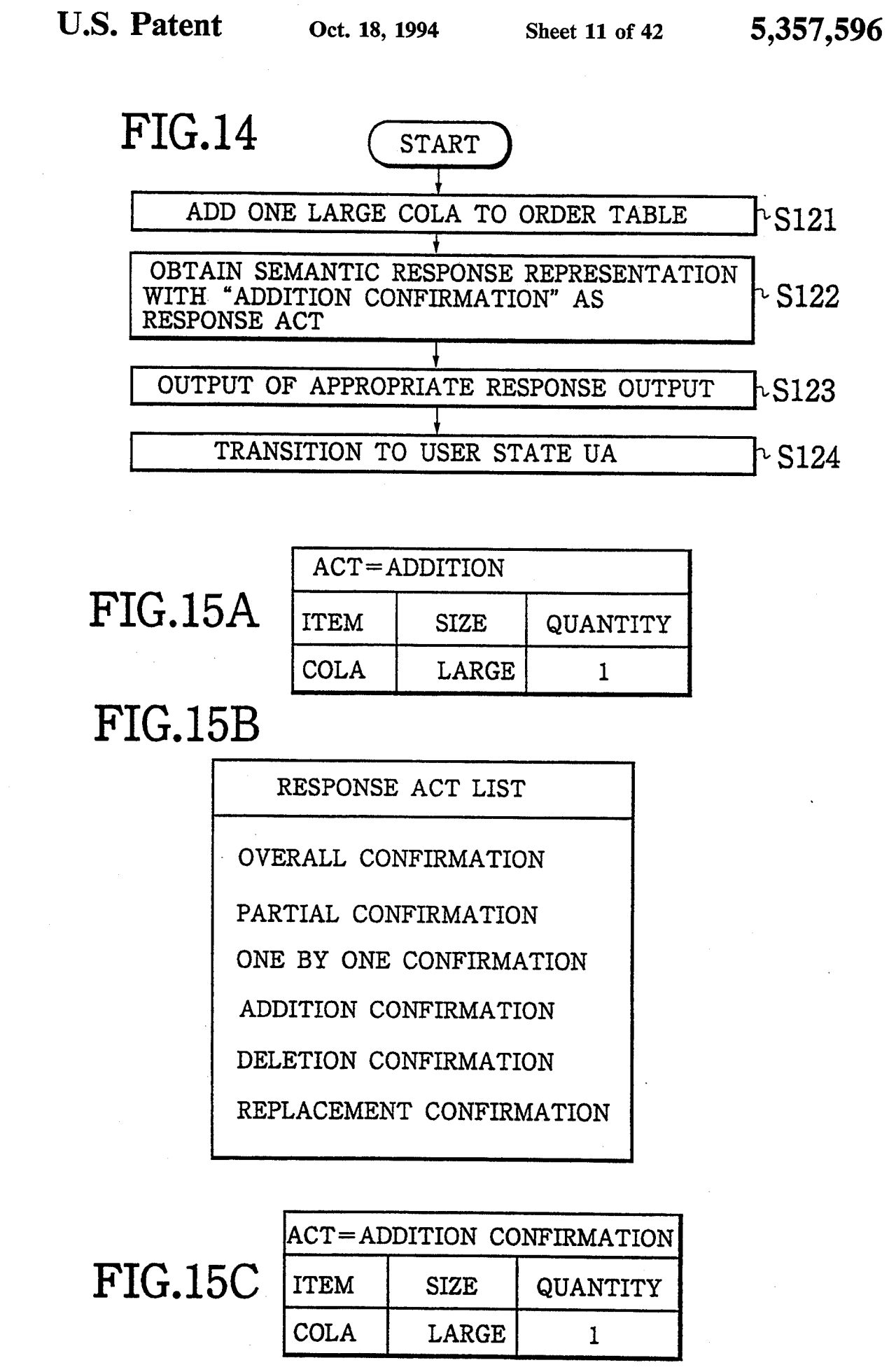

START

ADD ONE LARGE COLA TO ORDER TABLE ~S121

OBTAIN SEMANTIC RESPONSE REPRESENTATION WITH "ADDITION CONFIRMATION" AS RESPONSE ACT ~S122

OUTPUT OF APPROPRIATE RESPONSE OUTPUT ~S123

TRANSITION TO USER STATE UA ~S124

FIG.15A

| ACT=ADDITION | | |
|---|---|---|
| ITEM | SIZE | QUANTITY |
| COLA | LARGE | 1 |

FIG.15B

| RESPONSE ACT LIST |
|---|
| OVERALL CONFIRMATION |
| PARTIAL CONFIRMATION |
| ONE BY ONE CONFIRMATION |
| ADDITION CONFIRMATION |
| DELETION CONFIRMATION |
| REPLACEMENT CONFIRMATION |

FIG.15C

| ACT=ADDITION CONFIRMATION | | |
|---|---|---|
| ITEM | SIZE | QUANTITY |
| COLA | LARGE | 1 |

FIG.16

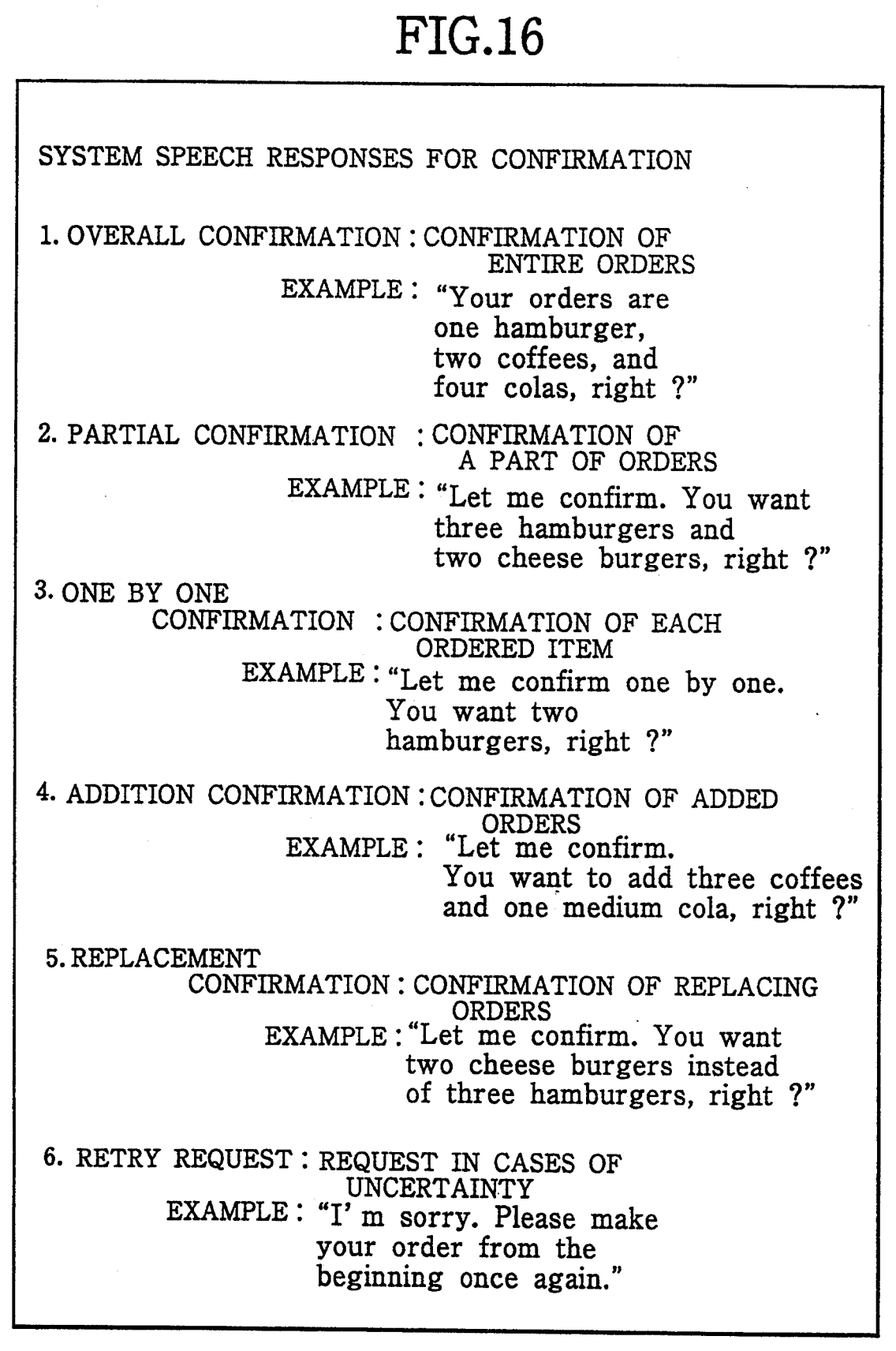

SYSTEM SPEECH RESPONSES FOR CONFIRMATION

1. OVERALL CONFIRMATION : CONFIRMATION OF ENTIRE ORDERS
EXAMPLE : "Your orders are one hamburger, two coffees, and four colas, right ?"

2. PARTIAL CONFIRMATION : CONFIRMATION OF A PART OF ORDERS
EXAMPLE : "Let me confirm. You want three hamburgers and two cheese burgers, right ?"

3. ONE BY ONE CONFIRMATION : CONFIRMATION OF EACH ORDERED ITEM
EXAMPLE : "Let me confirm one by one. You want two hamburgers, right ?"

4. ADDITION CONFIRMATION : CONFIRMATION OF ADDED ORDERS
EXAMPLE : "Let me confirm. You want to add three coffees and one medium cola, right ?"

5. REPLACEMENT CONFIRMATION : CONFIRMATION OF REPLACING ORDERS
EXAMPLE : "Let me confirm. You want two cheese burgers instead of three hamburgers, right ?"

6. RETRY REQUEST : REQUEST IN CASES OF UNCERTAINTY
EXAMPLE : "I' m sorry. Please make your order from the beginning once again."

| ACT=PARTIAL CONFIRMATION | | |
|---|---|---|
| ITEM | SIZE | QUANTITY |
| COLA | LARGE | 1 |
| POTATOES | SMALL | 3 |
| LIKELIHOOD OF KEYWORD | | |
| "COLA"=0.8 | "LARGE"=0.7 | "1"=0.4 |
| "POTATOES"=0.6 | "SMALL"=0.9 | "3"=0.8 |
| USER'S SPEECH SPEED = 8 MORA/SEC | | |

14
15
13
RESPONSE OUTPUT CONTROL UNIT
137
136
CONTENT VISUALIZING IMAGE GENERATION UNIT
133
HUMAN CHARACTER IMAGE GENERATION UNIT
SPEECH RESPONSE GENERATION UNIT
135
132
HUMAN CHARACTER FEATURE DETERMINATION UNIT
SPEECH CHARACTERISTIC DETERMINATION UNIT
134
TEXT DATA
131
RESPONSE SENTENCE GENERATION UNIT
RESPONSE GENERATION UNIT
12
DIALOGUE MANAGEMENT UNIT

FIG.20

| SYSTEM STATE | SP 1 |
|---|---|
| USER STATE | UP 3 |
| REPETITION NUMBER N | 0 |
| EMPHASIZING TERM | NONE |
| LIKELIHOOD D | 1.0 |

FIG.21

ACT = PARTIAL CONFIRMATION

"Let me confirm. You want <quantity><size> <item>, right ?"

ACT = ADDITION CONFIRMATION

"Let me confirm. You want to add <quantity> <size><item>, right ?"

| ACT=PARTIAL CONFIRMATION | | |
|---|---|---|
| ITEM | SIZE | QUANTITY |
| COLA | LARGE | 1 |
| POTATOES | SMALL | 3 |

ACT=PARTIAL CONFIRMATION
"Let me confirm. You want <quantity><size><item>, right ?"

"Let me confirm. You want one large cola and three small potatoes, right ?"

FIG.23

| SYSTEM STATE | USER STATE | REPETITION NUMBER N | LIKELIHOOD D | HUMAN CHARACTER IMAGE TYPE | FACIAL EXPRESSION |
|---|---|---|---|---|---|
| S0 | U0 | — | — | GREETING | JOYFUL |
| SP1 | UP1 | $0 \leqq N < 2$ | $0 \leqq D < 0.7$ | CONFIRMATION | EMBARRASSED |
| SP1 | UP1 | $0 \leqq N < 2$ | $0.7 \leqq D < 1.0$ | CONFIRMATION | NORMAL |
| SP1 | UP1 | $2 < N$ | $0 \leqq D < 1.0$ | CONFIRMATION | REGRETFUL |
| ⋮ | ⋮ | ⋮ | ⋮ | ⋮ | ⋮ |
| S10 | UP15 | $0 \leqq N < 2$ | $0 \leqq D < 1.0$ | ONE BY ONE CONFIRMATION | NORMAL |
| ⋮ | ⋮ | ⋮ | ⋮ | ⋮ | ⋮ |
| SP25 | UP30 | — | — | RETRY REQUEST | REGRETFUL |
| ⋮ | ⋮ | ⋮ | ⋮ | ⋮ | ⋮ |

FIG.24

| SYSTEM STATE | USER STATE | REPETITION NUMBER N | LIKELIHOOD D | HUMAN CHARACTER IMAGE TYPE | EMOTIONAL EXPRESSION |
|---|---|---|---|---|---|
| S0 | U0 | — | — | GREETING | JOYFUL |
| SP1 | UP1 | $0 \leqq N < 2$ | $0 \leqq D < 0.7$ | CONFIRMATION | EMBARRASSED |
| SP1 | UP1 | $0 \leqq N < 2$ | $0.7 \leqq D < 1.0$ | CONFIRMATION | NORMAL |
| SP1 | UP1 | $2 < N$ | $0 \leqq D < 1.0$ | CONFIRMATION | REGRETFUL |
| ........... | ........... | ........... | ........... | ........... | ........... |
| S10 | UP15 | $0 \leqq N < 2$ | $0 \leqq D < 1.0$ | ONE BY ONE CONFIRMATION | NORMAL |
| ........... | ........... | ........... | ........... | ........... | ........... |
| SP25 | UP30 | — | — | RETRY REQUEST | REGRETFUL |
| ........... | ........... | ........... | ........... | ........... | ........... |

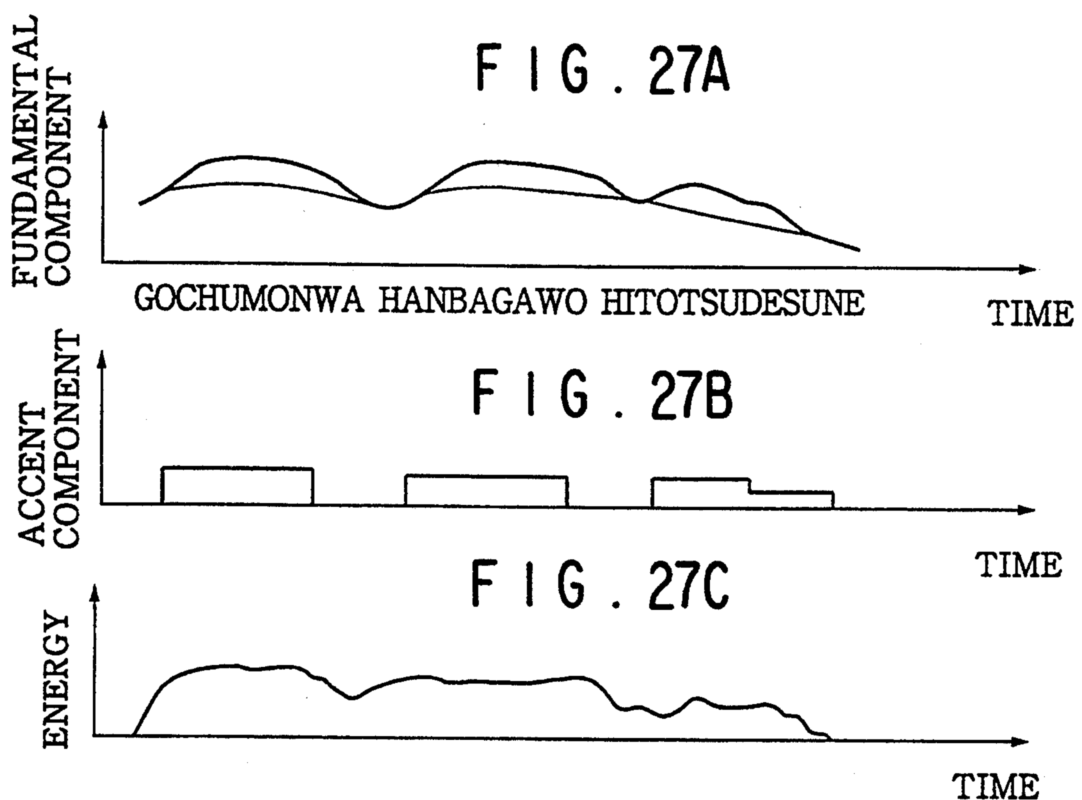
FIG. 27A
FUNDAMENTAL COMPONENT
GOCHUMONWA HANBAGAWO HITOTSUDESUNE
TIME
FIG. 27B
ACCENT COMPONENT
TIME
FIG. 27C
ENERGY
TIME
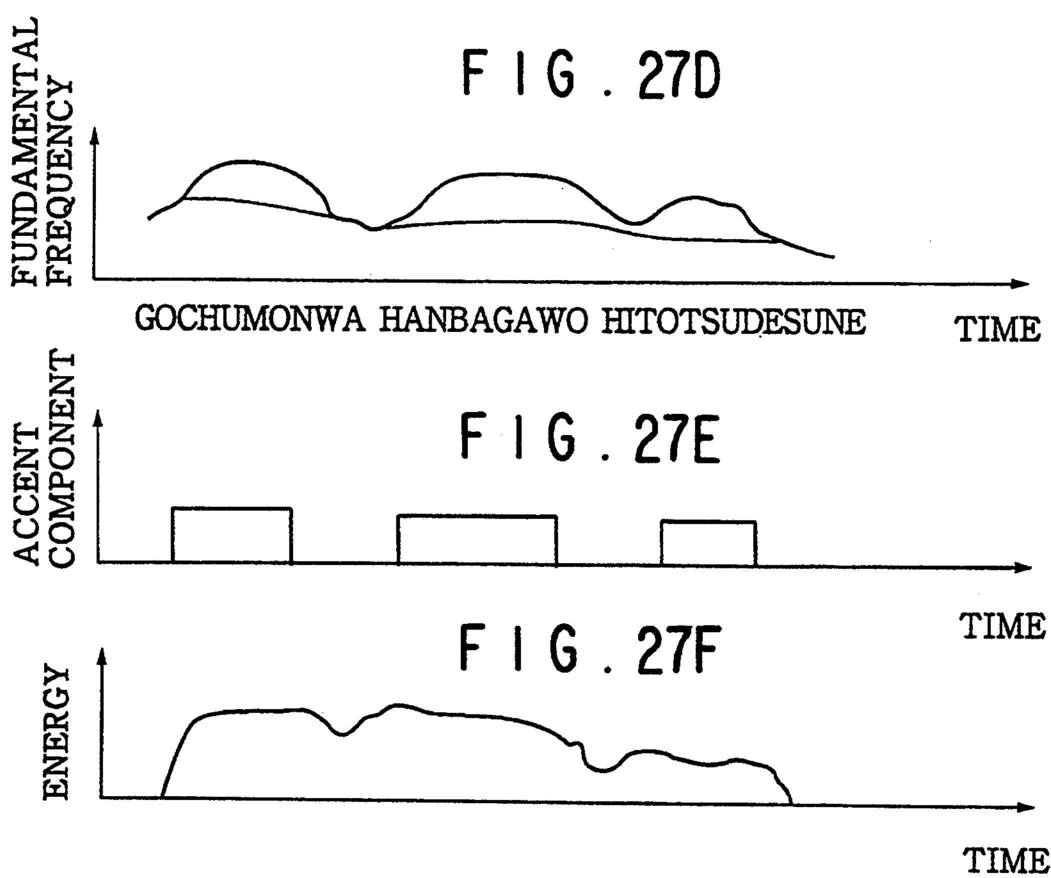
FIG. 27D
FUNDAMENTAL FREQUENCY
GOCHUMONWA HANBAGAWO HITOTSUDESUNE
TIME
FIG. 27E
ACCENT COMPONENT
TIME
FIG. 27F
ENERGY
TIME

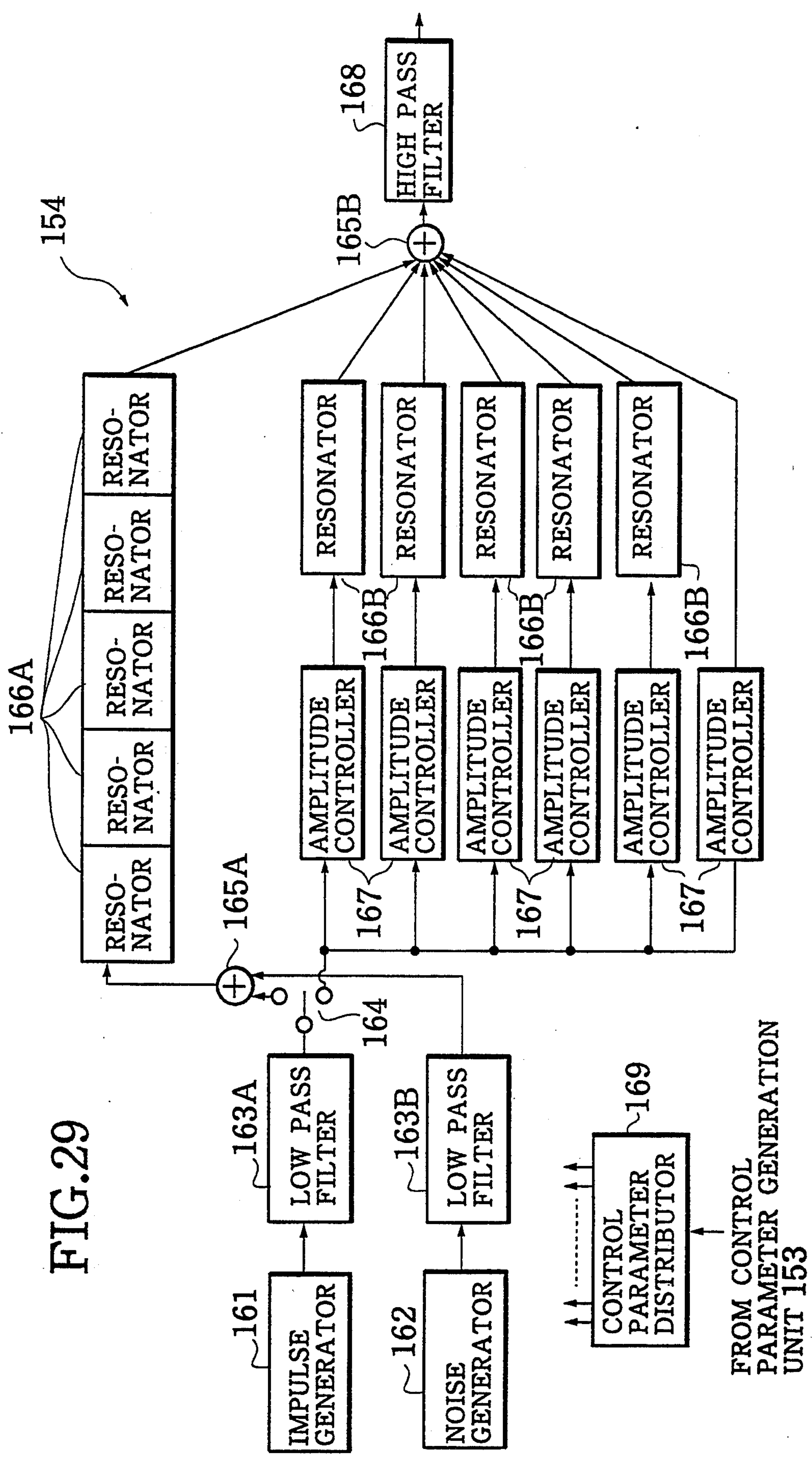
FIG.29
154
166A
RESO-NATOR
RESO-NATOR
RESO-NATOR
RESO-NATOR
RESO-NATOR
165A
165B
168
HIGH PASS FILTER
RESONATOR
RESONATOR
RESONATOR
RESONATOR
RESONATOR
166B
166B
166B
AMPLITUDE CONTROLLER
AMPLITUDE CONTROLLER
AMPLITUDE CONTROLLER
AMPLITUDE CONTROLLER
AMPLITUDE CONTROLLER
AMPLITUDE CONTROLLER
167
167
167
164
161
IMPULSE GENERATOR
163A
LOW PASS FILTER
162
NOISE GENERATOR
163B
LOW PASS FILTER
169
CONTROL PARAMETER DISTRIBUTOR
FROM CONTROL PARAMETER GENERATION UNIT 153

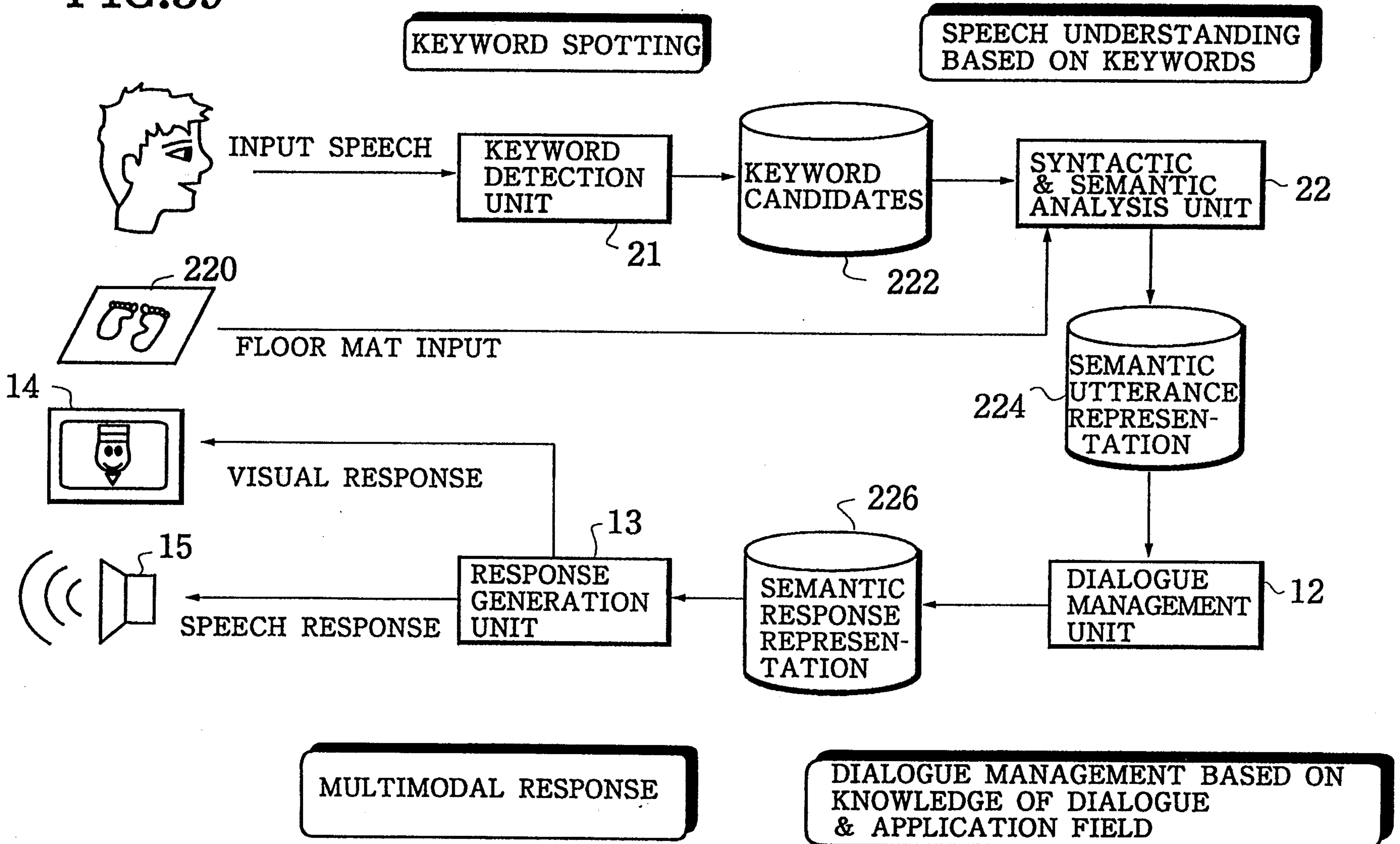
FIG.39
KEYWORD SPOTTING
SPEECH UNDERSTANDING BASED ON KEYWORDS
INPUT SPEECH
KEYWORD DETECTION UNIT
21
KEYWORD CANDIDATES
222
SYNTACTIC & SEMANTIC ANALYSIS UNIT
22
220
FLOOR MAT INPUT
SEMANTIC UTTERANCE REPRESEN-TATION
224
14
VISUAL RESPONSE
226
13
15
RESPONSE GENERATION UNIT
SEMANTIC RESPONSE REPRESEN-TATION
DIALOGUE MANAGEMENT UNIT
12
SPEECH RESPONSE
MULTIMODAL RESPONSE
DIALOGUE MANAGEMENT BASED ON KNOWLEDGE OF DIALOGUE & APPLICATION FIELD

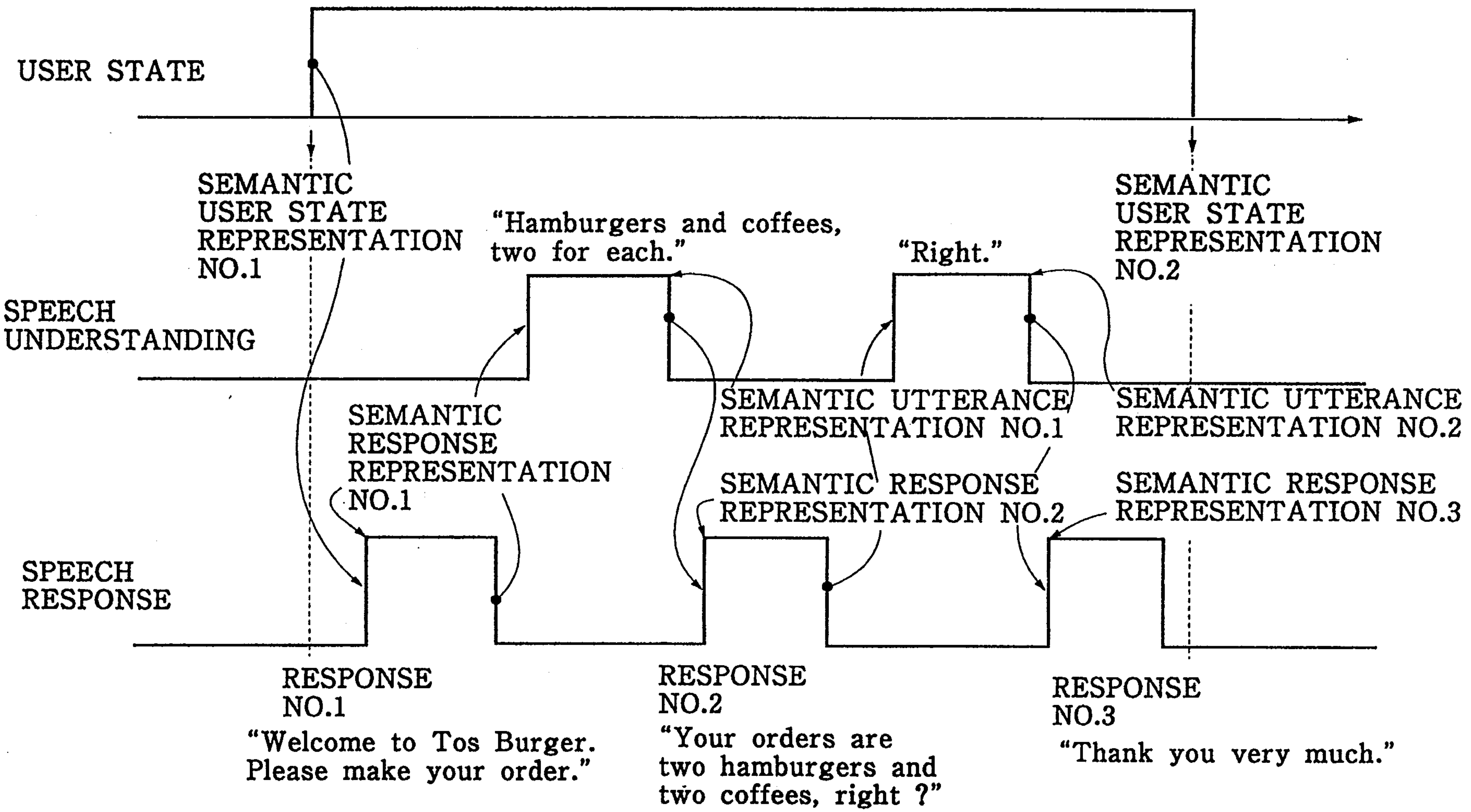
FIG.42
USER STATE
SPEECH UNDERSTANDING
SPEECH RESPONSE
SEMANTIC USER STATE REPRESENTATION NO.1
"Hamburgers and coffees, two for each."
"Right."
SEMANTIC USER STATE REPRESENTATION NO.2
SEMANTIC RESPONSE REPRESENTATION NO.1
SEMANTIC UTTERANCE REPRESENTATION NO.1
SEMANTIC UTTERANCE REPRESENTATION NO.2
SEMANTIC RESPONSE REPRESENTATION NO.2
SEMANTIC RESPONSE REPRESENTATION NO.3
RESPONSE NO.1
"Welcome to Tos Burger. Please make your order."
RESPONSE NO.2
"Your orders are two hamburgers and two coffees, right ?"
RESPONSE NO.3
"Thank you very much."

USER STATE
SPEECH UNDERSTANDING
SPEECH RESPONSE
"Hamburgers and coffee, two for each."
SEMANTIC RESPONSE REPRESENTATION NO.1
SEMANTIC RESPONSE REPRESENTATION NO.3
SEMANTIC RESPONSE REPRESENTATION NO.4
"Welcome to Tos Burger. Please make your order."
"Your orders are two hamburgers and two coffees, right ?"
"Thank you for coming to Tos Burger."

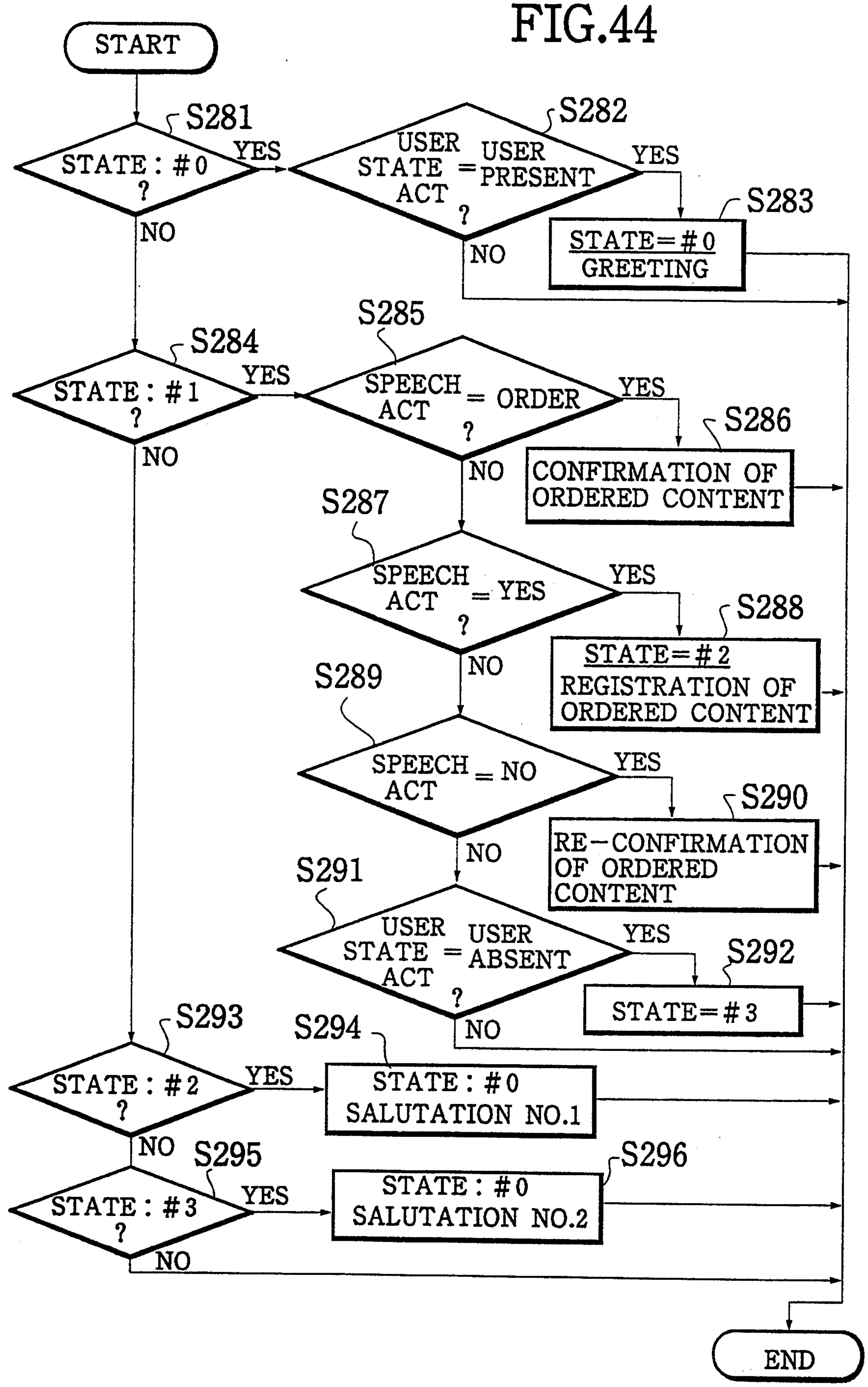
FIG.44
START
S281
STATE : #0 ?
YES
NO
S282
USER STATE ACT = USER PRESENT ?
YES
NO
S283
STATE=#0
GREETING
S284
STATE : #1 ?
YES
NO
S285
SPEECH ACT = ORDER ?
YES
NO
S286
CONFIRMATION OF ORDERED CONTENT
S287
SPEECH ACT = YES ?
YES
NO
S288
STATE=#2
REGISTRATION OF ORDERED CONTENT
S289
SPEECH ACT = NO
YES
NO
S290
RE-CONFIRMATION OF ORDERED CONTENT
S291
USER STATE ACT = USER ABSENT ?
YES
NO
S292
STATE=#3
S293
STATE : #2 ?
YES
NO
S294
STATE : #0
SALUTATION NO.1
S295
STATE : #3 ?
YES
NO
S296
STATE : #0
SALUTATION NO.2
END

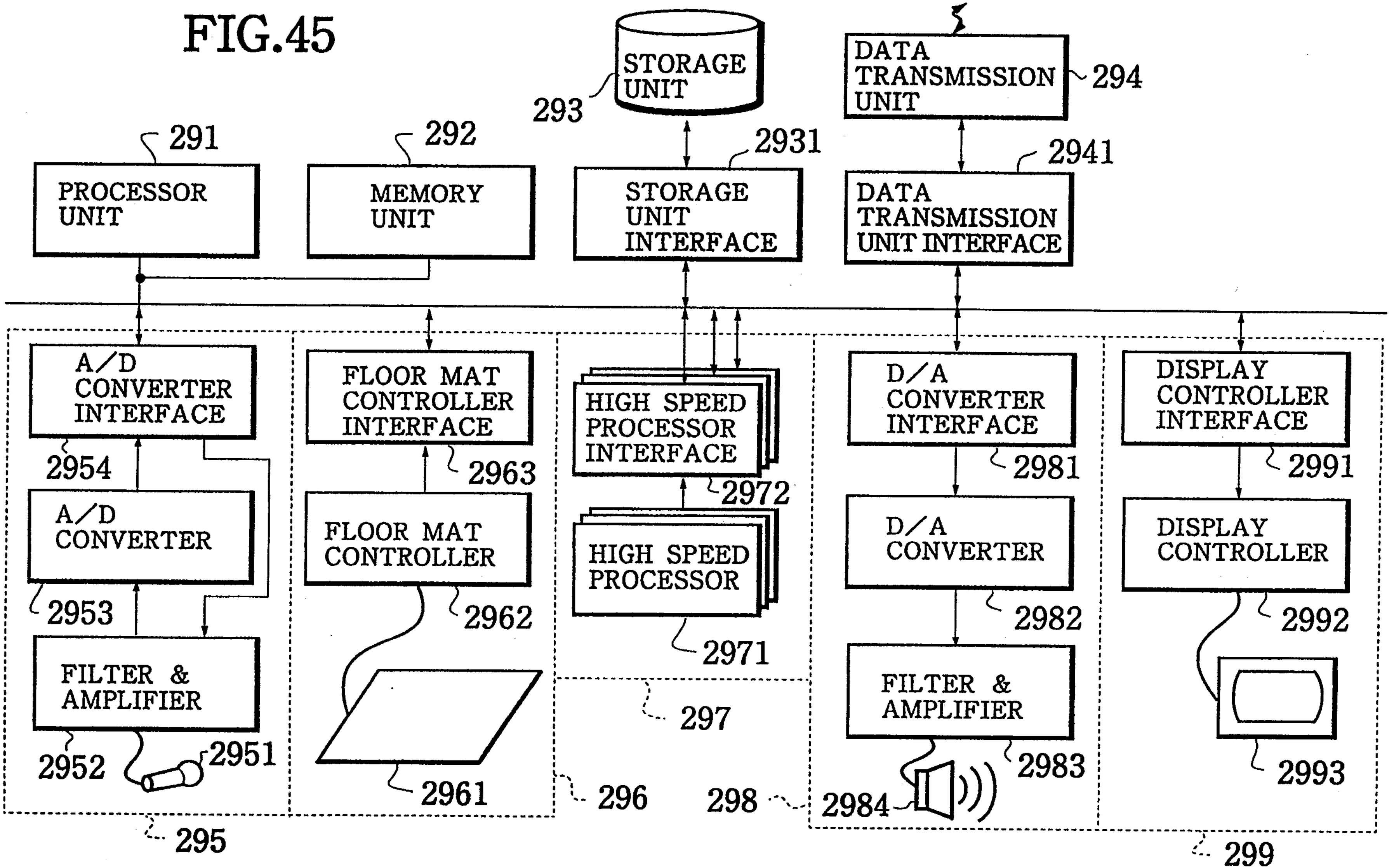
FIG.45
PROCESSOR UNIT
291
MEMORY UNIT
292
STORAGE UNIT
293
STORAGE UNIT INTERFACE
2931
DATA TRANSMISSION UNIT
294
DATA TRANSMISSION UNIT INTERFACE
2941
A/D CONVERTER INTERFACE
2954
A/D CONVERTER
2953
FILTER & AMPLIFIER
2952
2951
295
FLOOR MAT CONTROLLER INTERFACE
2963
FLOOR MAT CONTROLLER
2962
2961
296
HIGH SPEED PROCESSOR INTERFACE
2972
HIGH SPEED PROCESSOR
2971
297
D/A CONVERTER INTERFACE
2981
D/A CONVERTER
2982
FILTER & AMPLIFIER
2983
2984
298
DISPLAY CONTROLLER INTERFACE
2991
DISPLAY CONTROLLER
2992
2993
299

SPEECH DIALOGUE SYSTEM FOR FACILITATING IMPROVED HUMAN-COMPUTER INTERACTION

BACKGROUND OF THE INVENTION

1. Field of the Invention

The present invention relates to a speech dialogue system for realizing an interaction between a computer based system and a human speaker by utilizing various input and output techniques such as speech recognition and speech synthesis.

2. Description of the Background Art

In recent years, it has become possible to realize a so called human-computer interaction in various forms by inputting, outputting and processing multi-media such as characters, speech, graphics, and images.

In particular, in conjunction with a significant improvement in the capacities of a computer and a memory device, various applications of a work station and a personal computer which can handle the multi-media have been developed. However, such a conventional workstation or personal computer is only capable of handling various media separately and does not realize any coordination of the various media employed.

Meanwhile, it has become popular to use linguistic data of characters instead of the numerical data ordinarily used in a conventional computer.

As for the visual data, a capacity to handle the monochromatic image data ordinarily used in a conventional computer is expanded to deal with color images, animated images, three dimensional graphic images, and dynamic images.

As for the audio data, in addition to a conventionally used technique for handling speech signal levels, progress has been made to develop various other techniques such as a speech recognition and a speech synthesis, but these techniques are still too unstable to realize any practical applications except in some very limited fields.

Thus, for various types of data to be used in a computer based system such as character data, text data, speech data, and graphic data, there is a trend to make progress from a conventional input and output (recording and reproduction) functions to the understanding and generation functions. In other words, there is progress toward the construction of a dialogue system utilizing the understanding and generation functions for various media such as speech and graphics for the purpose of realizing more natural and pleasant human-computer interaction, by dealing with the content, structure, and meaning expressed in the media rather than the superficial manipulation of the media.

As for speech recognition, the development has been made from an isolated word recognition toward continuous word recognition and continuous speech recognition, primarily in specific task oriented environments accounting for the practical implementations. In such a practical application, it is more important for the speech dialogue system to understand the content of the speech rather than to recognize the individual words, and there has been a progress of a speech understanding system utilizing the specialized knowledge of the application field on a basis a keyword spotting technique.

On the other hand, as for speech synthesis, the development has been made From a simple text-to-speech system toward a speech synthesis system suitable for a speech dialogue system in which a greater weight is given to the intonation.

However, the understanding and the generation of media such as speech are not so simple as the ordinary input and output of data, so that errors or loss of information at a time of conversion among the media are inevitable. Namely, the speech understanding is a type of processing which extracts the content of the speech and the intention of the human speaker from the speech pattern data expressed in enormous data size, so that it is unavoidable to produce the speech recognition error or ambiguity in a process of compressing the data.

Consequently, it is necessary For the speech dialogue system to actively control the dialogue with the human speaker to make it progress as natural and efficient as possible by issuing appropriate questions and confirmations From the system side, so as to make up for the incompleteness of the speech recognition due to the unavoidable recognition error or ambiguity.

Now, in order to realize a natural and efficient dialogue with a human speaker, it is important for the speech dialogue system to be capable of conveying as much information on the state of the computer as possible to the human speaker. However, in a conventional speech dialogue system, the speech response is usually given by a mechanical voice reading of a response obtained by a text composition without any modulation of speech tone, so that it has often been difficult for the user to hear the message, and the message has been sometimes quite redundant. In the other types of a conventional speech dialogue system not using the speech response, the response From the system has usually been given only as a visual information in terms of text, graphics, images, icons, or numerical data displayed on a display screen, so that the human-computer dialogue has been heavily relying upon the visual sense of the user.

As described, in a conventional speech dialogue system, a sufficient consideration has not been given to the use of the various media in the response from the system for the purpose of making up the incompleteness of the speech recognition, and this has been the critical problem in the practical implementation of the speech recognition technique.

In other words, the speech recognition technique is associated with an instability due to the influence of the noises and unnecessary utterances by the human speaker, so that it is often difficult to convey the real intention of the human speaker in terms of speech, and consequently the application of the speech recognition technique has been confined to the severely limited Field such as a telephone in which only the speech media is involved.

Thus, the conventional speech dialogue system has been a simple combination of the separately developed techniques related to the speech recognition, speech synthesis, and image display, and the sufficient consideration from a point of view of the naturalness and comfortableness of speech dialogue has been lacking.

More precisely, the conventional speech dialogue system has been associated with the essential problem regarding the lack of the naturalness due to the instability of the speech recognition caused by the recognition error or ambiguity, and the insufficient speech synthesis function to convey the feeling and intent resulting from the insufficient intonation control and the insufficient clarity of the speech utterance.

Moreover, the conventional speech dialogue system also lacked the sufficient function to generate the appropriate response on a basis of the result of the speech recognition.

Furthermore, there is an expectation for the improvement of the information transmission function by utilizing the image display along with the speech response, but the exact manner of using the two dimensional or three dimensional image displays in relation to the instantaneously and continuously varying speech response remains as the unsolved problem.

Also, it is important to determine what should be displayed in the speech dialogue system utilizing various other media.

SUMMARY OF THE INVENTION

It is therefore an object of the present invention to provide a speech dialogue system capable of realizing natural and smooth dialogue between the system and a human user, and easy maneuverability of the system.

According to one aspect of the present invention there is provided a speech dialogue system comprising: speech understanding means for understanding a semantic content of an input speech from a user; dialogue management means for making a semantic determination of a response output content according to the semantic content of the input speech understood by the speech understanding means; response generation means for generating a speech response and a visual response according to the response output content determined by the dialogue management means; and output means for outputting the speech response and the visual response generated by the response generation means to the user.

According to another aspect of the present invention there is provided a method of speech dialogue between a human user and a speech dialogue system, comprising the steps of: understanding a semantic content of an input speech from a user; making a semantic determination of a response output content according to the semantic content of the input speech understood at the understanding step; generating a speech response and a visual response according to the response output content determined at the making step; and outputting the speech response and the visual response generated at the generating step to the user.

According to another aspect of the present invention there is provided a speech dialogue system comprising: speech understanding means for understanding a semantic content of an input speech from a user; response output means for outputting a system response according to the semantic content of the input speech understood by the speech understanding means; and dialogue management means for managing the dialogue between the user and the system by controlling transitions between user states in which the input speech is to be entered into the speech understanding means and system states in which the system response is to be outputted from the response output means.

According to another aspect of the present invention there is provided a speech dialogue system, comprising: speech understanding means for understanding a semantic content of an input speech from a user by detecting keywords in the input speech; dialogue management means for limiting the keywords to be detected in the input speech by the speech understanding means in advance, according to a state of a dialogue between the user and the system; and response output means for outputting a system response according to the semantic content of the input speech understood by the speech understanding means.

Other features and advantages of the present invention will become apparent from the following description taken in conjunction with the accompanying drawings.

BRIEF DESCRIPTION OF THE DRAWINGS

FIG. 3 is an illustration of an example of a keyword lattice obtained from a continuous input speech in the speech understanding unit of FIG. 2.

FIG. 4 is an illustration of an example of a semantic utterance representation to be obtained by the speech understanding unit of FIG. 2.

FIG. 5 is an illustration of an exemplary list of keywords to be used in the speech understanding unit of FIG. 2.

FIG. 6 is an illustration of an example of a semantic response representation to be obtained by a dialogue management unit in the speech dialogue system of FIG. 1.

FIG. 7 is an illustration of an order table to be used in a dialogue management unit in the speech dialogue system of FIG. 1.

FIG. 8 is an illustration of a past order table to be used in a dialogue management unit in the speech dialogue system of FIG. 1.

FIGS. 12A and 12B are illustrations of examples of a semantic response representation and an order table for an exemplary case of the operation in a dialogue management unit in the speech dialogue system of FIG. 1.

FIG. 12C is an illustration indicating an exemplary dialogue between the system and the user in an exemplary case of the operation in a dialogue management unit in the speech dialogue system of FIG. 1.

FIGS. 12D and 12E are illustrations of examples of two semantic utterance representation candidates for an exemplary case of the operation in a dialogue management unit in the speech dialogue system of FIG. 1.

FIG. 13 is a flow chart for an operation in a user state in an exemplary case of the operation in a dialogue management unit in the speech dialogue system of FIG. 1 using the examples shown in FIGS. 12A to 12E.

FIG. 14 is a flow chart for an operation in a system state in an exemplary case of the operation in a dialogue management unit in the speech dialogue system of FIG. 1.

FIGS. 15A, 15B and 15E are illustrations of examples of a semantic utterance representation, a response act list, and a semantic response representation for an exemplary case of the operation in a dialogue management unit in the operation shown in the flow chart of FIG. 14.

FIG. 16 is an illustration of a table summarizing system responses for various cases in the speech dialogue system of FIG. 1.

FIG. 20 is an illustration of an example of a human character image information to be used in the response generation unit of FIG. 19.

FIG. 21 is an illustration of examples of a response sentence structure to be used in a response sentence generation unit in the response generation unit of FIG. 19.

FIG. 23 is an illustration of a table used in a human character feature determination unit in the response generation unit of FIG. 19.

FIG. 24 is an illustration of a table used in a speech characteristic determination unit in the response generation unit of FIG. 19.

FIGS. 27A–27F are diagrams of a fundamental frequency pattern used in the speech response generation unit of FIG. 25, without and with a modification for generating a such response with a joyful expression.

FIG. 29 is a detailed block diagram of a speech waveform generation unit in the speech response generation unit of FIG. 25.

FIG. 39 is a diagram summarizing an overall operation in the speech dialogue system of FIG. 1.

FIG. 42 is a timing chart for one example of an operation in the speech dialogue system of FIG. 40.

FIG. 44 is a flow chart for an operation in the speech dialogue system of FIG. 40.

FIG. 45 is a schematic block diagram of a third embodiment of a speech dialogue system according to the present invention.

DETAILED DESCRIPTION OF THE PREFERRED EMBODIMENTS

I. FIRST EMBODIMENT

Figure 1:
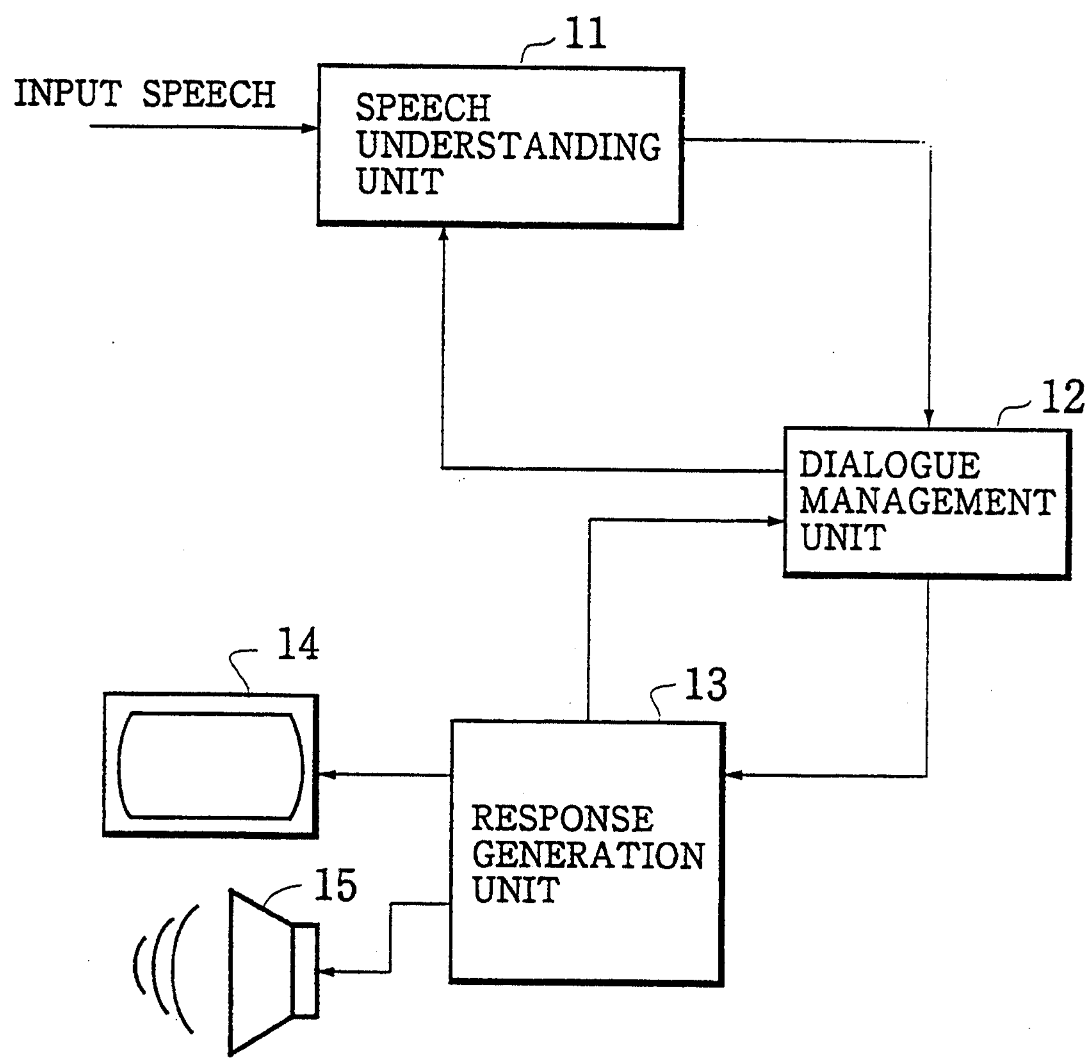
FIG. 1 is a schematic block diagram of a first embodiment of a speech dialogue system according to the present invention.

Referring now to FIG. 1, a first embodiment of a speech dialogue system according to the present invention will be described in detail.

1. Overall System Configuration

In this first embodiment, the speech dialogue system comprises: a speech understanding unit 11 for understanding a semantic content of an input speech uttered by a user; a dialogue management unit 12 for making a semantic determination of a response output content according to the semantic content of the input speech understood by the speech understanding unit; a response generation unit for generating a speech response and a visual response according to the response output content determined by the dialogue management unit; a display unit 14 for outputting the visual response generated by the response generation unit to the user; and a loudspeaker unit 15 for outputting the speech response generated by the response generation unit to the user.

The speech understanding unit 11 is not a simple speech recognition device for only recognizing words or sentences in the input speech, but capable of extracting a semantic content intended to be expressed in the input speech by analyzing the input speech, in a form of a semantic utterance representation as will be described in detail below.

The dialogue management unit 12 makes the semantic determination of the response output content by using a dialogue history, a current dialogue state, a dialogue management procedure, and a knowledge on specialized application field, and supplies the response output content information indicating the appropriate response output to be generated to the response generation unit 13.

In addition, the dialogue management unit 12 achieves the improvement of the speech understanding and the reduction of the processing amount by properly treating the spoken input speech containing elipsis and demonstrative pronouns, so as to enable the natural dialogue between the system and the user.

Moreover, the dialogue management unit 12 supplies the generated response output content information back to the speech understanding unit 11 in order to improve the efficiency of the speech understanding at the speech understanding unit 11 for the subsequent input speech by preliminarily limiting the candidates of the keywords, as well as syntactic and semantic rules to be utilized in the speech understanding, according to the response output content information generated in response to the current input speech, before the subsequent input speech is entered into the speech understanding unit. This preliminary limiting of the keywords and the syntactic and semantic rules is effective in reducing an amount of calculations required in a keyword spotting operation to be used in speech understanding.

Furthermore, the dialogue management unit 12 also supplies the response generation unit 13 with a human character image information indicating a human character image of a human character to deliver the speech response which is to be displayed on the display unit 14 while the speech response is outputted from the loudspeaker unit 15, and a content visualizing image information indicating a content visualizing image for visualizing the content of the speech response for the purpose of assisting the user's comprehension of the response from the system, which is also to be displayed on the display unit 14 while the speech response is outputted from the loudspeaker unit 15.

The response generation unit 13 generates the speech response in a synthesized voice to be outputted from the loudspeaker unit 15 according to the response output content information supplied from the dialogue management unit 12, and the visual response including the text data of the speech response, and the human character image and the content visualizing image to be displayed on the display unit 14 according to the human character image information and the content visualizing image information supplied from the dialogue management unit 12. Here, the human character image to be displayed on the display unit 14 incorporates the movement and the facial expression of the human character which are determined according to the response output content information and the human character image information supplied from the dialogue management unit 12. In other words, the response generation unit 13 generates the multimodal system response incorporating both the audio information and the visual information for supporting the smooth comprehension of the system response by the user, so as to establish the natural dialogue between the user and the system.

In addition, while the generated speech and visual responses are outputted from the response generation unit 13, the response generation unit 13 notifies the dialogue management system 12 that the output of the responses is in progress. In response, the dialogue management unit 12 controls the timings of the speech understanding operation such as the start and end point detection and the keyword spotting for the subsequent input speech which is to be carried out by the speech understanding unit 11, according to this notification from the response generation unit 13, in order to improve the efficiency of the speech understanding at the speech understanding unit 11.

2. Individual System Elements

Now, the further details of the each element in this first embodiment of the speech dialogue system shown in FIG. 1 will be described. In the following description, a case of employing this speech dialogue system to a task of order taking in a fast food store will be used for the sake of definiteness of the description.

2.1 Speech Understanding Unit 11

The speech understanding unit 11 is required to achieve the understanding of the input speech uttered by the user by extracting a semantic content intended to be expressed in the input speech.

In general, the use of speech recognition of the speech uttered by the unspecified user has been contemplated for the specialized applications such as a ticket sale service system, a seat reservation service system, and a bank transaction service system, but such a speech recognition for the unspecified user has been encountering a considerable difficulty in achieving the accurate recognition of the actually spoken sentences because of the different manners of the speech utterance used by different users, the unnecessary words uttered by the user in conjunction with the actual message, the personal variations in the spoken language, and the influence of the background noises.

As a solution to such a difficulty encountered by the speech recognition for the unspecified user, there has been a proposition for the method of continuous speech understanding based on keyword lattice parsing in which the understanding of the semantic content of the continuously uttered speech is achieved by analyzing the keywords detected in the speech, as disclosed in H. Tsuboi and Y. Takebayashi: "A Real-Time Task-Oriented Speech Understanding System using Keyword Spotting", Proceedings of 1992 International Conference on Acoustics, Speech, and Signal Processing (ICASSP 92), 1-197 to 1-200, San Francisco, U.S.A. (March 1992). Under the properly controlled circumstances, this method is capable of achieving the high speed understanding of the almost freely uttered speech by using very little restrictions regarding the manner of speech utterance imposed on the user. Thus, in this first embodiment, this method of continuous speech understanding based on the keyword lattice parsing is employed in the speech understanding unit 11 of FIG. 1. A detailed implementation of the speech understanding unit 11 for realizing this method will now be described.

Figure 2:
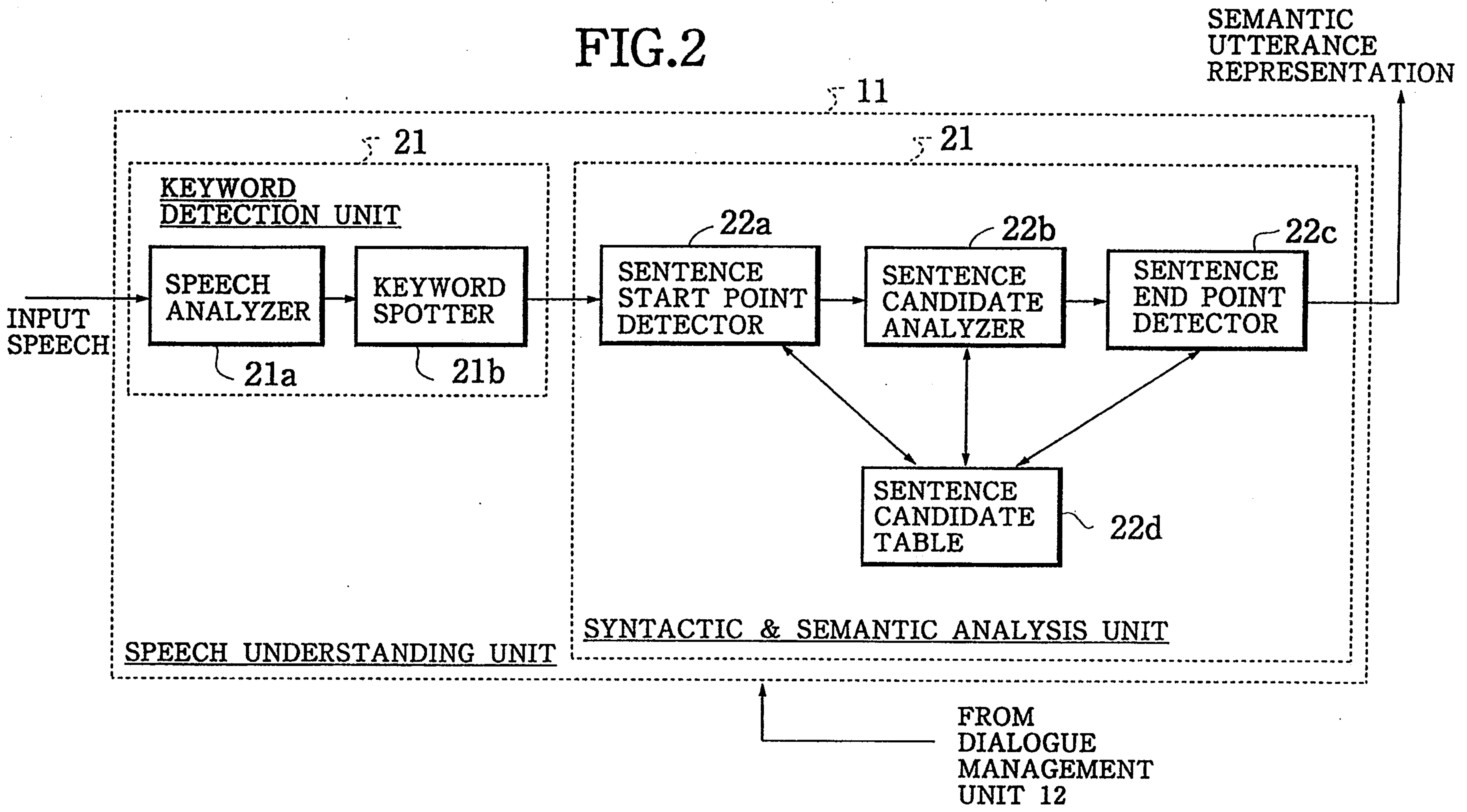
FIG. 2 is a detailed block diagram of a speech understanding unit in the speech dialogue system of FIG. 1.

As shown in FIG. 2, the speech understanding unit 11 of this first embodiment generally comprises a keyword detection unit 21 and a syntactic and semantic analysis unit 22, where the keyword detection unit 21 further comprises the speech analyzer **21*a* and a keyword spotter 21*b*, while the syntactic and semantic analysis unit 22 further comprises a sentence start point detector 22*a*, a sentence candidate analyzer 22*b*, a sentence end point detector 22*c*, and a sentence candidate table 22*d* which is accessible from all of the sentence start point detector 22*a*, the sentence candidate analyzer 22*b*, and the sentence end point detector 22*c***.

The keyword detection unit 21 carries out the keyword spotting operation as follows. First, at the speech analyzer **21*a*, the input speech is passed through a low pass filter (not shown) and A/D converted by using the sampling Frequency of 12 KHz and the 12 bits quantization. Then, at the speech analyzer 21*a*, the spectral analysis and the smoothing in the frequency region after the fast Fourier transformation are carried out to the obtained digital signals, and then the speech analysis result is obtained For each 8 ms by using the 16 channel band pass filter (not shown) after the logarithmic transformation. Then, at the keyword spotter 21*b*, the known keyword spotting procedure is applied to the speech analysis result obtained by the speech analyzer 21*a***.

Here, the known keyword spotting procedure such as that disclosed in Y. Takebayashi, H. Tsuboi, and H. Kanazawa: "A Robust Speech Recognition System using Word-Spotting with Noise Immunity Learning", Proceedings of 1991 International Conference on Acoustics, Speech, and Signal Processing (ICASSP 91), pp. 905–908, Toronto, Canada (May, 1991), can be used, for example.

As a result of this keyword spotting procedure at the keyword spotter 21b, the keyword detection unit 21 obtains the keyword lattice enumerating all the keyword candidates from the continuous input speech. FIG. 3 shows an example of the keyword lattice obtained by the keyword detection unit 21 from the continuous input speech in Japanese equivalent to the English sentence of "Three hamburgers, coffees, and potatoes, please" uttered in Japanese, where the shaded words are the keywords detected in this continuous input speech. Here, it is to be noted that, in this FIG. 3, there is a correspondence between the continuous input speech uttered in Japanese as shown in FIG. 3 and the keywords of the keyword lattice in Japanese equivalents of those shown in FIG. 3, and consequently there is no correspondence between the continuous input speech as shown in FIG. 3 and the keywords of the keyword lattice as shown in FIG. 3. In other words, the keyword lattice shown in FIG. 3 is obtained for the Japanese keywords in the continuous input speech uttered in Japanese, and the English words appearing in the keyword lattice of FIG. 3 are straightforward translations of the Japanese keywords. Consequently, for the continuous input speech of "Three hamburgers, coffees, and potatoes, please" uttered in English, the keyword lattice expressed in English will take the appearance substantially different from that shown in FIG. 3.

Here, it is to be noted that the above described operation of the keyword detection unit 21 can be realized in real time processing by using the DSP boards proposed by the present inventors.

The keyword lattice obtained by the keyword detection unit 21 as described above is then supplied to the syntactic and semantic analysis unit 22 in which each keyword in the keyword lattice is analyzed from left to right, as follows.

First, the sentence candidate start point detector 22a determines whether each keyword can be the start point of a sentence or not according to the prescribed syntactic and semantic rules. When the keyword is determined as capable of being the start point of a sentence, this keyword is registered into the sentence candidate table 22d as a new sentence part candidate.

Next, the sentence candidate analyzer 22b determines whether each keyword registered as a new sentence part candidate by the sentence start point detector 22a can be connected with any other sentence part candidates already registered in the sentence candidate table 22d according to the prescribed syntactic and semantic rules as well as timing conditions. When the new sentence part candidate is determined as capable of being connected with one of the other sentence part candidates, the new sentence part candidate is connected with that one of the other sentence part candidates and the connected sentence part candidate replaces the new sentence part candidate and that one of the other sentence part candidates in the sentence candidate table 22d.

Then, the sentence candidate end point detector 22c determines whether each connected sentence part candidate processed by the sentence candidate analyzer can be regarded as a complete sentence according to the prescribed syntactic and semantic rules. When the connected sentence part candidate is determined as capable of being regarded as a complete sentence, this connected sentence part candidate which has already been analyzed syntactically and semantically is outputted as the semantic utterance representation for the input speech entered at the keyword detection unit 21.

These operations in the syntactic and semantic analysis unit 22 are to be carried out in a pipeline processing mode, so that the syntactic and semantic analysis unit 22 can obtain a plurality of the semantic utterance representations for a single input speech. (See, the aforementioned reference of H. Tsuboi and Y. Takebayashi: "A Real-Time Task-Oriented Speech Understanding System using Keyword Spotting", Proceedings of 1992 International Conference on Acoustics, Speech, and Signal Processing (ICASSP 92), 1–197 to 1–200, San Francisco, U.S.A. (March 1992 for further detail concerning the above described operations of the speech understanding unit 11.)

In this first embodiment, the semantic utterance representation to be obtained by the syntactic and semantic analysis unit 22 is expressed in a frame format A shown in FIG. 4, and as this speech dialogue system is used for a task of order taking in a fast food store, the typical semantic utterance representation to be obtained by the syntactic and semantic analysis unit 22 comprises an ACT frame registering a speech act for indicating a type of ordering made by the input speech, and an ORDER TABLE frame registering an order table for indicating the content of the order made by the input speech.

Here, the speech act registered in the ACT frame indicates any one of the predetermined types of ordering such as "order", "addition". "cancellation", and "replacement". On the other hand, the order table registered in the ORDER TABLE frame indicates the content of the order in a form of an order list having slots for ordered items, ordered sizes, and ordered quantities.

Also, in this first embodiment, as this speech dialogue system is used for a task of order taking in a Fast food store, the keywords to be detected at the keyword detection unit 21 and utilized in obtaining the semantic utterance representation at the syntactic and semantic analysis unit 22 are as enumerated in FIG. 5. It is to be noted here that the keyword listed in FIG. 5 contains different expressions for the identical meaning, such as "YES" and "YEAH", and these semantically equivalent expressions are treated as the same concept in the semantic utterance representation in this speech understanding unit 11. It is in this respect that the speech understanding to be made by the speech understanding unit 11 of this first embodiment is substantially different from the usual speech recognition, and for this reason, the speech understanding unit 11 of this first embodiment is required to be capable of realizing the task oriented speech understanding based on the specialized knowledge of the specific application field.

In addition, at the keyword spotter 21b, the user's speech speed is measured according to the spotted keywords and their start and end points. The measured user's speech speed is subsequently transmitted to the response generation unit 13 in order to control the response speech speed as will be described in detail below.

Furthermore, the speech understanding unit 11 assigns the likelihood for each keyword obtained by the keyword spotting operation, which are subsequently transmitted to the response generation unit 13 in order to determine the speech response pattern as will be described in detail below.

2.2 Dialogue Management Unit 12

The semantic utterance representation such as that shown in FIG. 4 described above is supplied to the dialogue management unit 12, and the dialogue management unit 12 makes the semantic determination of the response output content according to the supplied semantic utterance representation by using a dialogue history, a current dialogue state, a dialogue management procedure, and a knowledge on specialized application field.

The dialogue management unit 12 then supplies the determined response output content information to the response generation unit 13, in a form of a semantic response representation which is expressed in a frame format similar to the semantic utterance representation supplied from the speech understanding unit 11. Namely, as shown in FIG. 6, the semantic response representation to be obtained by the dialogue management unit 12 comprises an ACT frame registering a response act for indicating a type of system response to be made, and an ORDER TABLE frame registering an order table for indicating the content of the response output to be outputted. This semantic response representation of FIG. 6 is for the confirmation of the order made by the user, so that the ACT frame indicates this "confirmation" operation while the ORDER TABLE frame indicates the content of the order made by the input speech.

In this first embodiment, the dialogue management unit 12 separately stores an order table as shown in FIG. 7 and a past order table as shown in FIG. 8. Here, the order table shown in FIG. 7 indicates the content of the order made by the input speech as understood by the system at each moment during the order taking operation, in a form of an order list similar to the ORDER TABLE frame of the semantic response representation, and this order table is to be updated according to the ACT frame and the ORDER TABLE frame of the semantic utterance representation supplied from the speech understanding unit 11. On the other hand, the past order table shown in FIG. 8 indicates the order table at a time of an output of the previous system response, i.e., the content of the order taken up to an output of the previous system response. This past order table of FIG. 8 is utilized as the dialogue history indicative of the change of the order table in the course of the order taking operation.

In addition, the dialogue management unit 12 also determines a dialogue state information indicative of a current state of the dialogue between the user and the system according to the dialogue history and the current system state, which is to be subsequently utilized by the response generation unit 13 as a part of the human character image information.

Thus, the dialogue management unit 12 makes the semantic determination of the response output content according to the supplied semantic utterance representation, the dialogue history indicated by the past order table, and the current dialogue state indicated by the dialogue state information, so as to obtain the response output content in a form of the semantic response representation indicating a type of system response to be made and the content of the response output to be outputted.

Figure 9:
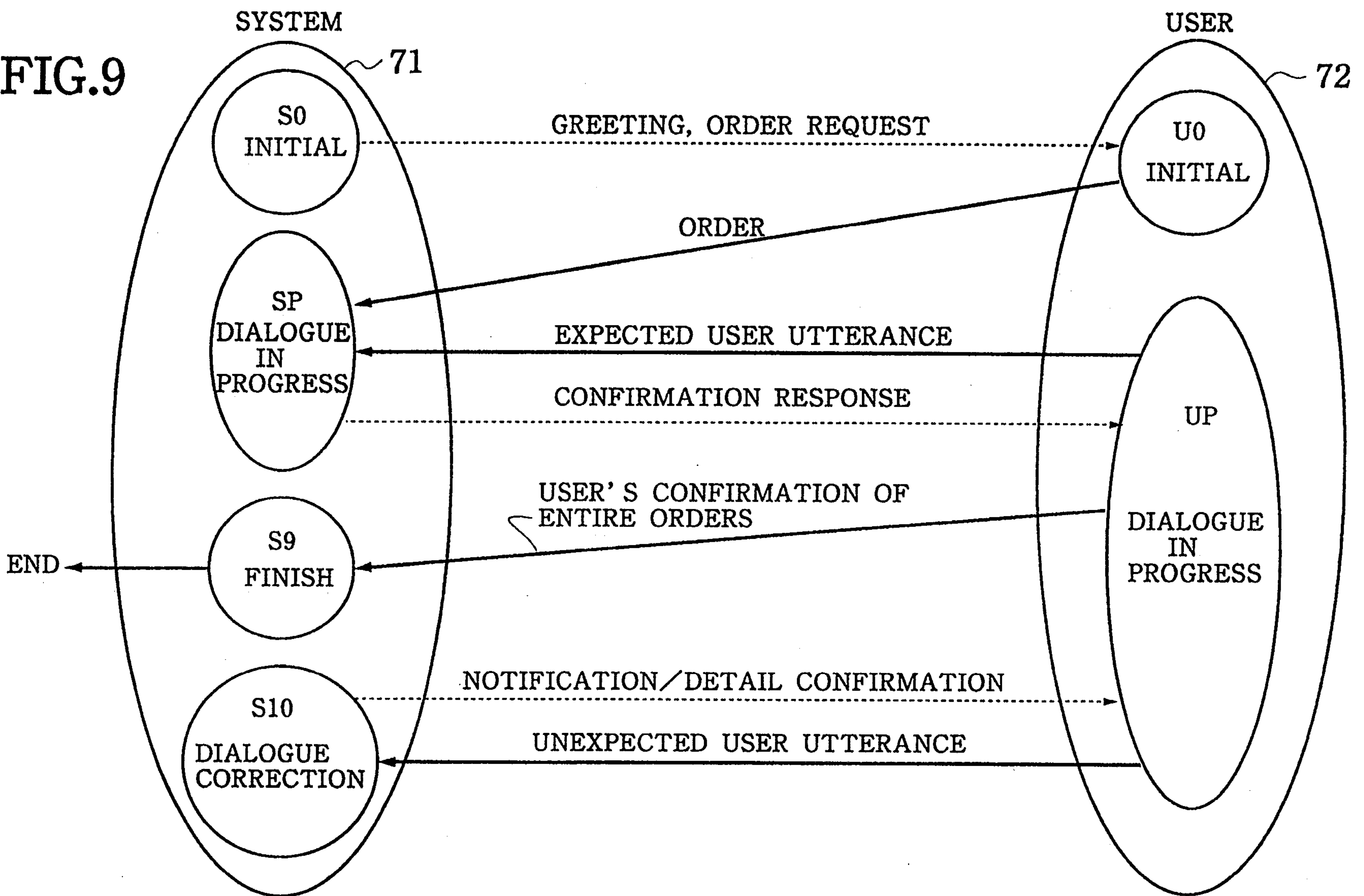
FIG. 9 is a state transition diagram for an operation of a dialogue management unit in the speech dialogue system of FIG. 1.

This dialogue management unit 12 also manages the progress of the dialogue between the system and the user according to the state transition diagram shown in FIG. 9.

Namely, the internal state of the dialogue management unit 12 is classified into two categories of the system state 71 and the user state 72, such that the progress of the dialogue can be managed as the transitions between the system state 71 and the user state 72. In the user state 72, the transition to the system state 71 is made according to the semantic utterance representation obtained from the input speech uttered by the user. On the other hand, in the system state 71, the order table is updated according to the semantic utterance representation supplied from the speech understanding unit 11, and the appropriate semantic response representation is outputted in order to make a further progress in the dialogue, and then the transition to the user state 72 is made. In this manner of managing the progress of the dialogue as the transitions between two states, it becomes possible for the dialogue management unit 12 to realize the flexible management of the dialogue between the system and the user.

Here, the above described dialogue state buffer information is given in terms of a label of a current state in progress, a label of a next state to make a transition from the current state, and a number of repetitions for a repeated part of the dialogue. This dialogue state information will be subsequently utilized by the response generation unit 13 as a part of the human character image information to determine the movement and the facial expression of the human character image to be displayed and the emotional expression and the intonation of the speech response to be outputted.

In the state transition diagram of FIG. 9, first, as the presence of the user is recognized by using a user detection device (not shown) such as a floor mat equipped with a pressure sensor or a monitoring camera, the dialogue starts from the initial system state S0 in which the dialogue management unit 12 outputs the semantic response representation concerning the initial greeting and the request for making an order to the response generation unit 13, and the transition to the initial user state U0 is made. As this transition from the initial system state S0 to the initial user state U0 is made, the order table and the past order table are initialized and the dialogue state information is determined in the dialogue management unit 12. In response to this output of the semantic response representation from the dialogue management unit 12, the response generation unit 13 generates the appropriate response output according to the semantic response representation supplied from the dialogue management unit 12, the dialogue state, the current system state, the dialogue history, and the order table.

At the initial user state U0, when the speech act registered in the ACT frame of the semantic utterance representation supplied from the speech understanding unit 11 indicates "order", the transition to the dialogue in progress system state SP according to a normal order taking procedure. In this case, for the subsequent input speech made by the expected user utterance, the transitions between the dialogue in progress system state SP and the dialogue in progress user state UP are made as many times as necessary in a form of exchanges of the expected user utterances from the user and the corresponding confirmation responses from the system.

On the other hand, when the speech act registered in the ACT frame of the semantic utterance representation supplied from the speech understanding unit 11 indicates something other than "order", the input speech in this case is regarded as an unexpected user utterance, and the transition to the dialogue correction system state S10 is made.

In this case, the dialogue management unit 12 outputs the semantic response representation indicating the appropriate response to notify the reception of the unexpected user utterance or the failure of the proper reception of the user utterance, or the detail confirmation of the ordered items one by one, according to the semantic utterance representation supplied from the speech understanding unit 11, the order table, and the dialogue history. In response to this output of the semantic response representation from the dialogue management unit 12, the response generation unit 13 generates the appropriate response output according to the semantic response representation supplied from the dialogue management unit 12, the dialogue state, the current system state, the dialogue history, and the order table.

Eventually, when the order taking procedure is finished as the user's utterance for the confirmation of the entire orders is received, the transition from the dialogue in progress user state UP to the finish system state S9 is made and the dialogue is terminated.

Figure 10:
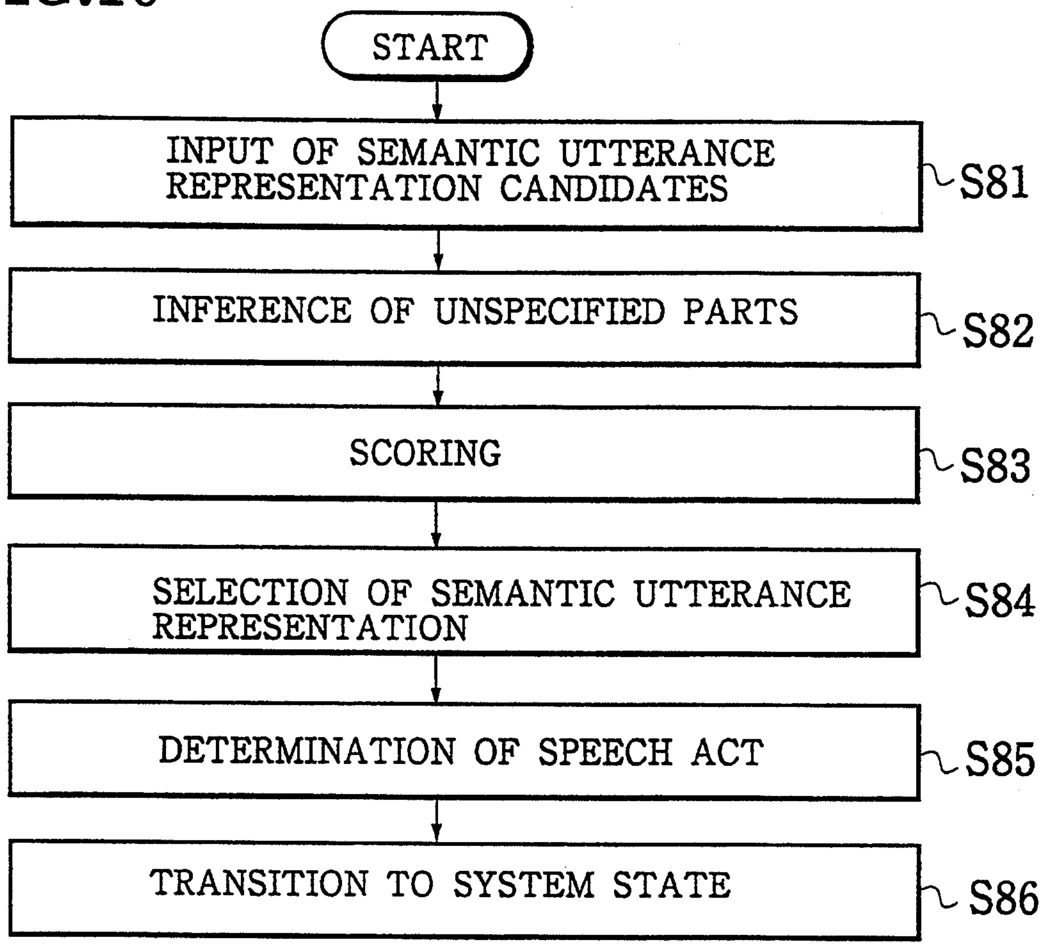
FIG. 10 is a flow chart for an operation in a user state in the state transition diagram of FIG. 9.

In further detail, the operation in the user state 72 is carried out according to the flow chart of FIG. 10 as follows.

Namely, first at the step S81, a plurality of the semantic utterance representation candidates are entered from the speech understanding unit 11. Then, at the step S82, the inference of the unspecified parts in the semantic utterance representation candidates entered at the seep S81 is carried out by using the previously obtained semantic response representation.

Then, at the step S83, the scoring for evaluating the likelihood of each of the semantic utterance representation candidates is made, and at the step S84, one of the semantic utterance representation candidates with the highest score is selected as the semantic utterance representation.

Then, at the step S85, the appropriate speech act to be registered in the ACT frame of the semantic utterance representation selected at the step S84 is determined, and at the step S86, the transition to the system state is made according to the appropriate speech act determined at the step S85.

Figure 11:
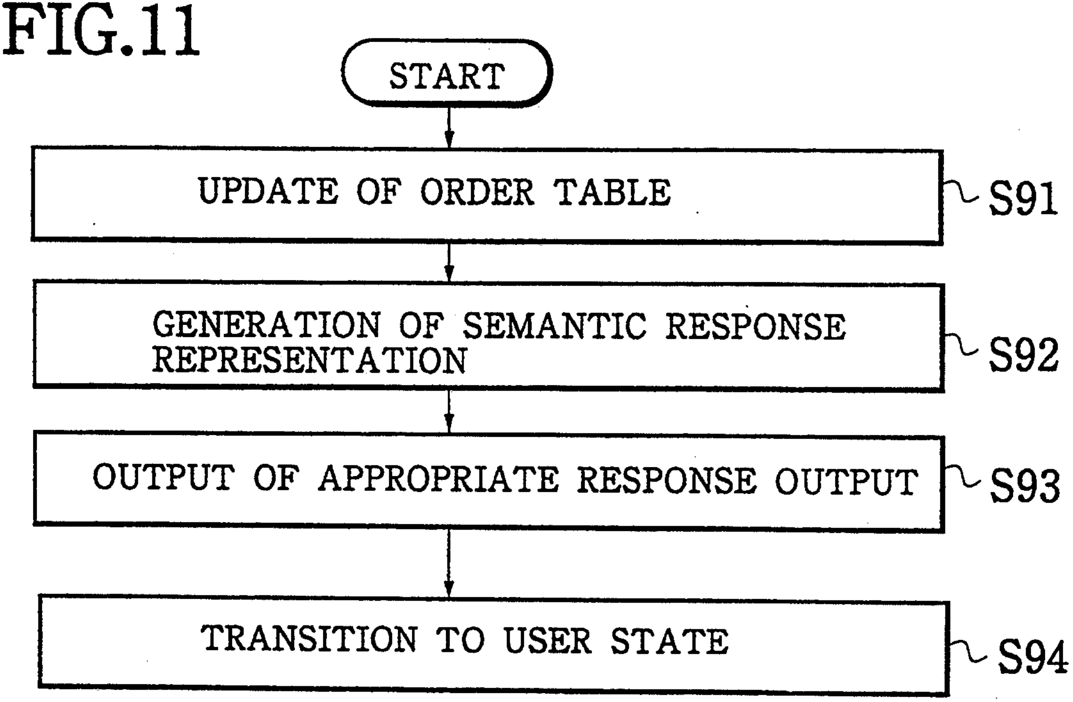
FIG. 11 is a flow chart for an operation in a system state in the state transition diagram of FIG. 9.

On the other hand, the operation in the system state 71 is carried out according to the flow chart of FIG. 11 as follows.

Namely, first at the step S91, the order table is updated according to the semantic utterance representation supplied from the speech understanding unit 11, and at the step S92, the semantic response representation is generated according to the current system state.

Then, at the step S93, the appropriate response output is outputted from the response generation unit 13, and at the step S94, the transition to the user state 72 is made.

Thus, in this dialogue management unit 12, the flexible management of the dialogue between the system and the user can be realized by utilizing the various information such as the dialogue state, the current system state, and the dialogue history at a time of a transition between the system state 71 and the user state 72.

Now, the above described operation of the dialogue management unit 12 will be illustrated by using a concrete example.

Here, an example to be used is a case in which the dialogue management unit 12 obtained the semantic response representation as shown in FIG. 12A and the order table as shown in FIG. 12B in response to the input speech from the user.

In this case, the multimodal response output is generated such that the speech response for the confirmation message of "Your orders are one hamburger, two coffees, and four large colas, right?" as shown in FIG. 12C is outputted from the loudspeaker unit 15, while the text data of this confirmation message, the human character image to deliver this confirmation message, and the content visualizing image including the pictures of the ordered items accompanied by the numbers indicating the ordered quantities are displayed on the display unit 14.

Then, when the user enters the input speech of "Add one more cola, please." as shown in FIG. 12C in response to this confirmation message, the speech understanding unit 11 obtains two semantic utterance representation candidates No. 1 and No. 2 shown in FIG. 12D and FIG. 12E by carrying out the keyword detection and the keyword lattice parsing as described above.

Here, the semantic utterance representation candidates No. 1 and No. 2 are assigned with the scores D1 and D2, respectively, for indicating their likelihood, and these semantic utterance representation candidates are arranged in an order of the assigned scores. In this example, the semantic utterance representation candidate No. 1 has the ACT frame registering the speech act of "addition" and the ORDER TABLE frame registering the order table of one cola of unspecified size, while the semantic utterance representation candidate No. 2 has the ACT frame registering the speech act of "deletion" and the ORDER TABLE frame registering the order table of two large potatoes.

Then, the process according to the flow chart of FIG. 13 is carried out in the user state as follows.

Namely, for the semantic utterance representation candidate No. 1, first at the step S111, the inference of the unspecified parts is made for the unspecified size of the ordered one cola by looking up the size of the cola specified in the semantic response representation of FIG. 12A, assuming that the size in this additional order is the same as that in the original order.

Then, at the step S112, the consistency of the additional order made by the semantic utterance representation candidate No. 1 is checked by searching out the inconsistency between the order table shown in FIG. 12B and the semantic utterance representation candidate No. 1 shown in FIG. 12D. In this case, there is no inconsistency between the order table shown in FIG. 12B and the semantic utterance representation candidate No. 1 shown in FIG. 12D, so that the score D1 of the semantic utterance representation candidate No. 1 is left unchanged by being updated to a new score D1'=D1.

Similarly, for the semantic utterance representation candidate No. 2, first at the step S113, the inference of the unspecified parts is made. In this example, however, there is no unspecified parts in the semantic utterance representation candidate No. 2, so that the inference is actually not made and the process proceeds to the next step S114.

Then, just as in the step S112, next at the step S114, the consistency of the deletion order made by the semantic utterance representation candidate No. 2 is checked by searching out the inconsistency between the order table shown in FIG. 12B and the semantic utterance representation candidate No. 2 shown in FIG. 12E. In this case, there is an inconsistency between the order table shown in FIG. 12B and the semantic utterance representation candidate No. 2 shown in FIG. 12E in that the deletion of two large potatoes is indicated by the semantic utterance representation candidate No. 2 while there is no potato in the original order table. Consequently, the score D2 of the semantic utterance representation candidate No. 2 is updated to a new score $D2'=D2\times\alpha$ ($\alpha<1.0$) which is smaller than the original score D2.

Next, at the step S115, the updated scores D1' and D2' of the semantic utterance representation candidates No. 1 and No. 2 obtained at the steps S112 and S114, respectively, are compared in order to select the semantic utterance representation candidate with the highest score, which is the semantic utterance representation candidate No. 1 in this case as $D1'>D2'$.

Then, at the step S116, the speech act to be registered in the ACT frame of the semantic utterance representation is determined as "addition" according to the selection of the semantic utterance representation candidate No. 1 as the semantic utterance representation at the step S115.

Finally, at the step S117, the transition to the addition confirmation system state SA is made.

In the addition confirmation system state SA, the process according to the flow chart of FIG. 14 is carried out as follows.

Namely, first at the step S121, the addition of one large cola to the order table is made according to the semantic utterance representation for this addition shown in FIG. 15A.

Then, at the step S122, the semantic response representation for outputting a confirmation message for this addition is obtained by selecting an appropriate response act to be registered in the ACT frame from the response act list shown in FIG. 15B. In this case, the "addition confirmation" is selected as the appropriate response act in correspondence to the speech act of "addition" in the semantic utterance representation shown in FIG. 15A, so as to obtain the semantic response representation shown in FIG. 15C.

Then, at the step S123, the appropriate response output is outputted from the response generation unit 13. In this case, the speech response of "Let me confirm. You want to add one large cola, right?" is outputted.

Finally, at the step S124, the transition to the addition confirmation user state UA is made.

The examples of other system speech responses for confirmation operation in cases of the other response acts are enlisted in FIG. 16.

The dialogue management unit 12 outputs the semantic response representation obtained in a manner described above to the response generation unit 13 along with the user's speech speed and the likelihood of each keyword used in the semantic response representation supplied from the speech understanding unit 11.

Figures 17, 18:
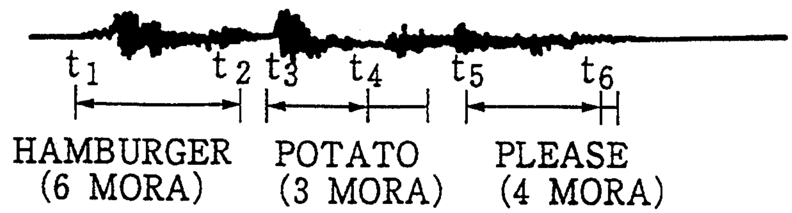
FIG. 17 is an illustration of an input speech signal for explaining a determination of an input speech speed in the speech dialogue system of FIG. 1.
FIG. 18 is an illustration of an example of a semantic response representation supplied from the dialogue management unit to the response generation unit in the speech dialogue system of FIG. 1.

Here, the user's speech speed is obtained as an average number of moras per second as follows. Namely, when the input speech contains three keywords of "hamburger", "potato" and "please" as shown in FIG. 17, the mora numbers of these keywords can be determined 6, 3, and 4, respectively, as indicated in FIG. 17, when these keyword are spotted with the start and end points of t1 and t2, t3 and t4, and t5 and t6, respectively, at the keyword spotter 21*b* in the keyword detection unit 21 of the speech understanding unit 11. Then, from these mora numbers the user's speech speed can be determined as an average number of mora per second for these three keywords given by:

$$(6/(t2-t1)+3/(t4-t3)+4/(t6-t5))/3$$

Thus, the semantic response representation obtained in the dialogue management unit 12 is outputted to the response generation unit 13 along with the user's speech speed and the likelihood of each keyword used in the semantic response representation in a form as shown in FIG. 18.

2.3 Response Generation Unit 13

The response generation unit 13 generates the speech response and the visual response including the text data, the human character image, and the content visualizing image, according to the response output content information supplied from the dialogue management unit 12 including the semantic response representation, the human character image information formed by the dialogue state information and the dialogue history information, and the content visualizing image information supplied from the dialogue management unit 12.

Here, the speech response and the human character image are generated with the speech characteristic and the human character image feature determined according to the semantic response representation and the human character image information supplied from the dialogue management unit 12, so as to take the current state of the dialogue into account. In addition, the content visualizing image visualizing the essential content of the speech response is provided for supporting the smooth comprehension of the system response by the user.

Figure 19:
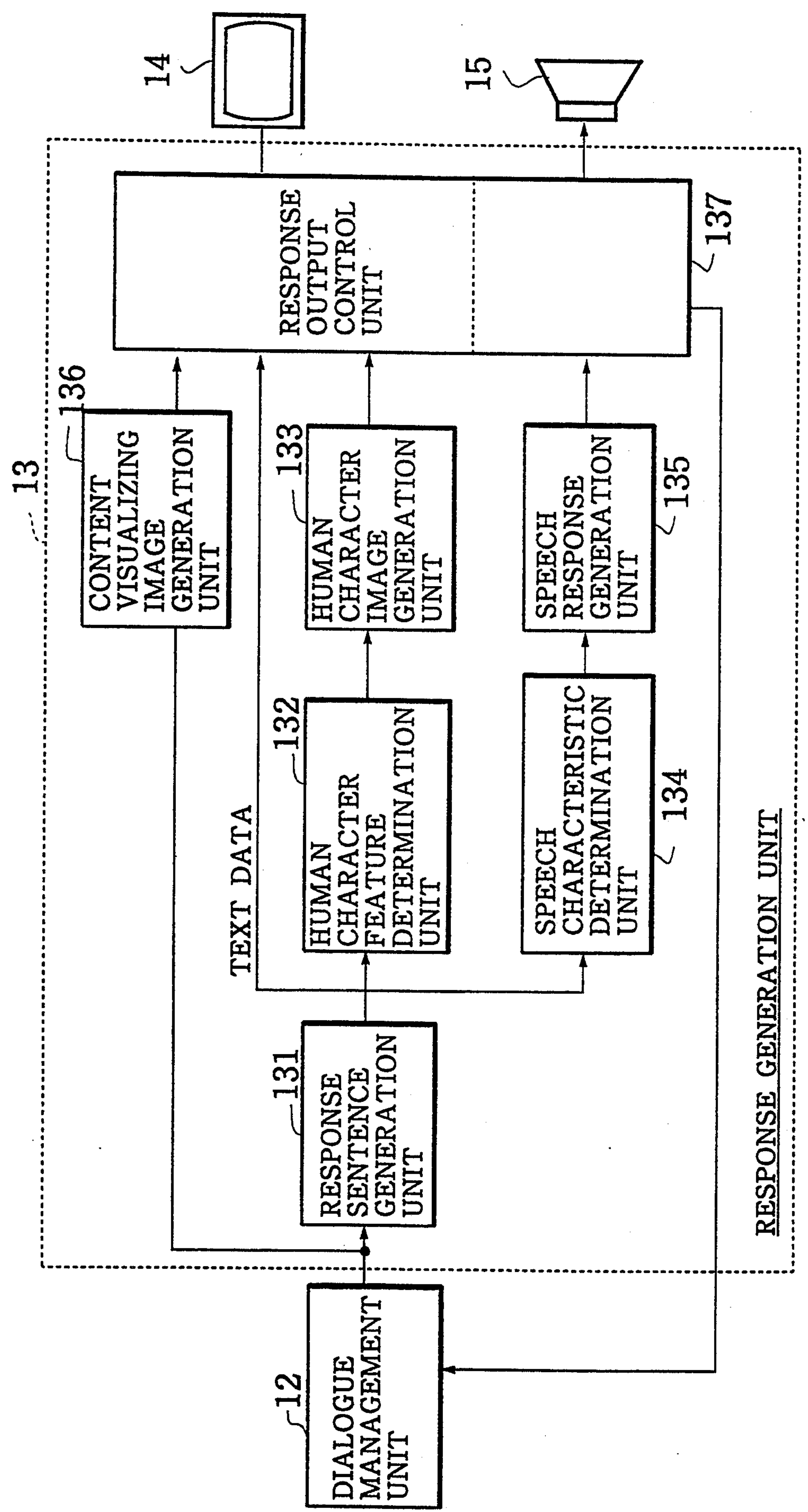
FIG. 19 is a detailed block diagram of a response generation unit in the speech dialogue system of FIG. 1.

In further detail, this response generation unit 13 has a configuration as shown in FIG. 19.

In this configuration of FIG. 19, the response generation unit 13 comprises: a response sentence generation unit 131; a human character feature determination unit 132; a human character image generation unit 133; a speech characteristic determination unit 134; a speech response generation unit 135; a content visualizing image generation unit 136; and a response output control unit 137.

The response sentence generation unit 131 generates the response sentence text data and the response sentence structure data for the speech response according to the semantic response representation and the human character image information supplied from the dialogue management unit 12. The generated response sentence text data and response sentence structure data are supplied to the speech characteristic determination unit 134, while the generated response sentence text data are supplied to the human character feature determination unit 132 and the response output control unit 137.

The human character feature determination unit 132 determines the movement and the facial expression of the human character image to deliver the speech response according to the response sentence text data generated at the response sentence generation unit 131 and the human character image information supplied from the dialogue management unit 12. The determined movement and facial expression of the human character image are supplied to the human character image generation unit 133.

The human character image generation unit 133 generates the human character image to be displayed on the display unit 14 according to the movement and the facial expression of the human character image determined at the human character feature determination unit 132. The generated human character image is supplied to the response output control unit 137.

The speech characteristic determination unit 134 determines the emotional expression and the intonation of the speech response according to the response sentence text data and the response sentence structure data generated at the response sentence generation unit 131, and the human character image information supplied from the dialogue management unit 12. The determined emotional expression and intonation of the response speech are supplied to the speech response generation unit 135.

The speech response generation unit 135 generates the speech response to be outputted from the loudspeaker unit 15 according to the response sentence text data generated at the response sentence generation unit 131 and the emotional expression and the intonation of the speech response determined at the speech characteristic determination unit 134. The generated speech response is supplied to the response output control unit 137.

The content visualizing image generation unit 136 generates the content visualizing image according to the content visualizing image information supplied from the dialogue management unit 12. The generated content visualizing image is supplied to the response output control unit 137.

The response output control unit 137 outputs the received speech response to the loudspeaker unit 15 and the received response sentence text data, human character image, and content visualizing image to the display unit 14, while controlling the output timings for these audio information and visual information.

Here, the semantic response representation supplied from the dialogue management unit 12 contains the "Act" frame indicating the type of the response to be generated at the response generation unit 13, as described above.

The human character image information supplied from the dialogue management unit 12 is indicative of the movement and the facial expression of the human character image to be displayed on the display unit 14 and the emotional expression and the intonation of the speech response to be outputted from the loudspeaker unit 15. In this first embodiment, the human character image information is given in a form shown in FIG. 20, which contains the labels of the system state and the user state at a time the semantic response representation supplied to the response generation unit 13 is generated in the dialogue management unit 12, the number of repetition N for a repeated part of the dialogue such as a part requiring the repeated questioning or confirmation, the emphasizing term in the semantic response representation which is determined by the dialogue management unit 12 to be emphasized in order to urge the firm confirmation to the user, and the likelihood D assigned to the semantic response representation in a process of obtaining the semantic response representation at the dialogue management unit 12 from the semantic utterance representation candidates according to their scores as described above, which is the same as the score assigned to the selected semantic utterance representation and which indicates the likelihood of the semantic response representation to be correct. In FIG. 20, the labels for the system state and the user state such as SP1 and UP3 represents one state in the ensemble of state and user dialogue in progress states SP and UP, respectively, used in FIG. 9 described above.

Now, in further detail, each one of the elements of the response generation unit 18 shown in FIG. 19 operates as follows.

The response sentence generation unit 181 generates the response sentence text data and the response sentence structure data for the speech response by using any one of the method sentence generation using predetermined rewriting rules, the method sentence generation by the blank filling, method of sentence synthesis using tree structures, and the method of sentence synthesis using the semantic structures. In the following, a case of employing the method of sentence generation by the blank filling will be described in detail as an example.

In this case, the generation of the response sentence is achieved by providing a prescribed response sentence pattern having blanks to be filled in for the quantity, size, and item appearing in the semantic response representation, for each "Act" frame entry, as shown in FIG. 21. Then, the filling in of the blanks according to the semantic response representation can be carried out according to the flow chart of FIG. 22A as follows.

First, at the step S141, a variable n for indicating a number of execution of the process is initially set to zero, and at the step S142, a number of items involved in the semantic response representation is set to a variable M. When the semantic response representation shown in FIG. 22B is used, the number set to the variable M is two.

Figures 22A, 22B, 22C, 22D:
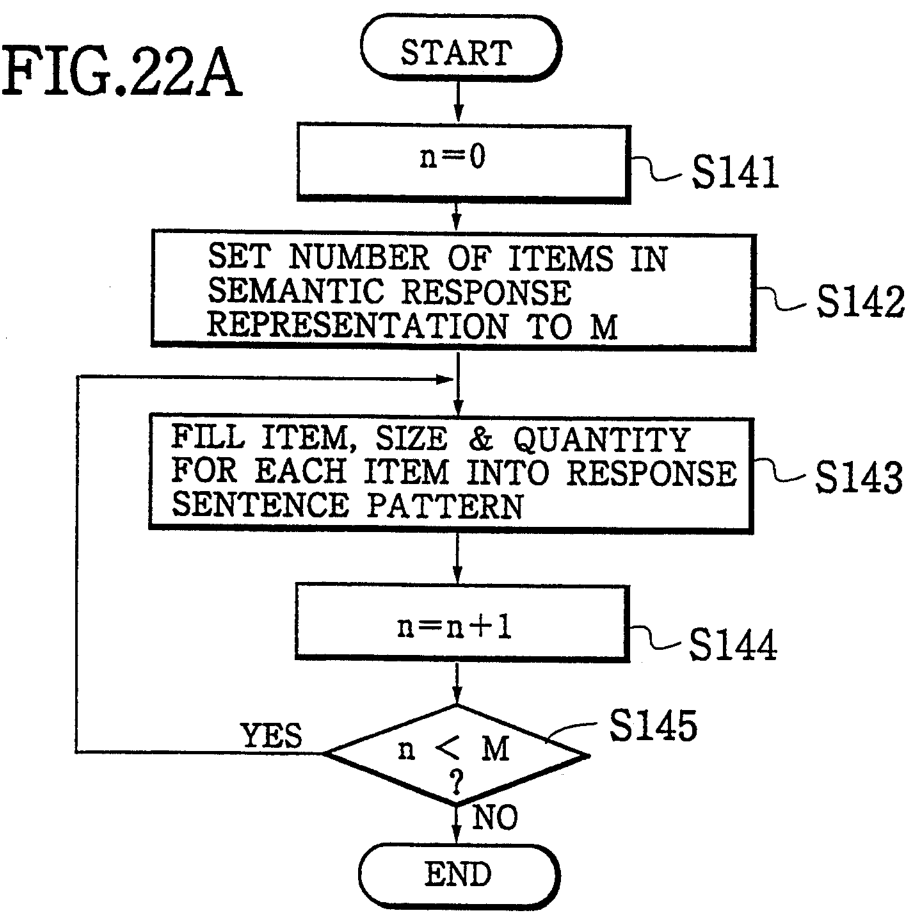
FIG. 22A is a flow chart for an operation of the response sentence generation unit in the response generation unit of FIG. 19.
FIGS. 22B, 22C and 22D are illustrations of exemplary semantic response representation, response sentence structure, and generated response sentence to be used in the response sentence generation unit in the operation shown in the flow chart of FIG. 22A.

Then, at the step S143, the item, size, and quantity for one of the items involved in the semantic response representation are filled into the prescribed response sentence pattern for the "Act" frame entry indicated in the semantic response representation such as that shown in FIG. 22C for the semantic response representation of FIG. 22B.

Then, at the step S144, the variable n is increased by one, and the steps S143 and S144 are repeated until the variable n obtained at the step S144 exceeds the variable M at the step S145.

As a result, for the semantic response representation of FIG. 22B and the response sentence pattern of FIG. 22C, the response sentence of "Let me confirm. Your orders are one large cola and three small potatoes, right?" as shown in FIG. 22D can be obtained.

The human character feature determination unit 132 determines the movement and the facial expression of the human character image to deliver the speech response. Here, the human character feature determination unit 132 has a table as shown in FIG. 23 which contains the labels of the system state and the user state, the number of repetition N, and the likelihood D, which are obtained from the human character image information supplied from the dialogue management unit 12, along with the predetermined type of the human character image indicative of the desired movement of the human character image and the predetermined facial expression of the human character image for each set of the human character image information. For example, the human character image to deliver the speech response for the confirmation in a case of the number of repetition N less than two and the likelihood D not less than 0.7 will have the normal facial expression, and the human character image to deliver the speech response For the confirmation in a case of the number of repetition N less than two and the likelihood D less than 0.7 will have the embarrassed facial expression, while the human character image to deliver the speech response for the confirmation in a case of the number of repetition N greater than two will have the regretful facial expression, and so on.

The human character image generation unit 133 generates the human character image incorporating the movement and the facial expression of the human character image determined at the human character feature determination unit 132 as well as the appropriate control of the display time and the temporal change of the human character image. Here, the human character image incorporates the lip motions in correspondence to the speech response outputted from the loudspeaker unit 15 and the bowing motion in a case of greeting. For this reason, in a case of using the still pictures, a plurality of human character images to be displayed successively are prepared in advance, while in a case of using the animated picture, the animated picture incorporating the appropriate movement and the facial expression is prepared in advance. Also, by using the computer graphics technique, the human character image in any predetermined movement and facial expression can be obtained by specifying the desired movement and facial expression.

The speech characteristic determination unit 134 determines the emotional expression and the intonation of the speech response in correspondence to the movement and the facial expression of the human character image. Here, the speech characteristic determination unit 134 has a table as shown in FIG. 24 which contains the labels of the system state and the user state, the number of repetition N, and the likelihood D, which are obtained from the human character image information supplied from the dialogue management unit 12, along with the predetermined type of the human character image indicative of the desired movement of the human character image to deliver the speech response and the predetermined emotional expression of the speech response for each set of the human character image information.

For example, the speech response for the confirmation in a case of the number of repetition N less than two and the likelihood D not less than 0.7 will have the normal emotional expression, and the speech response for the confirmation in a case of the number of repetition N less than two and the likelihood D less than 0.7 will have the embarrassed emotional expression, while the speech repetition N greater than two will have the regretful emotional expression, and so on. In addition, the emphasizing term in the human character image information shown in FIG. 20 received by the speech characteristic determination unit 134 is also transmitted to the speech response generation unit 135, in order to generate the speech response with the emphasizing term emphasized.

The speech response generation unit 135 generates the desired speech response in a synthesized voice to be outputted from the loudspeaker unit 15. Here, it is preferable for this speech response generation unit 135 to utilize the systematic speech synthesis even though it is also possible to utilize the recorded speech editing.

Figure 25:
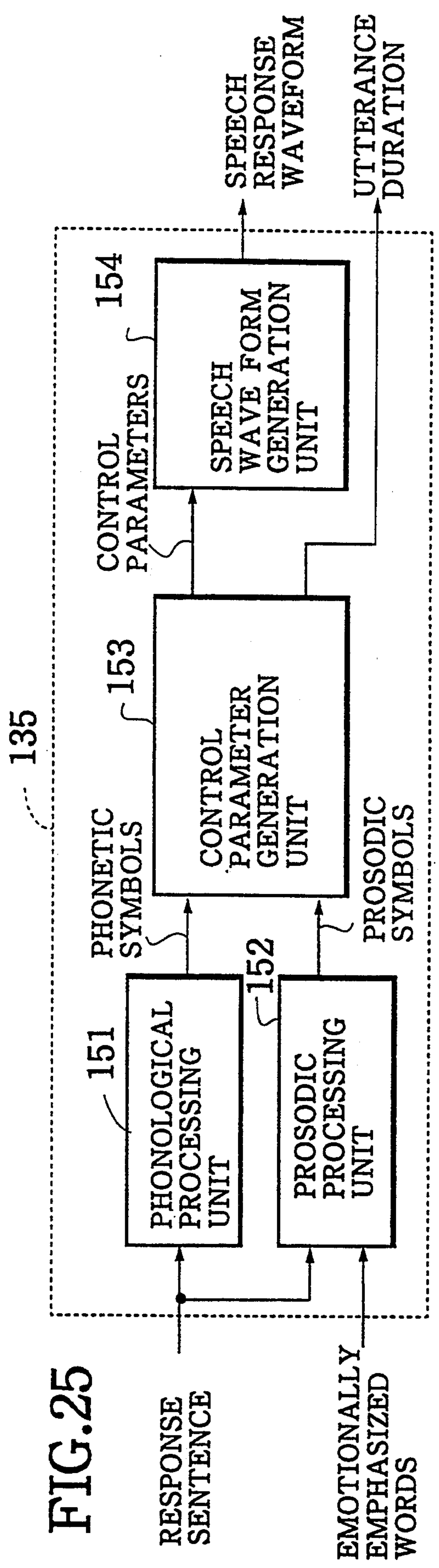
FIG. 25 is a detailed block diagram of a speech response generation unit in the response generation unit of FIG. 19.

In further detail, the speech response generation unit 135 utilizing the speech synthesis has the configuration as shown in FIG. 25, which comprises a phonological processing unit 151, a prosodic processing unit 152, a control parameter generation unit 153, and a speech waveform generation unit 154.

The phonological processing unit 151 determines the aural reading of the response sentence by using the known phonological rules and produces a series of phonetic symbols representing the determined aural reading of the response sentence according to the response sentence text data and the response sentence structure data generated by the response sentence generation unit 131.

The prosodic processing unit 152 determines the prosodic features of the speech response such as the fundamental frequency pattern, power, duration, and pauses, and produces a series of prosodic symbols representing the determined prosodic features according to the response sentence text data and the response sentence structure data generated by the response sentence generation unit 131 and the words to be emphasized in the response sentence and the type of the emotional expression determined by the speech characteristic determination unit 134.

Figure 26:
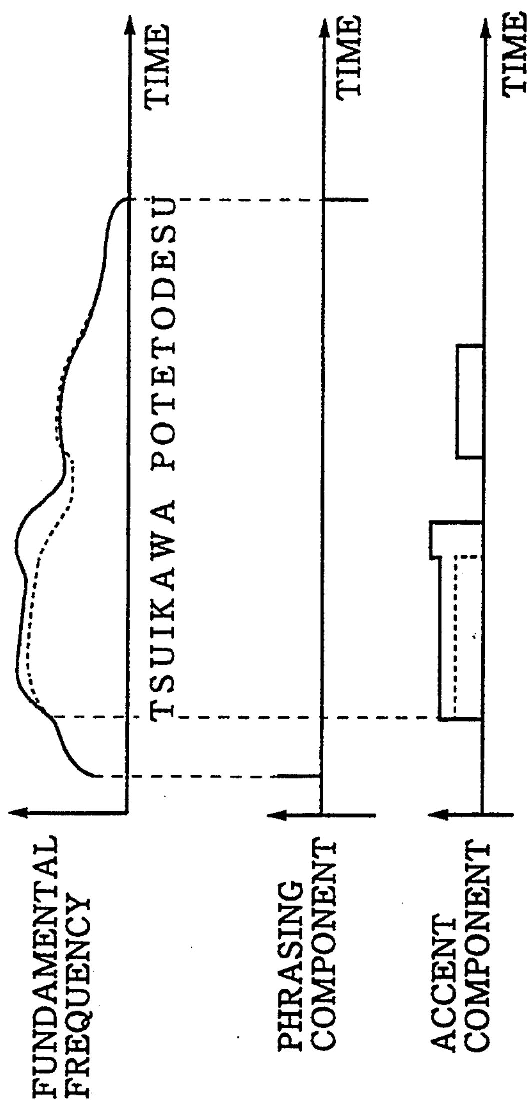
FIG. 26 is a diagram for a fundamental frequency pattern model used in the speech response generation unit of FIG. 25.

Here, the fundamental frequency pattern of the speech response can be determined by memorizing the predetermined sizes of the phrasing component and the accent component for models with and without an emphasis, as shown in FIG. 26, such that the memorized models can be utilized at a time of the speech synthesis. FIG. 26 shows the fundamental Frequency pattern for a Japanese sentence of "Tsuikawa potetodesu" meaning "Addition is a potato.", and a dashed line indicates the model without the emphasis while the solid line indicates the model with the emphasis. In addition, the rules governing the phrasing and the accent may be predetermined for different types of sentences such as declarative sentence, interrogative sentence, and imperative sentence.

It is to be noted that the Fundamental frequency pattern may be controlled differently from that shown in FIG. 26 by using other known methods such as a method using a linear approximation or a method using a pitch level for expressing the fundamental frequency pattern.

The prosodic feature incorporating the emotional expression can be controlled mainly by the rate of change of the fundamental frequency, the dynamic range, the utterance duration, and energy.

Consequently, the speech response with the joyful emotional expression can be obtained from a normal pattern shown in FIGS. 27A–27C by making the accent component to be 1.2 times that of a normal case, the utterance duration to be 0.9 times that of a normal case, and the energy to be 2 dB larger than that of a normal case, as shown in FIGS. 27D–27F, so as to produce the generally faster speech response with each word pronounced more distinctly. Here, FIGS. 27A–27C and FIGS. 27D–27F show the exemplary fundamental frequency patterns for a Japanese sentence of "Gochumonwa hanbagawo hitotsudesune" meaning "Your order is one hamburger, right?" for the normal case and a case with the joyful emotional expression.

Figure 28A:
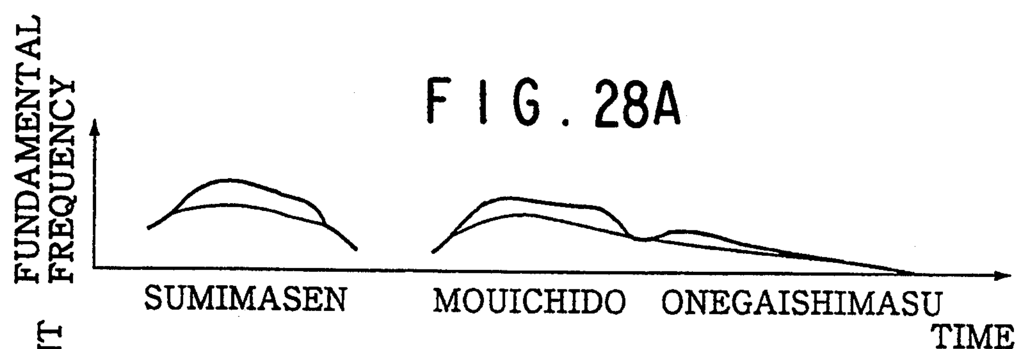
FIGS. 28A–28F are diagrams of a fundamental Frequency pattern used in the speech response generation unit of FIG. 25, without and with a modification for generating a speech response with a regretful expression.
Figure 28B:
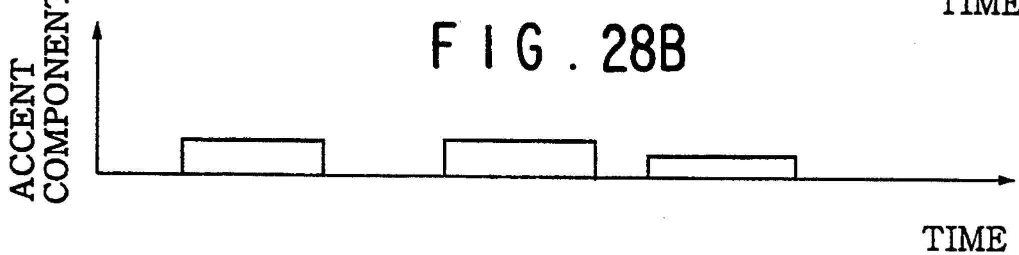
Figure 28C:
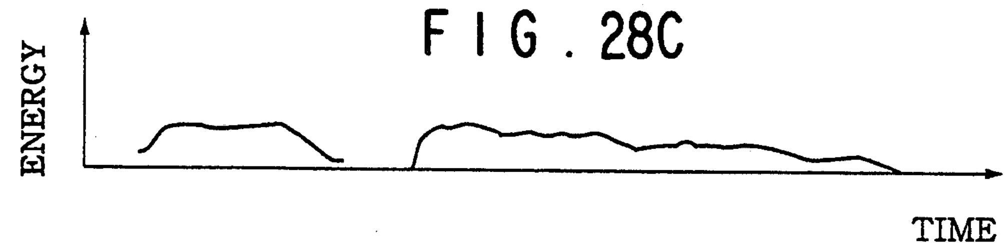
Figure 28D:
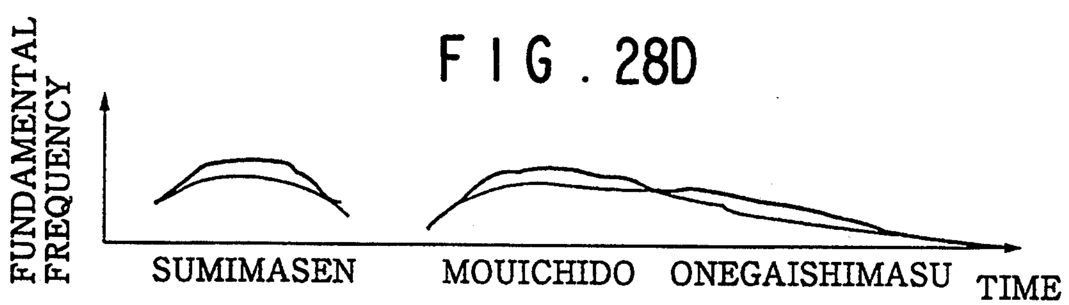
Figure 28E:
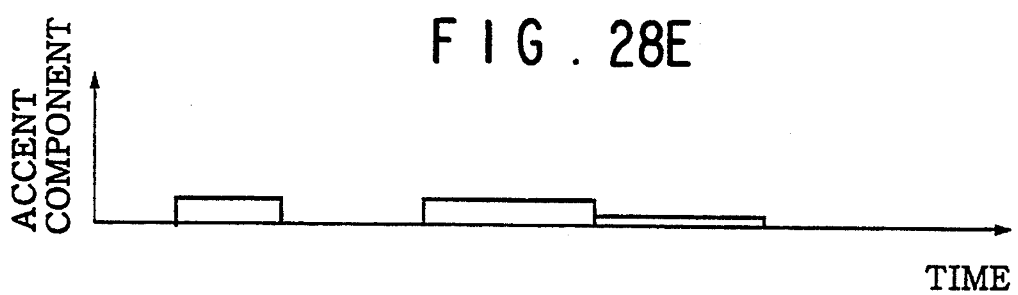
Figure 28F:
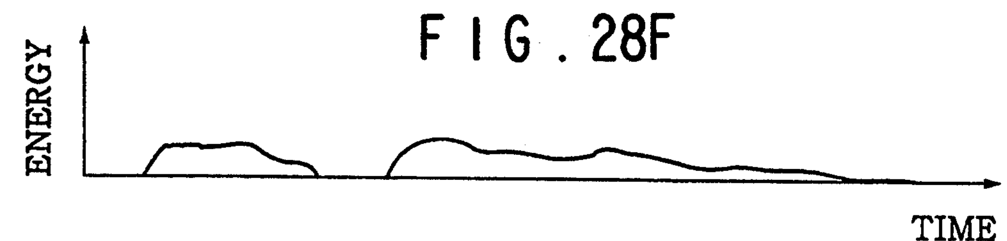

Similarly, the speech response with the regretful emotional expression can be obtained from a normal pattern shown in FIGS. 28A–28C by making the accent component to be 0.9 times that of a normal case, the utterance duration to be 1.1 times that of a normal case, and the energy to be 2 dB smaller than that of a normal case, as shown in FIGS. 28D–28F, so as to produce the generally slower speech response with words pronounced rather depressingly. Here, FIGS. 28A–28C and FIG. 28B show the exemplary fundamental frequency patterns for a Japanese sentence of "Sumimasen Mouichido Onegaishimasu" meaning "I'm sorry. Please say it again" for the normal case and a case with the regretful emotional expression.

The control parameter generation unit 153 determines the control parameters to be used in the speech waveform generation unit 154, according to the phonetic symbols and the prosodic symbols supplied from the phonological processing unit 151 and the prosodic processing unit 152, respectively.

In addition, the control parameter generation unit 153 also supplies the utterance duration to the response output control unit 137 such that the speech speed of the speech response as well as a lip motion of the human character image can be controlled in accordance with the speech speed of the input speech uttered by the user supplied from the dialogue management unit 12 along with the semantic response representation. It is preferable to carry out this speech speed control such that the utterance duration is made shorter when the dialogue is progressing smoothly, while the utterance duration is made longer when the dialogue is not progressing smoothly. Here, the change of the utterance duration can be controlled properly by selecting the appropriate length of the response sentence pattern. For example, the shorter response sentence pattern may be used when the user's speech speed is faster than 9 mora/sec., while the longer and more polite response sentence pattern may be used otherwise.

Moreover, the likelihood of each keyword supplied from the dialogue management unit 12 along the semantic response representation can be reflected in the determination of the response speech pattern as follows. Namely, in a case of making a confirmation for example, the response sentence pattern in a form of a positive confirmation such as "Your orders are two hamburgers, right?" and the response sentence pattern in a form of a question such as "Are your orders two hamburgers?" can be used selectively. For instance, when the average likelihoods of the keywords to be involved in the response sentence is below the predetermined threshold level such as 0.5 and when one of the keywords to be involved in the response sentence has a very low likelihood, the response sentence pattern in a form of a question may be selectively used, while otherwise the response sentence pattern in a form of a positive confirmation may be selectively used. In this manner, the user can also receive the information concerning the level of understanding achieved by the system from the response sentence pattern used. It is to be noted that the selective use of the different response sentence patterns may be made for the other aspects of the speech response such as the selective use of the polite response sentence pattern and the intimate response sentence pattern.

The speech waveform generation unit 154 has a configuration of the formant type speech synthesizer shown in FIG. 29 comprising an impulse generator 161, a noise generator 162, a low pass filter 163A connected to the impulse generator 161 as a sound source, a low pass filter connected to the noise generator 162, a switch connected to the low pass filter 163A, an adder 165A for adding the outputs of the low pass filters 163A and 163B, a series of resonators 166A connected to the adder 165A, a plurality of amplitude controllers 167 connected in parallel to the switch 164, a plurality of resonators 165B connected to the amplitude controllers 167, an adder 165B for adding the outputs of the resonators 165A and 165B and one of the amplitude controllers 167 without a resonator 166B, a high pass filter 168 connected to the adder 166B, and a control parameter distributor 169 which distributes the control parameters supplied from the control parameter generation unit 153 to all the elements of this formant type speech synthesizer mentioned above. As an example, in this speech waveform generation unit 154, the speech synthesis parameters can be updated in every 8 msec using the sampling frequency of 12 KHz. It is to be noted that the other known types of the speech waveform generator may be used instead of that shown in FIG. 29.

The content visualizing image generation unit 136 generates the content visualizing image visualizing the essential content of the speech response is provided for supporting the smooth comprehension of the system response by the user.

In this first embodiment, the content visualizing image information supplied from the dialogue management unit 12 is the order table used in the dialogue management unit 12 described above. Here, the order table contains the information on the items, sizes, and quantities for all the orders taken by the system up to each moment in the dialogue between the user and the system, so that this information can be utilized to visualize the content of the order taken by displaying a picture of each item ordered in an ordered size accompanied by a numerical figures indicating a quantity ordered. With this content visualizing image, the user can check the content of the order taken by the system visually in addition to the audio information provided by the speech response, so that it becomes easier for the user to comprehend the content of the order taken by the system.

This content visualizing image generation unit 136 can generates the desired content visualizing image similarly to the human character image generation unit 132 by incorporating the appropriate control of the display time and the temporal change of the visual image. Thus, in a case of using the still pictures, a plurality of content visualizing images to be displayed successively are prepared in advance, while in a case of using the animated picture, the animated picture realizing the appropriate content visualizing image is prepared in advance. Also, by using the computer graphics technique, any desired content visualizing image can be obtained by specifying the desired items, sizes, and quantities to be visualized.

The response output control unit 137 outputs the received speech response to the loudspeaker unit 15 and the received response sentence text data, human character image, and content visualizing image to the display unit 14, while controlling the output timings for these audio information and visual information, so as to realize the multimodal response output.

Here, it is important to control the relationships between the audio information and the visual information by appropriate output timing control. Namely, in a case the human character image incorporates the lip motion corresponding to the speech response, the lip motion and the speech response should be carefully synchronized, and in a case the human character image incorporates the bowing motion in correspondence to the greeting words in the speech response, the bowing motion and the greeting words shown should be carefully synchronized.

It is also important to control the output timings of these audio information and visual information to manipulate the order of presentation of the information to be given to the user. Examples of such an output timing control are indicated in the timing charts shown in FIGS. 30A, 30B, 31A, and 31B.

Figure 30A:
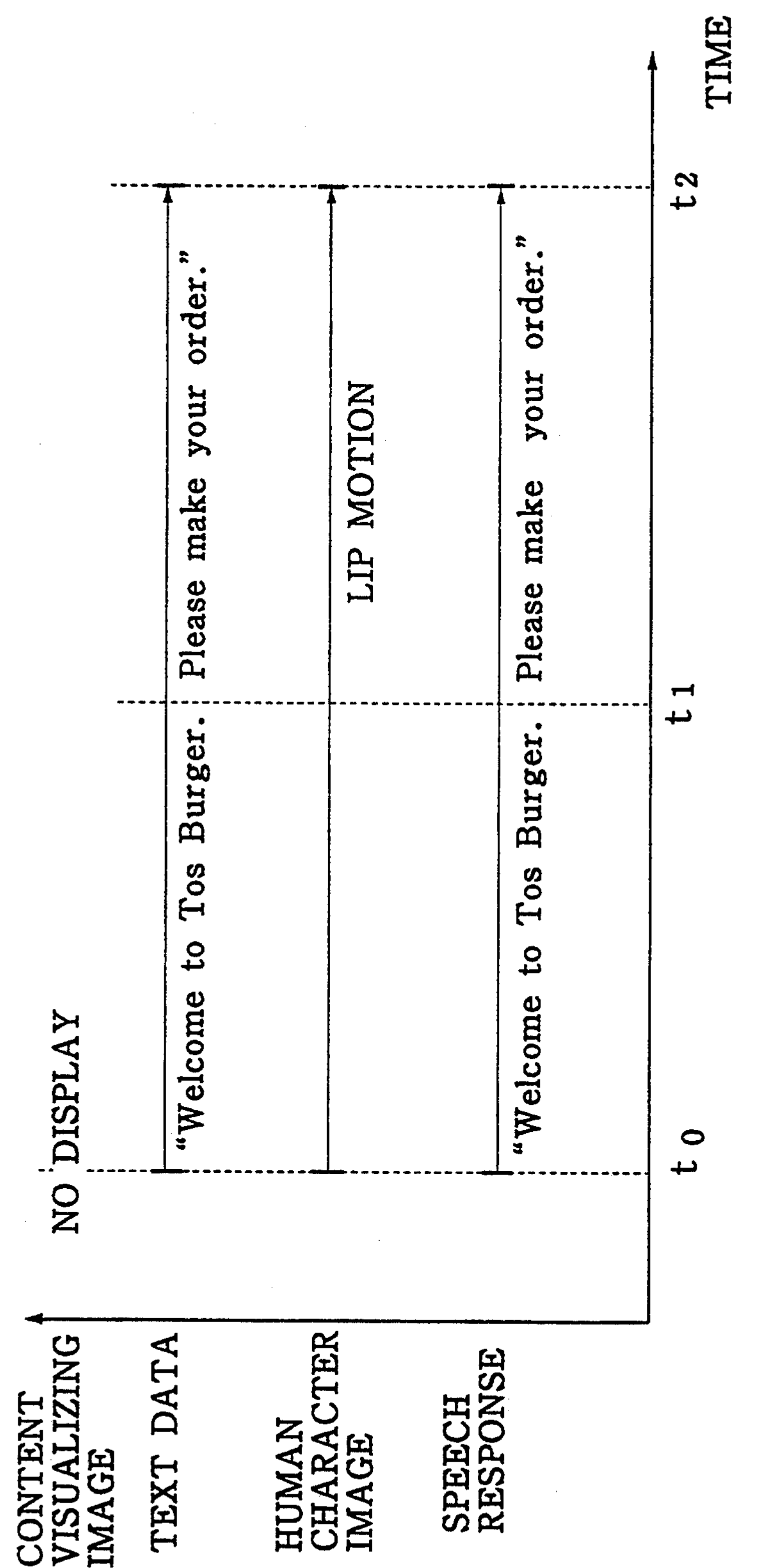
FIG. 30A is a timing chart for one example of a display timing control to be made in a response output control unit in the response generation unit of FIG. 19.

FIG. 30A is a timing chart for an initial greeting situation. In this case, as there is no order taken yet, there is no content visualizing image display. At a timing t0, the text data for the initial greeting words are displayed. Meanwhile the human character image appears at the same timing t0 and the lips of the human character image are moved along the output of the speech response of "Welcome to Tos Burger. Please make your order." between the timings t0 and t2, so as to urge the user to make the order. Here, the greeting words displayed at the timing t0 contains the text data for all the speech responses between the timings t0 and t2, in order to assist the user's comprehension of the speech responses, and this text data will be continued to be displayed even after the timing t2 until the next system response output stage.

Figure 30B:
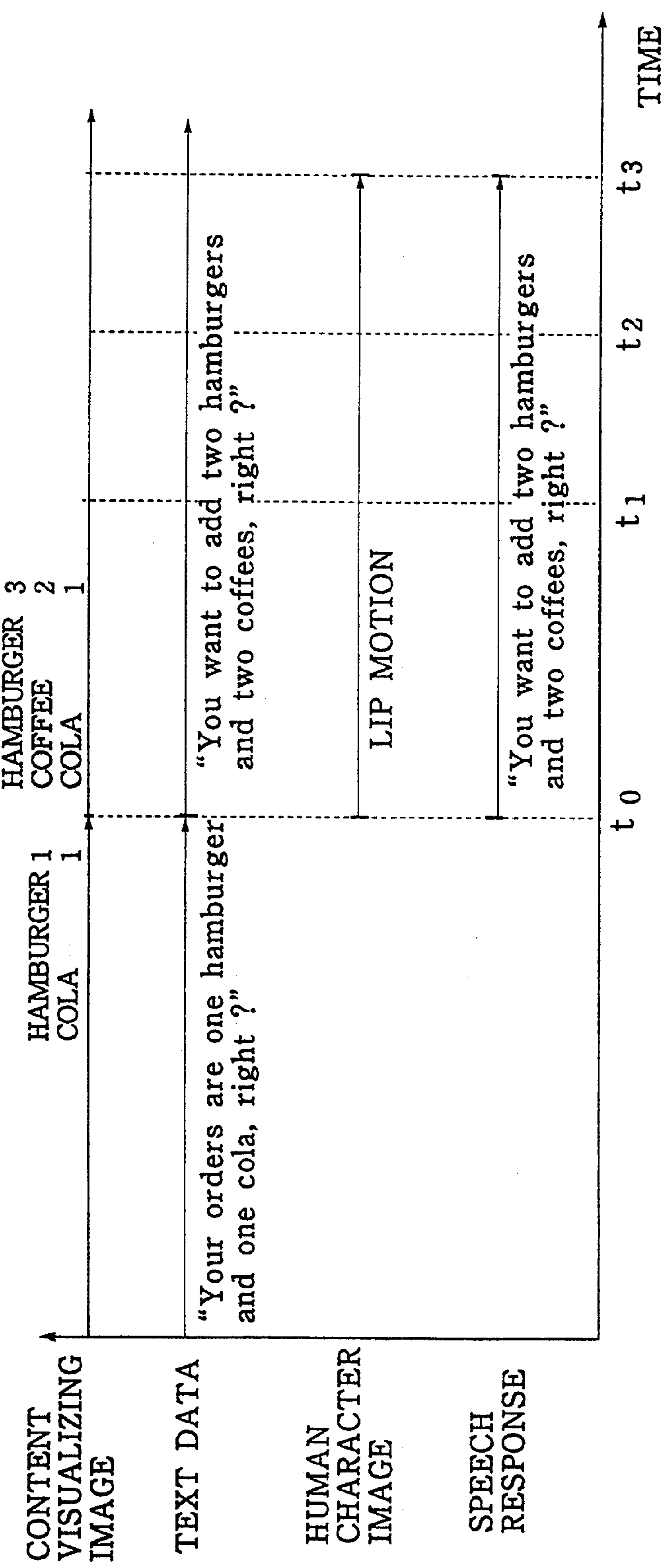
FIG. 30B is a timing chart for another example of a display timing control to be made in a response output control unit in the response generation unit of FIG. 19.

FIG. 30B is a timing chart for a situation in which one hamburger and one cola has already been ordered and two hamburgers and two coffees are ordered additionally. In this case, up to the timing t0, the text data of "Your orders are one hamburger and one cola, right?" for making the confirmation for the previous order is displayed while the content visualizing image shows the already ordered one hamburger and one cola. Then, at a timing t0, the text data is changed to a new text data of "You want to add two hamburgers and two coffees, right?" for making the confirmation for the additional order. Also, at the same timing t0, the content visualizing image is changed to a new content visualizing image showing three hamburgers, two coffees, and one cola by combining the additional order with the previous order. Meanwhile, the human character image starts the lip motion along the output of the speech response of "You want to add two hamburgers and two coffees, right?" between the timings t0 and t3. Here, the new text data and content visualizing image are continued to be displayed even after the timing t3 until the next system response output stage.

Figure 31A:
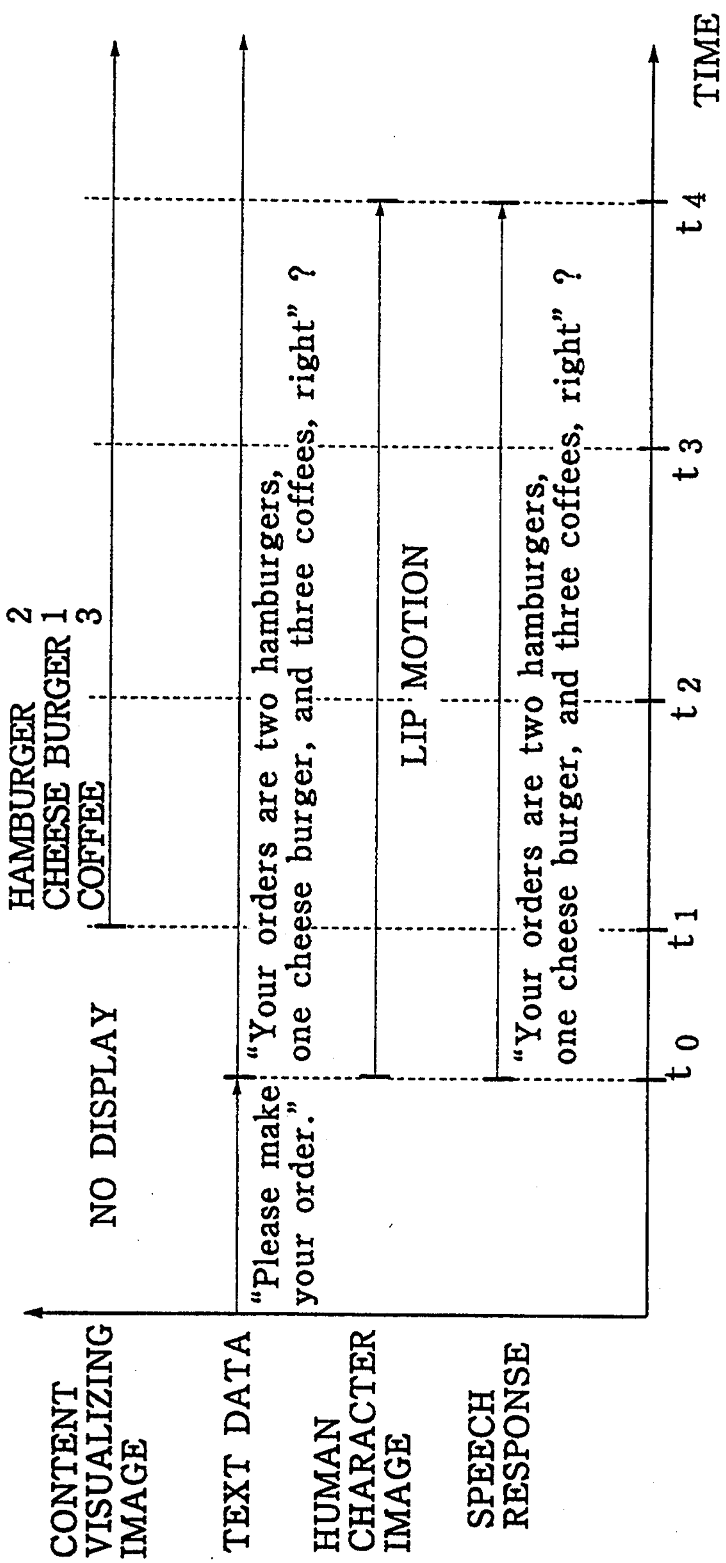
FIG. 31A is a timing chart for another example of a display timing control to be made in a response output control unit in the response generation unit of FIG. 19.

FIG. 31A is a timing chart for a situation of making a confirmation of all orders after the orders for two hamburgers, one cheese burger, and three coffees are received. In this case, after the orders are received, at a timing t0, the text data is changed to a new text data of "Your orders are two hamburgers, one cheese burger, and three coffees, right?" for making the confirmation for all the orders. Meanwhile, the human character image starts the lip motion along the output of the speech response of "Your orders are two hamburgers, one cheese burger, and three coffees, right?" between the timings t0 and t4. As for the content visualizing image, the content visualizing image is not shown until a timing t1 by which time the initial part of "Your orders are" in the speech response has been outputted. Then, at the timing t1, the content visualizing image showing two hamburgers, one cheese burger, and three coffees is displayed. Here, the new text data as well as the content visualizing image are continued to be displayed even after the timing t4 until the next system response output stage.

Now, in a situation such as that shown in FIG. 31A, when the number of items ordered becomes numerous, the text data can be quite lengthy and the output of the entire speech response can take a considerable amount of time. However, since the content visualizing image showing the content of the orders are displayed at the timing t1, it is quite likely for the user to be able to understand the content of the system response well before the output of the entire speech response is finished, without reading the lengthy text data. In such a case, the display of the text data is useless and the speech response can be rather irritating to the user. For this reason, when the number of items exceeds the predetermined threshold number such as three, the system response output content and its output order may be modified as shown in FIG. 31B, in order to simplify the dialogue for making the confirmation of the orders.

Figure 31B:
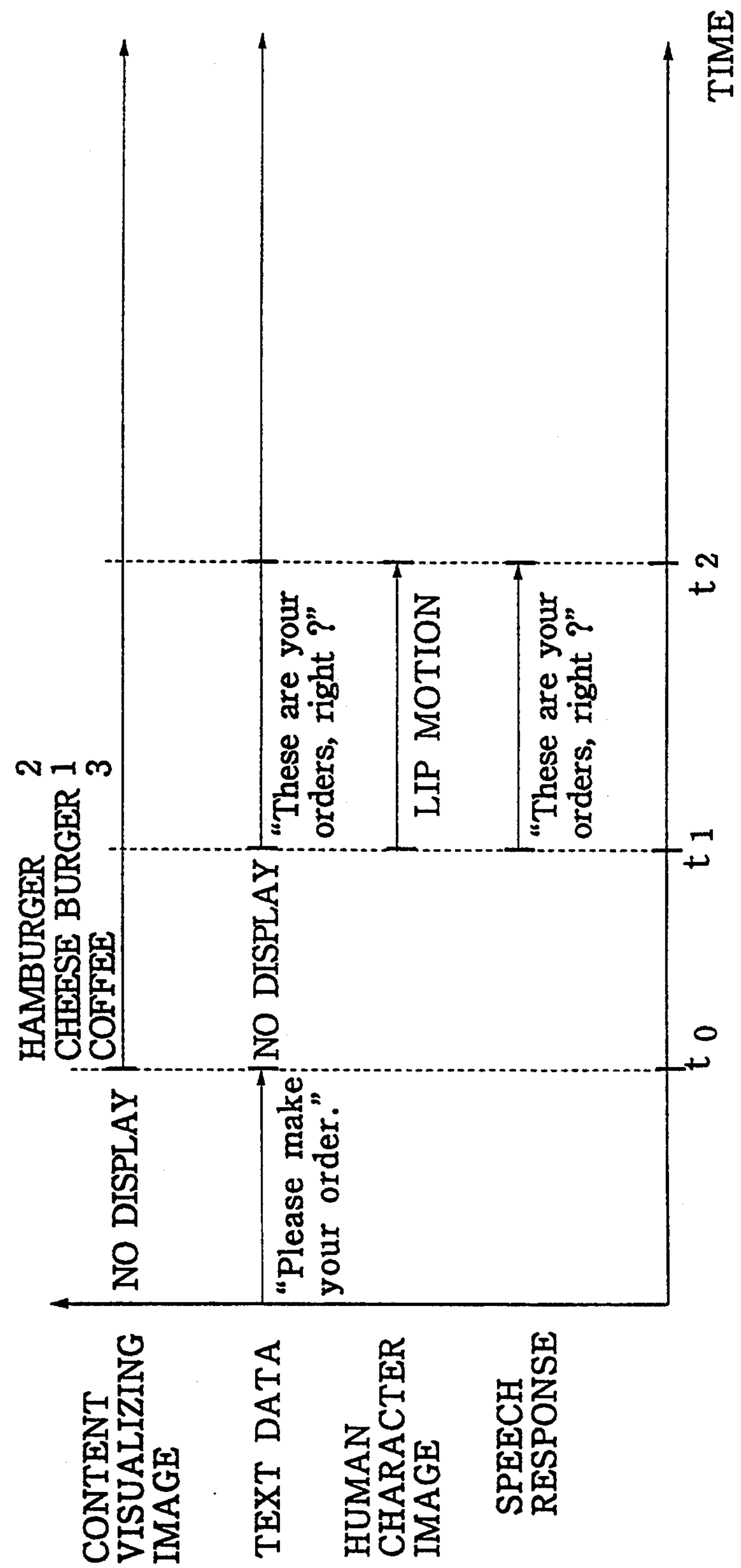
FIG. 31B is a timing chart for another example of a display timing control to be made in a response output control unit in the response generation unit of FIG. 19.

Namely, in FIG. 31B, after the orders are received, at a timing t0, the text data is erased once, while the content visualizing image showing two hamburgers, one cheese burger, and three coffees is displayed immediately at the timing t0. Then, at a timing t1, a new text data of "These are your orders, right?" For making the shorter confirmation is displayed, while the human character image makes the lip motion along the output of the speech response of "These are your orders, right?" between the timings t1 and t2. Here, the new text data as well as the content visualizing image are continued to be displayed even after the timing t2 until the next system response output stage.

In this case, the change of the system response output content and its output order is determined at the response generation unit 13 according to the response act and the number of ordered items indicated by the semantic response representation supplied from the dialogue management unit 12. Here, the change of the system response output content and its output order may be determined by using a factor indicative of a length of the speech response other than the number of ordered items, such as a number of words used in the speech response or a number of moras of the speech response.

It is to be noted that the similar simplification of the system response output content and its output order by means of the output of the visual response preceding the output of the speech response, and the shorter speech response using the demonstrative pronoun may also be utilized in other situations in which the number of items to be confirmed is numerous, or the system response output content is so complicated as to make it difficult to comprehended verbally.

It is also to be noted that, in these examples of FIG. 30A, 30B, 31A, and 31B, the output timings are determined according to the speech duration of each part of the speech response. Thus, in FIG. 30A, the period between the timings t0 and t1 is determined by the speech duration required for outputting the speech response of "Welcome to Tos Burger.", and so on. However, the output timings may alternatively be determined according to the display duration of the human character image or the content visualizing image, if desired.

The response output control unit 137 also controls the display positions of the text data, the human character image, and the content visualizing image on the display unit 14.

3. Exemplary Multimodal Response Output

Referring now to FIG. 32 to FIG. 38, the exemplary multimodal response output in this first embodiment of the speech dialogue system in the practical order taking task in a fast food store will be described in detail.

Figure 32:
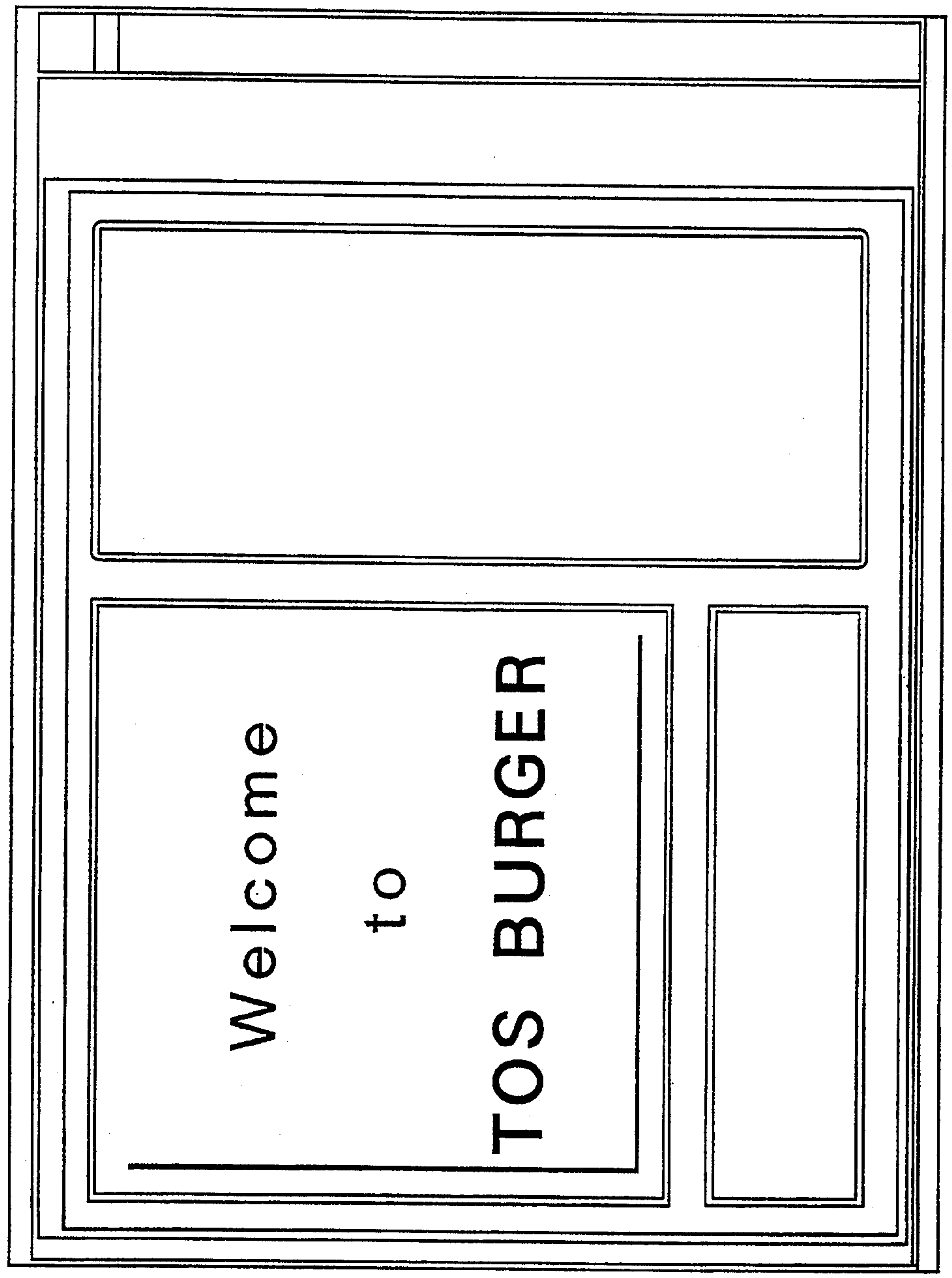
FIG. 32 to FIG. 38 are illustrations of various examples of display images to be used in the speech dialogue system of FIG. 1 obtained by the response generation unit of FIG. 19.

First, FIG. 32 shows an initial display on the display unit 14 in the absence of the user. In this case, the display unit 14 only displays a simple text such as "Welcome to TOS BURGER", and the loudspeaker unit 15 remains silent.

Figure 33:
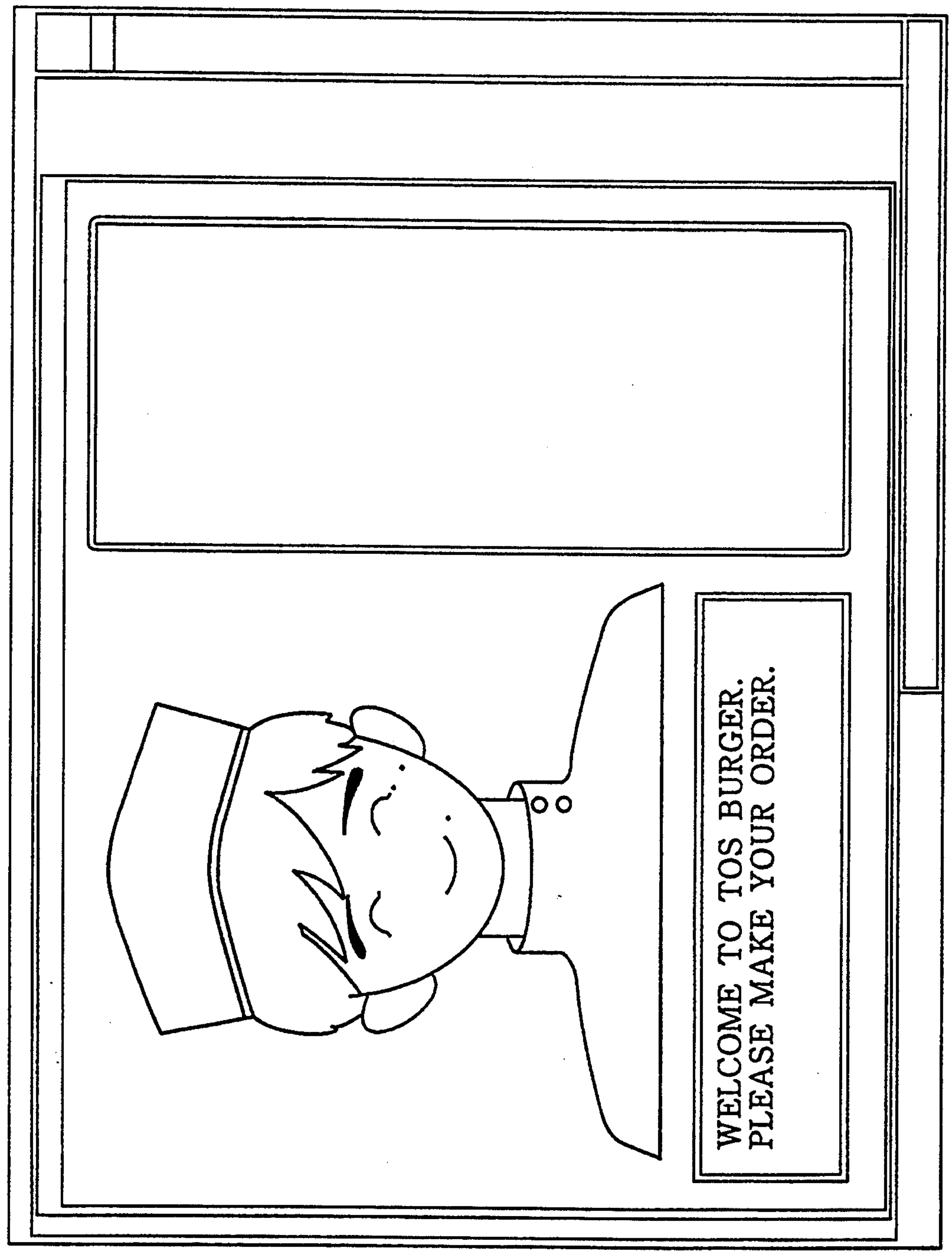

When the approach of the user (customer in this case) to a location of the system (such as a store counter or a drive-through window) is detected by a user detection device (not shown) such as a floor mat equipped with a pressure sensor or a monitoring camera, the display unit 14 displays the visual response as shown in FIG. 33 which includes the human character image of a store worker with a joyful smiling facial expression along with the text data of the initial greeting speech response such as "Welcome to Tos Burger. Please make your order.", while the same speech response is outputted from the loudspeaker unit 15 in the synthesized voice. This state corresponds to the initial system state S0 in the state transition diagram of FIG. 9 described above. Here, it is important to start the output of the above described visual response and the speech response at a timing at which the user is detected to be standing still in front of the system, in order to start the dialogue with the user comfortably. In this regard, the joyful smiling facial expression of the human character image is very important to relax the tension on the user side, and it is further preferable to use the synthesized voice with the cheerful intonation for the initial greeting speech response. This initial greeting speech response may be provided by the pre-recorded synthesized or natural sounds, if desired.

Now, consider a case in which the user uttered the input speech of "Eh, two hamburgers, and . . . well . . . two coffees, please." in haste, in response to the message shown in FIG. 33. Then, on the system side, the above described operation in the initial user state U0 in the state transition diagram of FIG. 9 is carried out. Here, however, suppose that the input speech was uttered by the user so fast that the system failed to understand the input speech as there is no output from the speech understanding unit 11.

Figure 34:
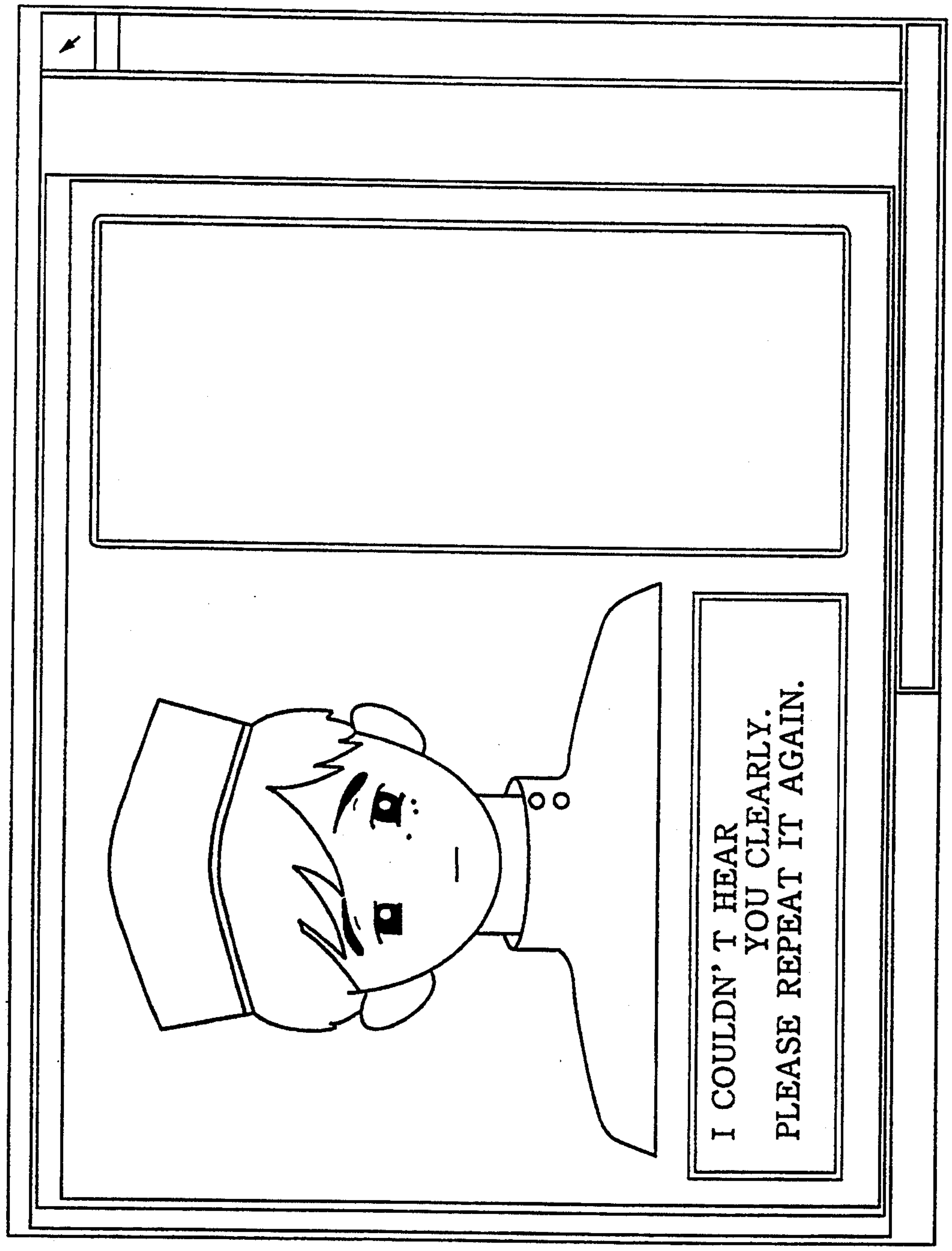

In such a case, the dialogue management unit 12 controls the response generation unit 13 such that the speech response indicating the failure to understand the input speech on the system side such as "I couldn't hear you clearly. Please repeat it again." is outputted from the loudspeaker unit 15 while the text data of this speech response is displayed on the display unit 14 along with the human character image with the regretful facial expression as shown in FIG. 34. Here, the system completely failed to understand the input speech so that the order table remains empty and consequently there is no content visualizing image involved in the visual response. This case corresponds to a case of making transition from the initial user state U0 to the dialogue correction system state S10 in the state transition diagram of FIG. 9 described above, and the above described speech response and visual response are generated as a result of the operation in the dialogue correction system state S10.

Next, consider a case in which the user uttered the input speech of "Two hamburgers and two coffees, please." more clearly, in response to the message shown in FIG. 34. In this case, the above described operations in the speech understanding unit 11 and the dialogue management unit 12 to produce the appropriate semantic response representation are carried out on a basis of this input speech. Here, the response act registered in the ACT frame of the semantic response representation is "overall confirmation", such that the speech response For the overall confirmation such as "Your orders are two hamburgers and two coffees, right?" is outputted from the loudspeaker unit 15 while the text data of this speech response is displayed on the display unit 14 along with the human character image with the normal facial expression as shown in FIG. 35.

In this case, the display unit 14 also displays the content visualizing image containing the pictures of the ordered items accompanied by the numerical figures indicating the ordered quantities, such that the user can easily inspect the orders taken by the system visually in addition to the audio information provided by the speech response. Here, the information on the ordered quantities may be incorporated into the pictures of the ordered items such that the content visualizing image contains as many number of each ordered item as the ordered quantity. Here, however, it is preferable to use the numerical figures as shown in FIG. 35 as the information concerning the ordered quantity is very important and the pictorial representation of this information could be difficult to comprehend accurately and quickly, especially when the ordered quantity is large. Also, for this reason, each numerical figure is displayed at the same level as the pictures of the corresponding ordered item. Here, it is also possible for this content visualizing image to incorporate the features of the varying sizes for the pictures of the ordered items, the varying sizes for the numerical figure, the parallel use of the word expressing the ordered quantity, the use of very realistic object images, and the use of the colors on the content visualizing image, in order to improve the quickness of the comprehension by the user. As for the human character image, it is to be noted that the human character image should preferably be depicted in a simply manner rather than a very realistic manner, so as to be able to express the message to be conveyed to the user in a universally recognizable manner. It is also to be noted here that the display on the display unit 14 may be provided by the three-dimensional graphics.

Figure 35:
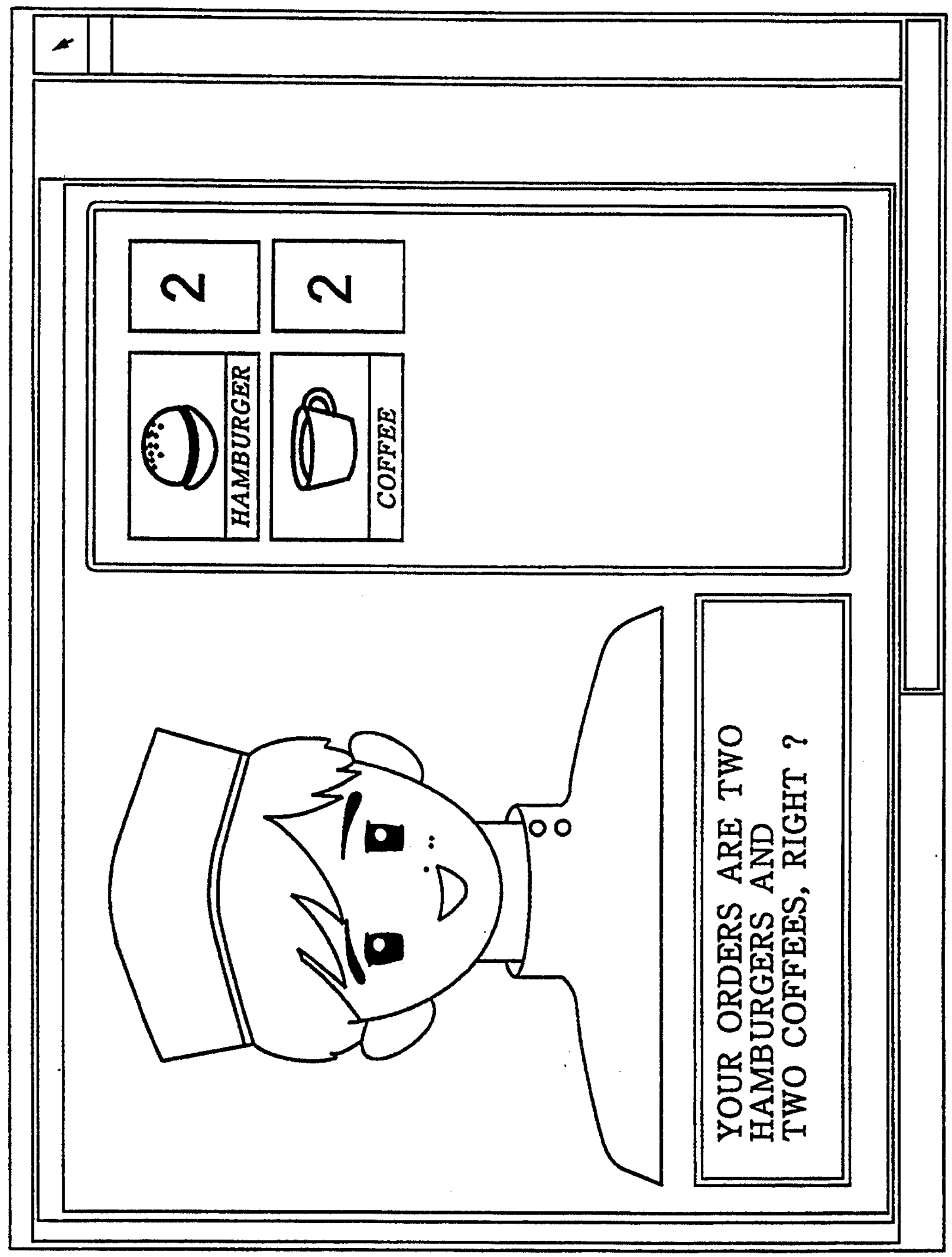

Next, consider a case in which the user somewhat hesitatingly uttered the input speech of "Uhm . . . well, that's right." in response to the message shown in FIG. 35. In this case, the system fails to understand the input speech as there is no output from the speech understanding unit 11, since this input speech is considered as the unexpected utterance.

Figure 36:
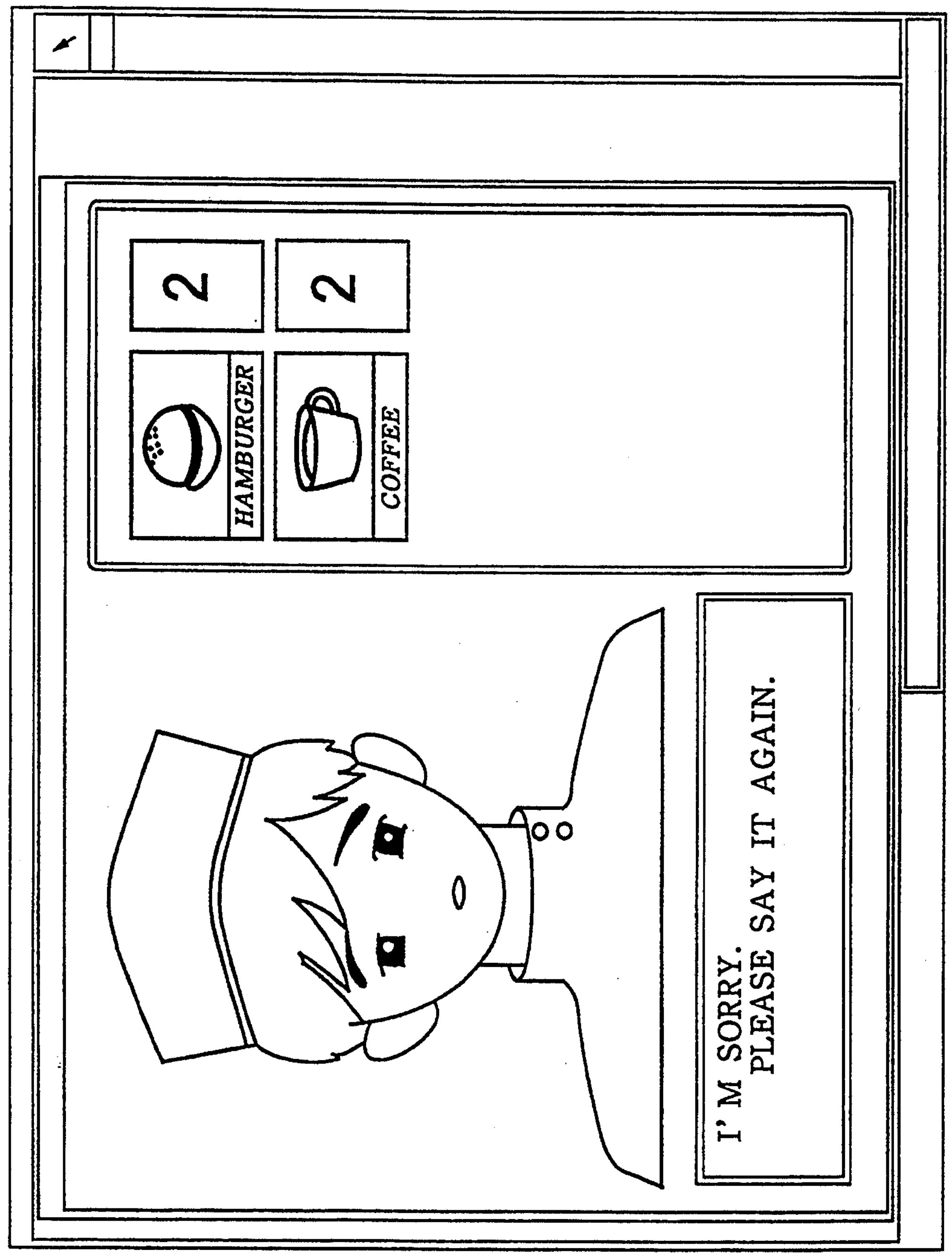

In such a case, the dialogue management unit 12 controls the response generation unit 13 such that the speech response indicating the failure to understand the input speech on the system side such as "I'm sorry. Please say it again." is outputted from the loudspeaker unit 15 while the text data of this speech response is displayed on the display unit 14 along with the human character image with the regretful facial expression as shown in FIG. 36. Here, the speech response is shorter than the speech response of FIG. 34 used in the similar situation before, in order to avoid the tasteless and possibly irritating repetition of the same message. Here, it is important that the display unit 14 continues to display the same content visualizing image indicating the ordered items and the ordered quantities as understood by the system so far, such that the user can continue to inspect the orders taken by the system visually. This continued display of the content visualizing image can effectively compensate the ephemeral nature of the message delivered in the speech response. Thus, it is quite significant to continuously display the sequentially updated content of the order taken by the system throughout the dialogue with the user.

For this reason, in this example, the confirmation for the partial change of the order such as addition, replacement, deletion is carried out by using only the speech response and the text data of the speech response. However, the visual information may also be used for the confirmation of the partial change of the order. In such a case, the display of the content visualizing image indicating the entire order may be interrupted temporarily, if desired.

Figure 37:
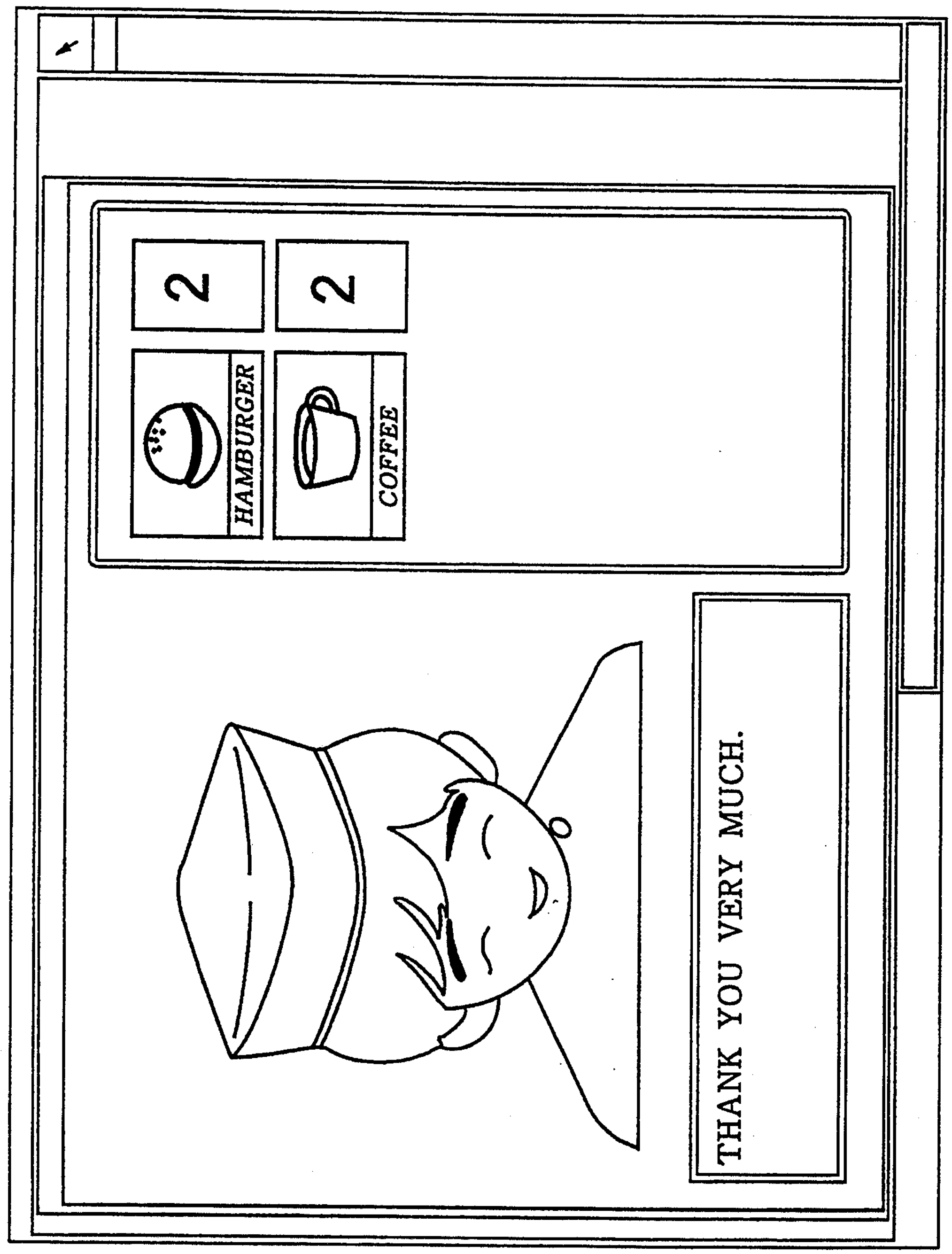

Next, consider a case in which the user uttered the input speech of "That's right." more clearly, in response to the message shown in FIG. 36. In this case, the system understand this input speech as the user's confirmation of the entire order, such that the speech response for the final salutation such as "Thank you very much." is outputted from the loudspeaker unit 15 while the text data of this speech response is displayed on the display unit 14 along with the human character image with the bowing gesture as shown in FIG. 37, and the dialogue with the user is terminated. This case corresponds to a case of making transition to the final system state S9 in the state transition diagram of FIG. 9 described above.

At this point, the other necessary response output such as that for requesting the user to pay the total charge can be made.

Figure 38:
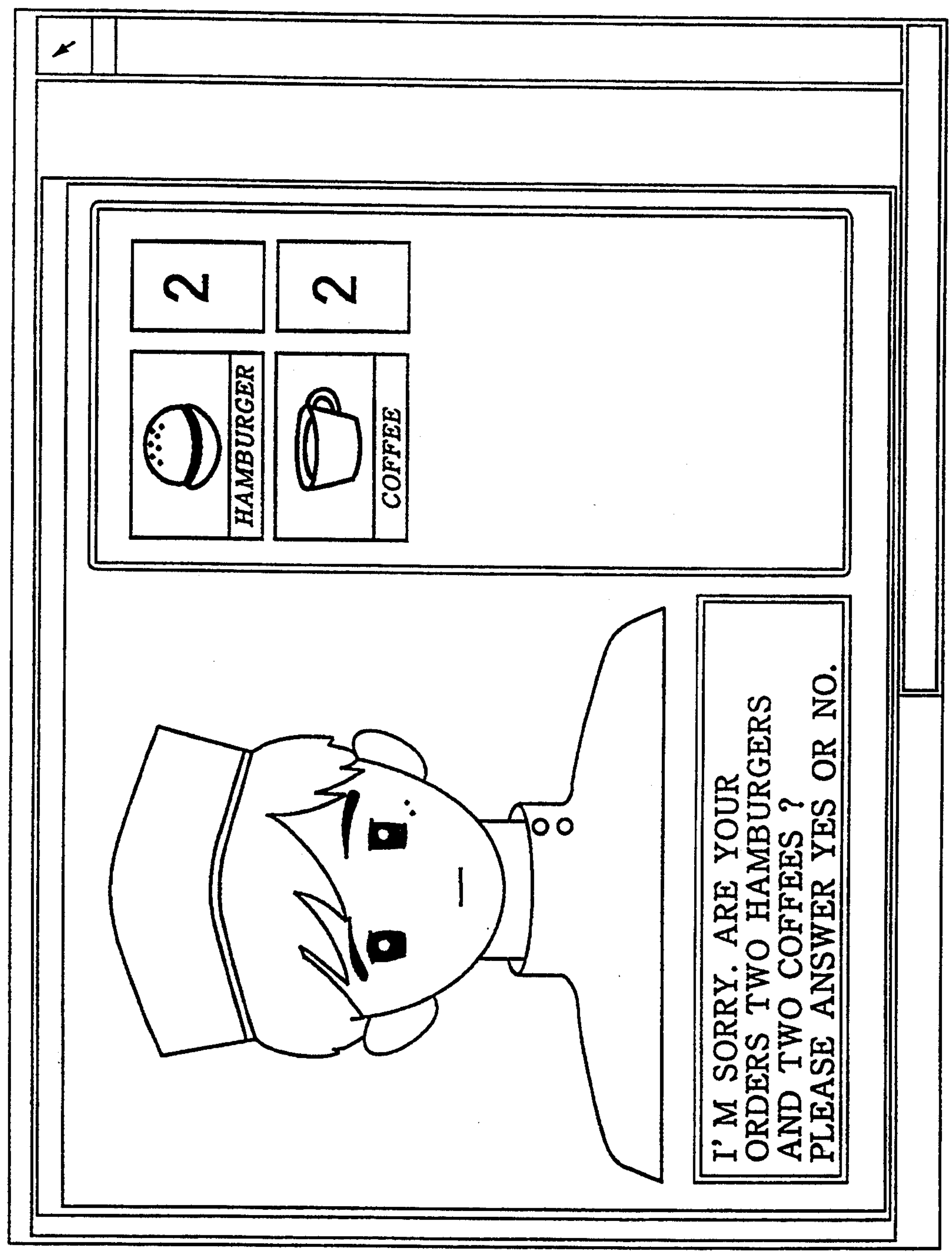

It is to be noted that, in a case of requesting the confirmation by the user as in FIG. 35, it is also effective to use the response sentence containing the positive identification of the expected answer forms such as "Please answer yes or no,". It is also possible to use the similar response sentence in a case of questioning the uncertain input speech such as "I'm sorry. Are your orders two hamburgers and two coffees? Please answer yes or no." as shown in FIG. 38. The use of such a response sentence may also be controlled according to the information such as a number of questions or corrections made during the same dialogue.

4. Summary of Overall Operation

FIG. 39 summarizes the overall operation of this first embodiment of the speech dialogue system. In short, the keywords in the input speech uttered by the user are detected by the keyword spotting operation at the keyword detection unit 21 to obtain the keyword candidates 222. Then, the keyword candidates 222 are analyzed by the speech understanding operation based on the keywords at the syntactic and semantic analysis unit 22 to obtain the semantic utterance representation 224 of the input speech. Then, the dialogue management unit 12 carries out the dialogue management operation based on knowledge of the dialogue and the application field to obtain the appropriate semantic response representation 226, according to which the response generation unit 13 generates the visual response to be displayed on the display unit 14 and the speech response, obtained by using the speech synthesis by rule, which is to be outputted from the loudspeaker unit 15.

It is to be noted that this first embodiment of the speech dialogue system is applicable to wide range of practical application field other than the fast food service used in the above description, such as information service network, ticket sale service system, a seat reservation service system, and a bank transaction service system.

II. SECOND EMBODIMENT

Figure 40:
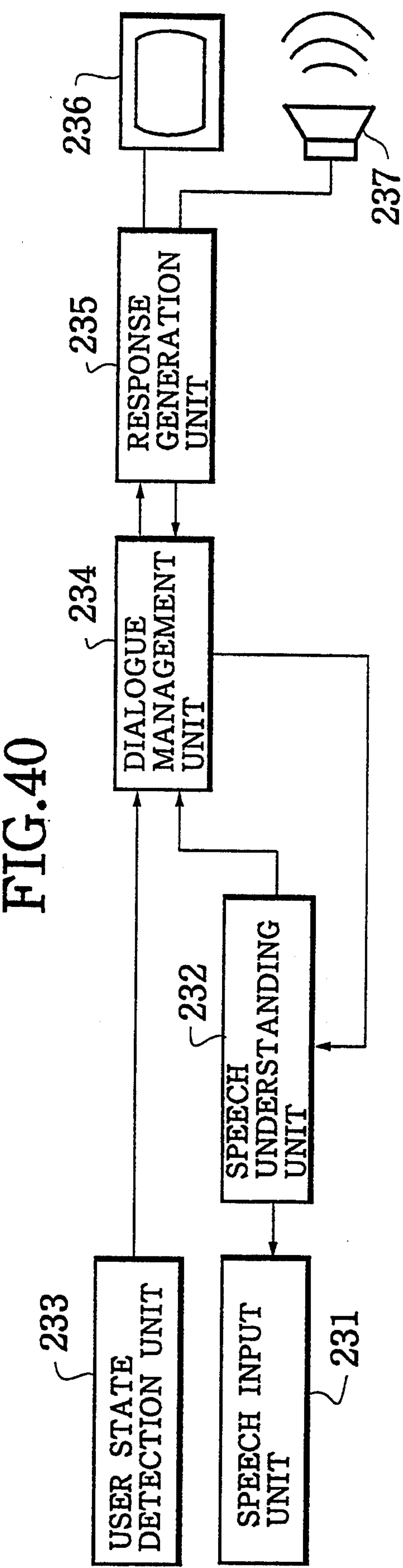
FIG. 40 is a schematic block diagram of a second embodiment of a speech dialogue system according to the present invention.

Referring now to FIG. 40, a second embodiment of a speech dialogue system according to the present invention will be described in detail.

This second embodiment differs from the first embodiment described above in that the detail of the user detection mechanism is incorporated.

Here, the user detection mechanism is necessary to start and end the dialogue between the system and the user automatically, and to make a smooth and natural progress of the dialogue between the system and the user by taking the state and the reaction of the user into account.

For the user detection mechanism, various sensor mechanisms such as those using lights, ultrasonic waves, infrared radiation pressure, monitoring camera, etc. are conceivable. In this second embodiment, the user detection mechanism using a floor mat will be described as an example.

As shown in FIG. 40, in this second embodiment, the speech dialogue system comprises: a speech input unit 231 such as a microphone; a speech understanding unit 232 similar to the speech understanding unit 11 of the first embodiment; a user state detection unit 233; a dialogue management unit 234 similar to the dialogue management unit 12 of the first embodiment; a response generation unit 235 similar to the response generation unit 13 of the first embodiment; a display unit 236 similar to the display unit 14 of the first embodiment; and a loudspeaker unit 237 similar to the loudspeaker unit 15 of the first embodiment.

Figure 41:
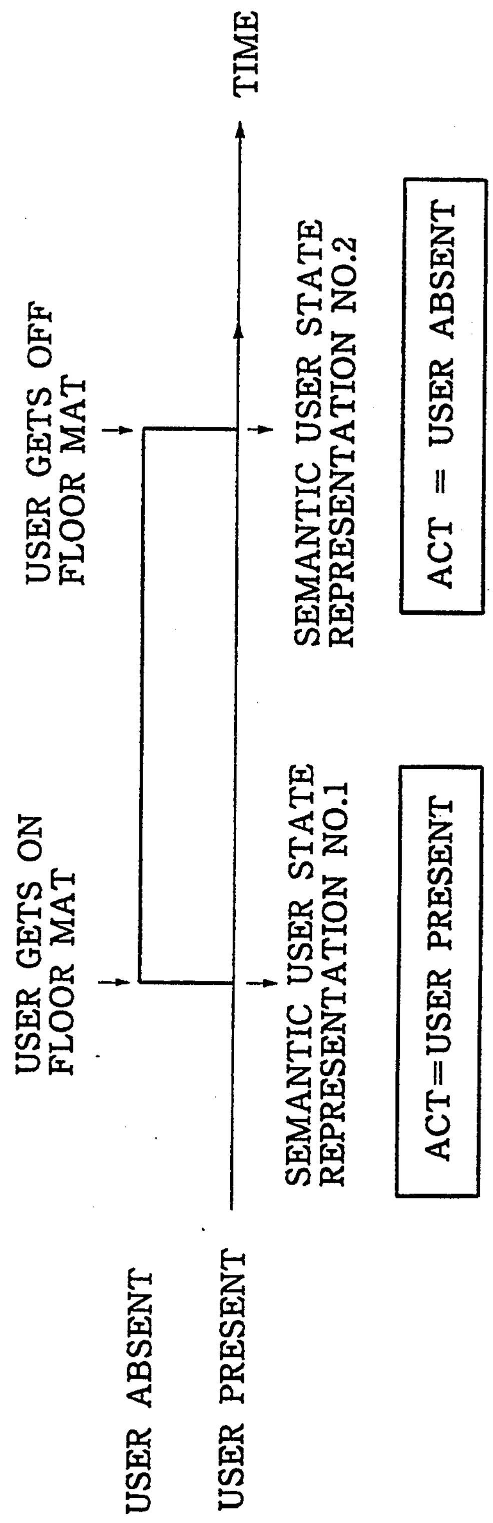
FIG. 41 is a diagram for explaining an operation of a user state detection unit in the speech dialogue system of FIG. 40.

In this configuration of FIG. 40, the user state detection unit 233 is formed by a floor mat equipped with a pressure sensor which outputs a semantic user state representation No. 1 with a user state act of "user present" registered in a case the user is on the floor mat and a semantic user state representation No. 2 with a user state act of "user absent" registered in a case the user is not on the floor mat, as indicated in FIG. 41. These semantic user state representations No. 1 and No. 2 are supplied to the dialogue management unit 234. Here, the dialogue management unit 234 also receives the semantic utterance representation from the speech understanding unit 232 just as in the first embodiment described above, and generates the appropriate semantic response representation according to both the semantic utterance representation and the semantic user state representation, by using the knowledge of the dialogue and the application field.

In this case, the semantic utterance representation supplied from the speech understanding unit 232 and the semantic user state representation supplied from the user state detection unit 233 can be handled at the dialogue management unit 233 in an order of their reception or in a predetermined order with a higher priority attached to one of them, according to the state of the dialogue between the system and the user.

Now, the operation of this speech dialogue system of the second embodiment proceeds as follows.

Namely, in a normal dialogue between the system and the user as indicated in FIG. 42, when the user gets on the Floor mat, the semantic user state representation No. 1 is supplied from the user state detection unit 233 to the dialogue management unit 234. In response, the dialogue management unit 234 automatically supplies the semantic response representation No. 1 to the response generation unit 23S such that the response No. 1 of "Welcome to Tos Burger. Please make your order." is outputted as a visual response from the display unit 236 and as a speech response From the loudspeaker unit 237.

Next, when the user utters the input speech of "Hamburgers and coffees, two for each.", the speech understanding unit 232 supplies the semantic utterance representation No. 1 based on this input speech to the dialogue management unit 234. In response, the dialogue management unit 234 supplies the appropriate semantic response representation to the response generation unit 235 according to the supplied semantic utterance representation such that the response No. 2 of "Your orders are two hamburgers and two coffees, right?" for confirmation is outputted as a visual response from the display unit 236 and as a speech response from the loudspeaker unit 237. Then, the semantic utterance representation No. 2 for the next user utterance of "Right." uttered in reply, the dialogue is terminated as the final salutation of "Thank you very much." is outputted according to the semantic response representation No. 3.

However, in a case the user gets off the floor mat in a middle of the dialogue such as that just described, the operation of the speech dialogue system of this second embodiment is modified as follows.

Figure 43:
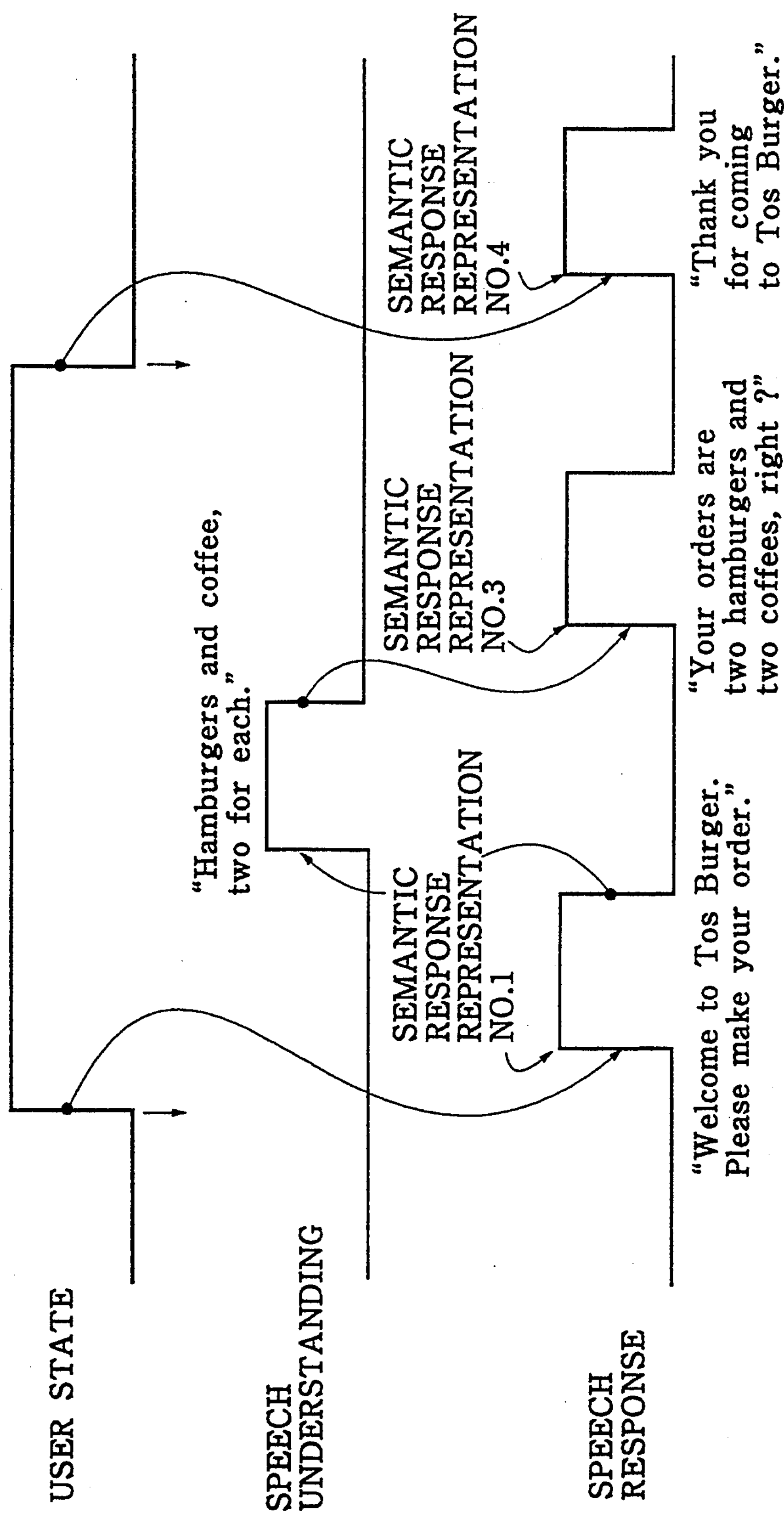
FIG. 43 is a timing chart for another example of an operation in the speech dialogue system of FIG. 40.

Namely, as indicated in FIG. 43, the user gets off the floor mat after the response No. 2 of "Your orders are two hamburgers and two coffees, right?" for confirmation is outputted, the semantic user state representation No. 2 is supplied from the user state detection unit 233 to the dialogue management unit 234. In response, the dialogue management unit 234 automatically interrupts the order taking operation made in this dialogue and supplies the semantic response representation No. 4 to the response generation unit 235 such that the natural response for the interrupted order taking operation such as "Thank you for coming to Tos Burger." is outputted as a visual response from the display unit 236 and as a speech response from the loudspeaker unit 237.

In this manner, the dialogue management unit 234 utilizes the information concerning the state of the user during the dialogue, provided by the semantic user state representation supplied from the user state detection unit, such that the natural start and end of the dialogue between the user and the system can be made automatically.

More generally, the operation of this speech dialogue system of the second embodiment proceeds according to the flow chart of FIG. 44 as follows. Here, the dialogue management unit 234 at each moment of the operation is in one of the following four states #0, #2, and #3. The dialogue management unit 234 is in the state #0 initially, and the transitions to the other states #1, #2, and #3 are made according to the user state.

First, when the dialogue management unit 234 is in the state #0 at the step S281, next at the step S282, whether the user state act in the semantic user state representation supplied from the user state detection unit 233 is "user present" or not is determined. When the user state act is "user present" at the step S282, next at the step S283, the semantic response representation for the initial greeting is generated and the transition to the state #1 is made. When the user state act is not "user present" at the step S282, the dialogue management unit remains in the state #0 and the operation proceeds to a next operation timing to repeat this flow chart of FIG. 44 from the beginning.

When the dialogue management unit 234 is not in the state #0 at the step S281, next at the step S284, whether the dialogue management unit 234 is in the state #1 or not is determined. When the dialogue management unit 234 is in the state #1 at the step S284, next at the step S285, whether the speech act in the semantic utterance representation supplied from the speech understanding unit 232 is "order" or not is determined. When the speech act is "order" at the step S285, next at the step S286, the semantic response representation for the confirmation of the ordered content is generated. Then, the dialogue management unit maintains the state #0 and the operation proceeds to a next operation timing.

When the speech act is not "order" at the step S285, next at the step S287, whether the speech act in the semantic utterance representation supplied from the speech understanding unit 232 is "yes" in response to the confirmation response from the system or not is determined. When the speech act is "yes" at the step S287, next at the step S288, the ordered content is registered into the order table a he transition he state #2 is made and the operation proceeds to a next operation timing.

When the speech act is not "yes" at the step S287, next at the step S289, whether the speech act in the semantic utterance representation supplied from the speech understanding unit 232 is "no" in response to the confirmation response from the system or not is determined. When the speech act is "no" at the step S289, next at the step S290, the semantic response representation for the reconfirmation of the ordered content is generated. Then, the dialogue management unit maintains the state #0 and the operation proceeds to a next operation timing.

When the speech act is not "no" at the step S289, next at the step S291, whether the user state act in the semantic user state representation supplied from the user state detection unit 233 is "user absent" or not is determined. When the user state act is "user absent" at the step S291, next at the step S292, the transition to the state #3 is made and the operation proceeds to a next operation timing.

When the user state act is not "user absent" at the step S291, the dialogue management unit remains in the state #0 and the operation proceeds to a next operation timing.

When The dialogue management unit 234 is not in the state #1 at the step S284, next at the step S293, whether the dialogue management unit 234 is in the state #2 or not is determined. When the dialogue management unit 234 is in the state #2 at the step S293, next at the step S294, the semantic response representation for the final salutation No. 1 of "Thank you very much" is generated and the transition to the state #0 is made and the operation proceeds to a next operation timing.

When the dialogue management unit 234 is not in the state #2 at the step S293, next at the step S295, whether the dialogue management unit 234 is in the state #3 or not is determined. When the dialogue management unit 234 is in the state #3 at the step S295, next at the step S296, the semantic response representation for the final salutation No. 2 of "Thank you for coming." is generated and the transition to the state #0 is made and the operation proceeds to a next operation timing.

Finally, when the dialogue management unit 234 is not in the state #3 at the step S295, the dialogue management unit remains in the state #0 and the operation proceeds to a next operation timing.

III. THIRD EMBODIMENT

Referring now to FIG. 45, a third embodiment of a speech dialogue system according to the present invention will be described in detail.

This third embodiment differs from the first and second embodiments described above in that the further detail of the practical implementation of the speech dialogue system configuration is incorporated.

As shown in FIG. 45, in this third embodiment, the speech dialogue system comprises: a processor unit 291; a memory unit 292; a storage unit 293; a storage unit interface 2931; a data transmission unit 294; a data transmission unit interface 2941; an A/D conversion unit 295; a mat unit 296; a high speed processor unit 297; a D/A conversion unit 298; and a display unit 299; all of which are interconnected through a common system bus.

Here, the A/D conversion unit 295 further comprises: a microphone 2951 for receiving the input speech from the user; a filter and amplifier 2952 connected to the microphone 2951; an A/D converter 2953 connected to the filter and amplifier 2952; and an A/D converter interface 2954 connected between the A/D converter 2953 and the system bus as well as with the filter and amplifier 2952. Here, the filter and amplifier 2952 has functions of an amplification of the input speech received by the microphone 2951 and of a low pass filtering for the sake of the A/D conversion at the A/D converter 2953. The cut-off frequency of this low pass filtering function is determined according to the sampling frequency used in the A/D conversion. For example, when the sampling frequency of the A/D conversion is 12 KHz, the cut-off frequency will be 5.4 KHz. The A/D converter 2953 applies the A/D conversion at the 16 KHz or 12 KHz to the amplified and low pass filtered input speech, and the digital input speech data obtained by the A/D converter 2953 are temporarily stored in the A/D conversion interface 2954 and transmitted to the memory unit 292 through the system bus under the control of the processor unit 291.

The mat unit 296 further comprises: a floor mat 2961 to be stepped on by the user; a floor mat controller 2962 connected to the floor mat 2961; and a floor mat controller interface 2963 connected to the floor mat controller 2962. Here, the presence or absence of the user of the system is determined by the floor mat controller 2962 according to the presence or absence of the user on the floor mat 2961, and the user detection signal is temporarily stored in the floor mat controller interface 2963 and transmitted through the system bus.

The high speed processor unit 297 further comprises: a high speed processor 2971 and the high speed processor interface 2972 connected to the high speed processor 2971. This high speed processor 2971 is used in executing a large scale processing required in the speech understanding operation and the response generation operation. In a case of using the user detection mechanism using monitoring camera, this high speed processor 2971 may also be used in the large scale processing required in the image processing in conjunction with the monitoring camera. Here, these operations are need to be executed in parallel, so that the high speed processor 2971 contains a plurality of parallel processing elements. This high speed processor 2971 are operated under the control from the processor unit 291 with the input transferred from the memory unit 292 and the output transmitted through the high speed processor interface 2972 to the memory unit 292.

The D/A conversion unit 298 further comprises: a loudspeaker 2984 for outputting the speech response; a filter and amplifier 2983 connected to the loudspeaker 2984; a D/A converter 2982 connected to the filter and amplifier 2983; and a D/A converter interface 2981 connected to the D/A converter 2982. Here, the digital speech response data stored in the memory unit 292 are transferred to the D/A converter 2982 through the D/A converter interface 2981 under the control of the processor unit 291 such that the D/A converter 2982 applies the D/A conversion at the 16 KHz or 12 KHz to the digital speech response data,and the analog speech response is filtered and amplified at the filter and amplifier 2983 and outputted from the loudspeaker 2984. Here, the D/A converter 2982 is equipped with an internal memory to memorize the digital speech response data and the data transfer from the memory unit 292 to the D/A converter 2982 is realized at a high speed such that the processor unit 291 can carry out the other operation while the output of the speech response is made in this D/A conversion unit 298.

The display unit 299 further comprises: a display 2993 for displaying the visual response; a display controller 2992 connected to the display 2993; and a display controller interface 2991 connected to the display controller 2992. Here, the display controller 2992 controls the display 2993 to display the visual response given in terms of images, texts, figures, animated images, colors, luminances, and concentrations, under the control of the processor unit 291.

The data transmission unit 294 makes a data transmission with respect to the system to the external devices such as computers, data processors, etc., through the data transmission unit interface 2941 under the control of the processor unit 291.

The storage unit 293 stores the data, control parameters, programs, etc., required in the speech understanding operation, the dialogue management operation, and the response generation operation.

The processor unit 291 controls the above described operations of the storage unit 293, the data transmission unit 294, the A/D conversion unit 295, the mat unit 296, the high speed processor unit 297, the D/A conversion unit 298, and the display unit 299, by using various data and programs memorized in the memory unit 292. Here, the processor unit 291 carries out the multi-task execution of the programs for realizing the understanding operation, the dialogue management operation, and the response generation operation as in the first and second embodiment described above. The switching of the task is made sequentially at regular interval, but the interruption by the processing attached with a higher priority is allowed according to the need.

In this configuration of FIG. 45, the A/D conversion unit 295 and the D/A conversion unit 298 are provided separately such that they can be operated independently from each other. With this configuration, the reception of the input speech and the output of the response can be carried out in parallel, independently from each other, so that the reception of the input speech can be made during the output of the synthesized speech response by cancelling out the synthesized speech response from the received signals.

Figure 46A:
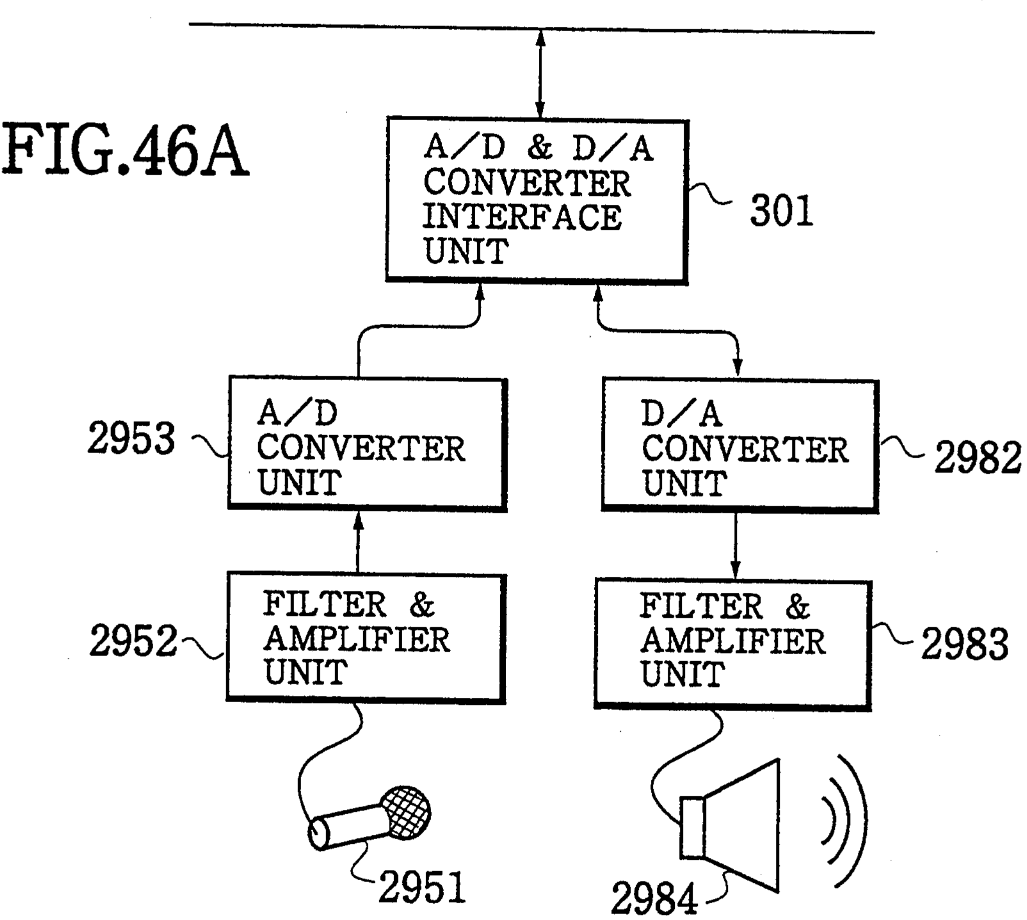
FIGS. 46A and 46B are block diagrams of two alternative configurations for an A/D and D/A conversion units in the speech dialogue system of FIG. 45.

Alternatively, as shown in FIG. 46A, it is possible to combine these A/D conversion unit 295 and the D/A conversion unit 298 together by using a common A/D and D/A converter interface 301 connected between the system bus and both of the A/D converter 2953 and the D/A converter 2982.

Figure 46B:
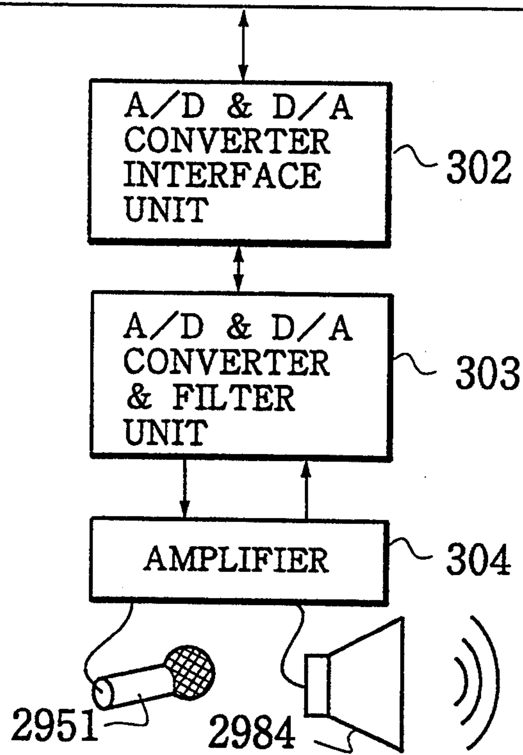

Furthermore, as shown in FIG. 46B, it is also possible to combine these A/D conversion unit 295 and the D/A conversion unit 298 together by using a common amplifier 304 connected to both the microphone 2951 and the loudspeaker 2984, a common A/D and D/A converter and filter unit 303 connected to the common amplifier 304, and a common A/D and D/A converter interface 301 connected between the system bus and the common A/D and D/A converter and filter unit 303.

However, in a case of using either one of the configurations of FIG. 46A and FIG. 46B, the reception of the input speech and the output of the response cannot be carried out in parallel, as the combined A/D and D/A conversion unit can be operated only in one of the A/D conversion mode or the D/A conversion mode at a time.

Figure 47:
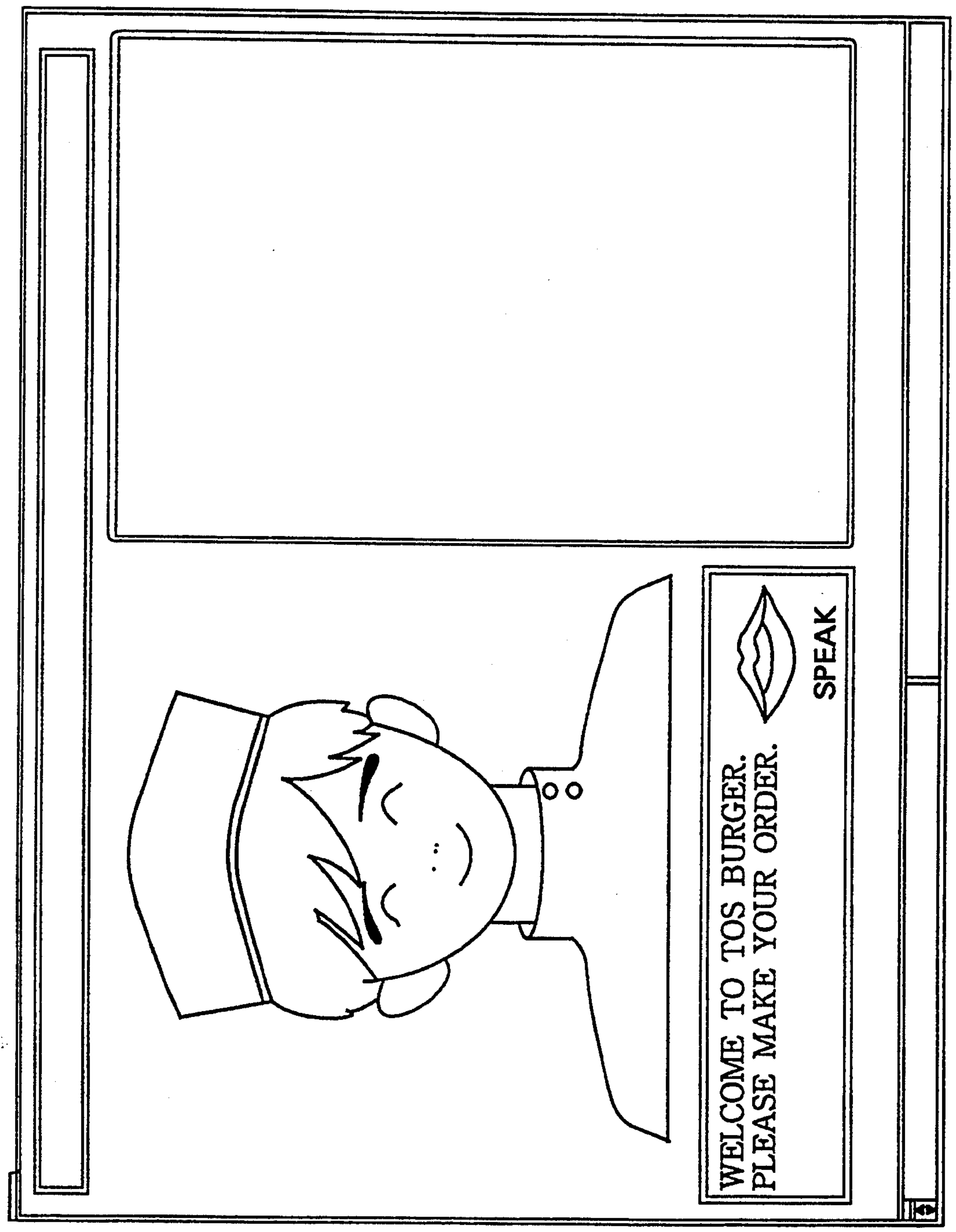
FIG. 47 is an illustration of one example of a display image to be used in the speech dialogue system of FIG. 45.
Figure 48:
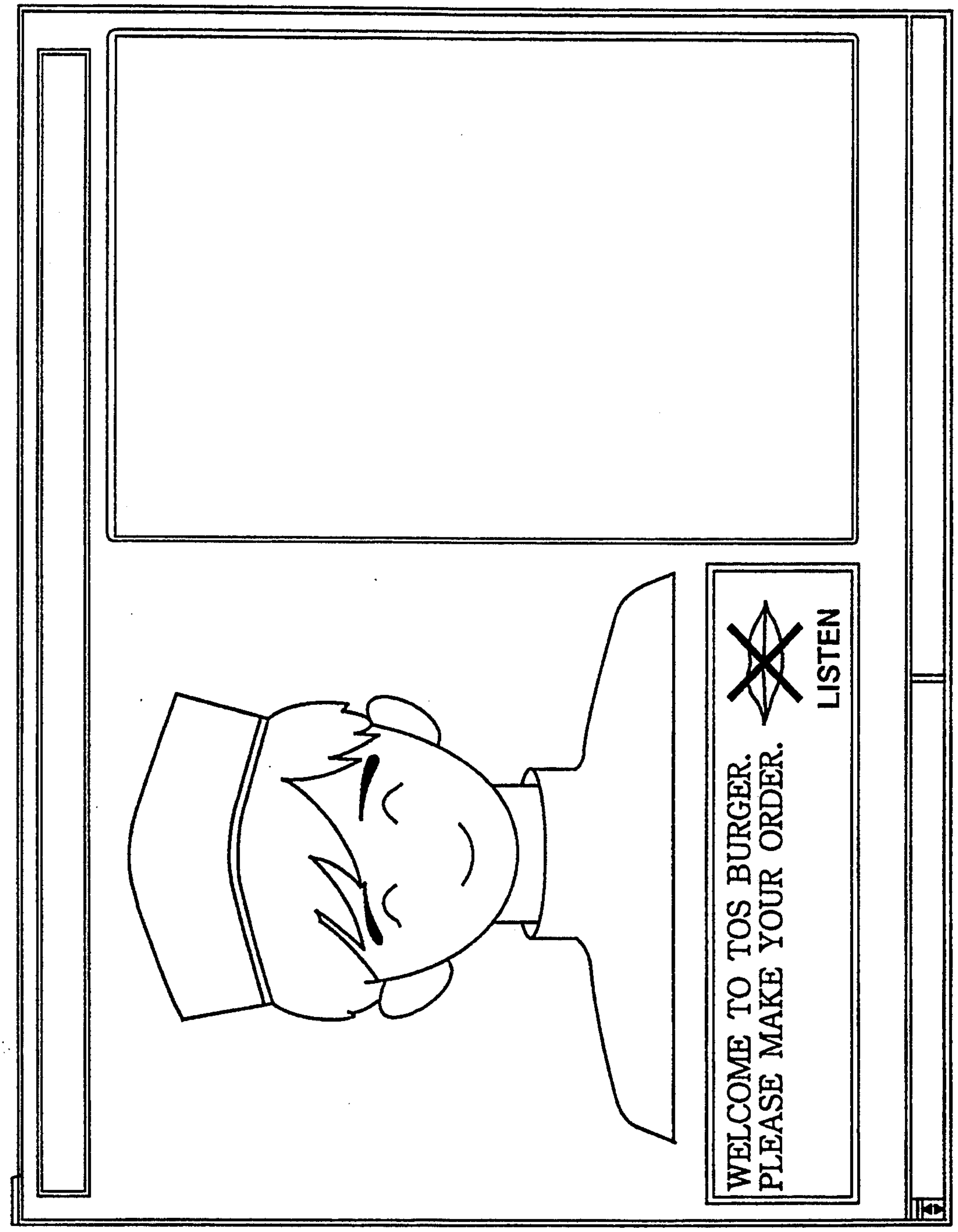
FIG. 48 is an illustration of another example of a display image to be used in the speech dialogue system of FIG. 45.

In such a case, in order to prevent the user from making an abortive utterance of the input speech during a period of time in which the system is not ready to receive the input speech, without realizing such a state of the system, it is preferable to inform the user as to whether the system is ready for the reception of the input speech or not by means of an appropriate display indication on the display 2993. For this purpose, it is preferable to use the indication combining the notification text and the notification sign image. For example, the state in which the user may utter the input speech may be indicated by the indication combining the notification text of "SPEAK" and the notification sign image of speaking human lips as shown in FIG. 47, while the state in which the user cannot utter the input speech may be indicated by the indication combining the notification text of LISTEN" and the notification sign image of sealed human lips as shown in FIG. 48.

Thus, the visual response can be utilized in notifying the user about the state of the system concerning the speech dialogue.

It is to be noted that the similar indication combining the notification text and the notification sign image may also be used in a case the utterance of the input speech by the user is not preferable in view of the dialogue management, or in a case of outputting the important speech response message preferred to be listened by the user attentively.

It is also to be noted that such an indication may also incorporate any other visual features related to the aspects of colors, luminances, and concentrations, which can be utilized in catching the user's attention.

IV. EFFECTS

As described, according to the present invention, it becomes possible to provide a speech dialogue system capable of realizing natural and smooth dialogue between the system and a human user, and facilitating an easy handling of the system by the user, by means of the effective use of the multimodal response including the speech response and the visual response containing the speech response text data, the human character image, and the content visualizing image. The use of such a multimodal response provides a friendly human-computer interaction environment in which the system provides the response message in the multimodal fashion to make it easier for the user to comprehend the state of the dialogue, such that the dialogue between the system and the user can progress naturally and smoothly.

As a consequence, the problem of the incomplete speech recognition due to the errors and ambiguity associated with the speech recognition in the speech dialogue system can be compensated effectively by the smooth dialogue between the system and the user.

In addition, the incorporation of the user state is detection mechanism and the mechanism to allow the interruption of the response output by the user's utterance of the input speech, the handling of the system by the user can be further improved.

It is to be noted that, besides these already mentioned above, many modifications and variations of the above embodiments may be made without departing from the novel and advantageous features of the present invention. Accordingly, all such modifications and variations are intended to be included within the scope of the appended claims.

What is claimed is:

1. A speech dialogue system, comprising:

speech understanding means for understanding a semantic content of an input speech from a user;

dialogue management means for making a semantic content determination of a response output according to said semantic content of said input speech understood by said speech understanding means;

response generation means for generating a speech response and a visual response according to said semantic content of said response output determined by said dialogue management means; and output means for outputting to said user said speech response and said visual response generated by said response generation means.

2. The speech dialogue system of claim 1, wherein said response generation means generates said visual response which includes an image of a human character delivering said speech response, text data of said speech response, and a content visualizing image of a content of said speech response.

3. The speech dialogue system of claim 1, wherein said output means outputs said speech response and said visual response by controlling at least one of an output order, an output timing, and a visual response output position.

4. The speech dialogue system of claim 1, further comprising user state detection means for detecting a physical state of said user, wherein said physical state of said user detected by said user state detection means is taken into a account by said dialogue management means in making said semantic content determination of said response output.

5. The speech dialogue system of claim 1, wherein said response generation means generates said visual response which includes an image of a human character delivering said speech response, wherein said image incorporates movement and facial expression of said human character.

6. The speech dialogue system of claim 5, wherein said response generation means generates said speech response incorporating a speech characteristic corresponding to said movement and said facial expression of said human character.

7. The speech dialogue system of claim 6, wherein said speech characteristic of said speech response includes at least one of an emotional expression and an intonation.

8. The speech dialogue system of claim 1, wherein said speech understanding means supplies a plurality of candidates for said semantic content of said input speech, and said dialogue management means makes said semantic content determination of said response output by evaluating said plurality of candidates in accordance with a dialogue history.

9. The speech dialogue system of claim 1, wherein said output means also outputs a visual indication for informing said user as to whether said speech dialogue system is ready to receive said input speech.

10. The speech dialogue system of claim 1, wherein said response generation means generates said visual response including a content visualizing image formed by pictures of objects mentioned in said speech response and a numerical figure indicating a quantity of each of said objects.

11. The speech dialogue system of claim 1, wherein said response generation means generates said speech response for making a confirmation of said semantic content of said input speech, while generating said visual response on the basis of a past history of a dialogue between said user and said speech dialogue system.

12. The speech dialogue system of claim 1, wherein said response generation means generates said visual response which include text data of said speech response and graphic images other than said text data, and said response generation means generates said speech response and said text data for making a confirmation of said semantic content of said input speech while generating said graphic images on the basis of a past history of a dialogue between said user and said speech dialogue system.

13. The speech dialogue system of claim 1, wherein said response generation means generates said speech response for making a confirmation of said semantic content of said input speech, said speech response being changed from a full speech response to a simplified Speech response according to a length of said speech response for making said confirmation.

14. The speech dialogue system of claim 13, wherein said length of said speech response for making said confirmation is determined from information items to be confirmed by said confirmation.

15. The speech dialogue system of claim 14, wherein said full speech response mentions all of said information items to be confirmed while said simplified speech response does not directly mention said information items to be confirmed.

16. The speech dialogue system of claim 15, wherein said simplified speech response contains a demonstrative pronoun to refer to said visual response.

17. The speech dialogue system of claim 13, wherein said full speech response recites said response output explicitly while said simplified speech response does not recite said response output explicitly.

18. The speech dialogue system of claim 17, wherein said simplified speech response contains a demonstrative pronoun to refer to said visual response.

19. The speech dialogue system of claim 13, wherein said output means outputs said visual response at an earlier timing that a timing for outputting said visual response when said speech response is said full speech response.

20. The speech dialogue system of claim 13, wherein said output means outputs said visual response before said speech response is outputted.

21. A method of speech dialogue between a human user and a speech dialogue system, comprising the steps of:

understanding a semantic content of an input speech from a user;

making a semantic content determination of a response output according to said semantic content of said input speech;

generating a speech response and a visual response according to said response output; and outputting to said user said speech response and said visual response.

22. The method of claim 21, wherein said generating step generates said visual response which includes an image of a human character delivering said speech response, text data of said speech response, and a content visualizing image of a content of said speech response.

23. The method of claim 21, wherein said outputting step outputs said speech response and said visual response by controlling at least one of an output order, an output timing, and a visual response output position.

24. The method of claim 21, further comprising the step of detecting a physical state of said user, and wherein said making step makes said semantic content determination of said response output by taking said physical state of said user detected at said detecting step into account.

25. The method of claim 21, wherein said generating step generates said visual response which includes an image of a human character delivering said speech response, where said image incorporates movement and facial expression of said human character.

26. The method of claim 25, wherein said generating step generates said speech response incorporating a speech characteristic corresponding to said movement and said facial expression of said human character.

27. The method of claim 26, wherein said speech characteristic of said speech response includes at least one of an emotional expression and an intonation.

28. The method of claim 21, wherein said understanding step obtains a plurality of candidates for said semantic content of Said input speech, and said making step makes said semantic content determination of said response output by evaluating said plurality of candidates according to a dialogue history.

29. The method of claim 21, wherein said outputting step also outputs a visual indication for informing said user as to whether said speech dialogue system is ready to receive said input speech.

30. The method of claim 21, wherein said generating step generates said visual response which includes a content visualizing image formed by pictures of objects mentioned in said speech response and a numerical figure indicating a quantity of each of said objects.

31. The method of claim 21, wherein at said generating step, said speech response for making a confirmation of said semantic content of said input speech is generated, while said visual response reflecting a past history of a dialogue between said user and said speech dialogue system is generated.

32. The method of claim 21, wherein at said generating step, said visual response which includes text data of said speech response and graphic images other than said text data is generated, and said speech response and said text data for making a confirmation of said semantic content of said input speech is generated while graphic images reflecting a past history of a dialogue between said user and said speech dialogue system are generated.

33. The method of claim 21, wherein at said generating step, said speech response for making a confirmation of said semantic content of said input speech is generated, said speech response being changed from a full speech response to a simplified speech response according to a length of said speech response for making said confirmation.

34. The method of claim 33, wherein said length of said speech response for making said confirmation is determined from information items to be confirmed by said confirmation.

35. The method of claim 34, wherein said full speech response mentions all of said information items to be confirmed while said simplified speech response does not directly mention said information items to be confirmed.

36. The method of claim 35, wherein said simplified speech response contains a demonstrative pronoun to refer to said visual response.

37. The method of claim 33, wherein said full speech response recites said response output explicitly while said simplified speech response does not recite said response output explicitly.

38. The method of claim 37, wherein said simplified speech response contains a demonstrative pronoun to refer to said visual response.

39. The method of claim 33, wherein at said outputting step, said visual response is outputted at an earlier timing than a timing for outputting said visual response when said speech response is said full speech response.

40. The method of claim 33, wherein at said outputting step, said visual response is outputted before said speech response is outputted.

41. A speech dialogue system, comprising:

speech understanding means for understanding a semantic content of an input speech from a user;

response output means for outputting a system response according to said semantic content of said input speech understood by said speech understanding means; and dialogue management means for managing a dialogue between said user and said speech dialogue system by controlling transitions between user states during which said input speech is to be entered into said speech understanding means and system states during which said system response is to be outputted from said response output means.

42. The speech dialogue system of claim 41, wherein said dialogue management means controls said transitions between said user states and said system states according to said semantic content of said input speech understood by said speech understanding means.

43. A speech dialogue system, comprising:

speech understanding means for understanding a semantic content of an input speech from a user by detecting keywords of said input speech;

dialogue management means for limiting said keywords to be detected in said input speech in advance, according to a state of a dialogue between said user and said speech dialogue system; and response output means for outputting a system response according to said semantic content of said input speech understood by said speech understanding means.

44. The speech dialog system of claim 43, wherein said dialogue management means makes a semantic content determination of said system response to be outputted by said response output means in accordance with said semantic content of said input speech and understood by said speech understanding means, and limits said keywords to be detected in said input speech by said speech understanding means in advance by using said semantic content determination of said system response for previous input speech which is indicative of a current state of said dialogue between said user and said speech dialogue system.

45. The speech dialogue system of claim 43, wherein said dialogue management means also limits syntactic and semantic rules to be used by said speech understanding means in advance, according to a state of a dialogue between said user and said speech dialogue system.

* * * * *